US009206372B2

(12) United States Patent
Wang et al.

(10) Patent No.: US 9,206,372 B2
(45) Date of Patent: *Dec. 8, 2015

(54) LUBRICANT COMPOSITIONS FROM RENEWABLE BASE STOCKS WITH IMPROVED PROPERTIES

(71) Applicant: ExxonMobil Research and Engineering Company, Annandale, NJ (US)

(72) Inventors: Kun Wang, Bridgewater, NJ (US); Kristen Amanda Lyon, West Deptford, NJ (US); Eugenio Sanchez, Pitman, NJ (US); Charles Lambert Baker, Jr., Thornton, PA (US); Beatrice Marie Gooding, Hopewell, NJ (US); Frank Cheng-Yu Wang, Annandale, NJ (US)

(73) Assignee: EXXONMOBIL RESEARCH AND ENGINEERING COMPANY, Annnadale, NJ (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/717,805

(22) Filed: Dec. 18, 2012

(65) Prior Publication Data

US 2013/0217606 A1 Aug. 22, 2013

Related U.S. Application Data

(63) Continuation-in-part of application No. 12/660,815, filed on Mar. 4, 2010, now Pat. No. 8,957,266.

(60) Provisional application No. 61/210,045, filed on Mar. 13, 2009.

(51) Int. Cl.
*C10M 105/02* (2006.01)
*C10M 105/04* (2006.01)
(Continued)

(52) U.S. Cl.
CPC ............ *C10M 129/60* (2013.01); *C10M 105/04* (2013.01); *C10M 129/40* (2013.01);
(Continued)

(58) Field of Classification Search
CPC .................. C10M 2203/045; C10M 2203/04; C10M 2203/0206; C10M 2203/1065
USPC .............................................. 585/20, 21, 240
See application file for complete search history.

(56) References Cited

U.S. PATENT DOCUMENTS

| 4,303,590 A | 12/1981 | Tanaka et al. |
| 5,354,878 A | 10/1994 | Connemann et al. |

(Continued)

FOREIGN PATENT DOCUMENTS

| JP | 51031241 | 12/1965 |
| JP | 76031241 | 9/1976 |
| WO | 2007068800 | 6/2007 |

OTHER PUBLICATIONS

R.M. Koster, M. Bogert, B. de Leeuw, E.K. Poels, A. Bliek, "Active sites in the clay catalysed dimerisation of oleic acid", J. of Molecular Catalysis A: Chemical, 134, 1998, pp. 159-169.

(Continued)

*Primary Examiner* — Ellen McAvoy
(74) *Attorney, Agent, or Firm* — Robert A. Migliorini

(57) ABSTRACT

Provided are lubricant compositions from renewable biological sources with improved properties and methods of making and using such compositions. In one form, the lubricant composition includes from 20 to 99.8 wt. % of a lube base stock produced from a renewable biological source and an effective amount of one or more lubricant additives. The lube base stock includes 10 to 35 wt. % paraffins, 40 to 70 wt. % 1-ring naphthenes, and 0 to 40 wt. % combined 2-ring naphthenes and aromatics, and has a ratio of 1-ring naphthenes to paraffins from 1.8 to 5.0, and a Viscosity Index of from 100 to 160. The lube base stock has a $^{14}C$ level ranging from 2 to 101% of the modern day $^{14}C$ level in the atmosphere, and yields a CCS ratio of less than or equal to 0.85 at −35° C. The lubricant compositions exhibit improved solvency and % thickening when blended with a viscosity modifier.

54 Claims, 13 Drawing Sheets

(51) Int. Cl.
*C10M 129/60* (2006.01)
*C10M 129/40* (2006.01)
*C10M 169/04* (2006.01)

(52) U.S. Cl.
CPC ... *C10M169/041* (2013.01); *C10G 2300/1011* (2013.01); *C10G 2300/202* (2013.01); *C10G 2300/302* (2013.01); *C10G 2300/304* (2013.01); *C10G 2400/10* (2013.01); *C10M 2203/0206* (2013.01); *C10M 2203/04* (2013.01); *C10M 2205/06* (2013.01); *C10N 2220/021* (2013.01); *C10N 2220/022* (2013.01); *C10N 2220/023* (2013.01); *C10N 2220/025* (2013.01); *C10N 2220/029* (2013.01); *C10N 2230/10* (2013.01); *C10N 2230/74* (2013.01); *C10N 2270/00* (2013.01)

(56) References Cited

U.S. PATENT DOCUMENTS

| | | | |
|---|---|---|---|
| 5,525,126 | A | 6/1996 | Basu et al. |
| 5,644,129 | A * | 7/1997 | Hsu et al. ............... 250/282 |
| 7,816,570 | B2 * | 10/2010 | Roberts et al. ........... 585/240 |
| 7,888,542 | B2 * | 2/2011 | Koivusalmi et al. ...... 585/327 |
| 8,053,614 | B2 * | 11/2011 | Aalto et al. ................ 585/1 |
| 8,324,438 | B2 * | 12/2012 | Brandvold et al. ....... 585/240 |
| 8,329,967 | B2 * | 12/2012 | Brandvold et al. ....... 585/240 |
| 8,329,968 | B2 * | 12/2012 | Brandvold et al. ....... 585/240 |
| 8,957,266 | B2 * | 2/2015 | Wang et al. .............. 585/254 |
| 2002/0010359 | A1 | 1/2002 | Kaita et al. |
| 2003/0149289 | A1 | 8/2003 | Suppes |
| 2007/0131579 | A1 | 6/2007 | Koivusalmi et al. |
| 2013/0144094 | A1 * | 6/2013 | Pansare et al. ........... 585/26 |

OTHER PUBLICATIONS

M.J.A.M. den Otter, "The Dimerization of Oleic Acid with Montmorillonite Catalyst I: Important Process Parameters; Some Main Reactions", Fette, Seifen, Anstrichmittel, 1972, 667-673.

H.W.G. Heynen, W.H.M.J. van Opstal and M.J.A.M. den Otter, "The Catalyst Dimerization of Oleic Acid in a Continuous Flow Reactor", Fette, Seifen, Anstrichmittel, 1972, 677-681.

P. Tolvanen, P. Maki-Arvela, N. Kumar, K. Eranen, R. Sjoholm, J. Hemming, B. Holmbom, T. Salmi and D.Y. Murzin, "Thermal and Catalytic Oligomerization of Fatty Acids", Applied Catalysis A: General, 2007, 330, 1-11.

M. Snare, I. Kubickova, P. Maki-Arvela, K. Eranen and D.Y. Murzin, "Heterogeneous Catalytic Deoxygenation of Stearic Acid for Production of Biodiesel", Ind. Eng. Chem. Res., 2006, 45, 5708-5715.

* cited by examiner

LUBRICANT COMPOSITIONS FROM RENEWABLE BASE STOCKS WITH IMPROVED PROPERTIES

CROSS-REFERENCE TO RELATED APPLICATIONS

This is a Continuation-In-Part application which claims priority to Non-Provisional U.S. Ser. No. 12/660,815 filed on Mar. 4, 2010, which claims priority to Provisional Application U.S. Ser. No. 61/210,045 filed on Mar. 13, 2009, both of which are herein incorporated by reference in their entirety.

FIELD

The present disclosure relates to lubricant compositions produced from renewable lubricant base stocks with improved properties, and more particularly improved low temperature, solvency and Cold Crank Simulator (CCS)-volatility properties.

BACKGROUND

Base stocks are commonly used for the production of lubricants, such as lubricating oils for automotives, industrial lubricants and lubricating greases. A base oil is defined as a combination of two or more base stocks used to make a lubricant composition. They are also used as process oils, white oils, metal working oils and heat transfer fluids. Finished lubricants consist of two general components, lubricating base stock and additives. Lubricating base stock is the major constituent in these finished lubricants and contributes significantly to the properties of the finished lubricant. In general, a few lubricating base stocks are used to manufacture a wide variety of finished lubricants by varying the mixtures of individual lubricating base stocks and individual additives.

According to the American Petroleum Institute (API) classifications, base stocks are categorized in five groups based on their saturated hydrocarbon content, sulfur level, and viscosity index (Table 1). Lube base stocks are typically produced in large scale from non-renewable petroleum sources. Group I, II, and III base stocks are all derived from crude oil via extensive processing, such as solvent extraction, solvent or catalytic dewaxing, and hydroisomerization. Group III base stocks can also be produced from synthetic hydrocarbon liquids obtained from natural gas, coal or other fossil resources. Group IV base stocks, the polyalphaolefins (PAO), are produced by oligomerization of alpha olefins, such as 1-decene. Group V base stocks include everything that does not belong to Groups I-IV, such as naphthenics, polyalkylene glycols (PAG), and esters.

TABLE 1

| API classification | Group I | Group II | Group III | Group IV | Group V |
|---|---|---|---|---|---|
| % Saturates | <90 | ≥90 | ≥90 | Polyalpha-olefins (PAO) | All others not belonging to group I-IV |
| % S | >0.03 | ≤0.03 | ≤0.03 | | |
| Viscosity Index (VI) | 80-120 | 80-120 | ≥120 | | |

The automotive industry has been using lubricants and thus base stocks with improved technical properties for a long time. Increasingly, the specifications for finished lubricants require products with excellent low temperature properties, high oxidation stability and low volatility. Generally lubricating base stocks are base stocks having kinematic viscosity of about 3 cSt or greater at 100° C. (Kv100); pour point (PP) of about −12° C. or less; and viscosity index (VI) about 90 or greater. In general, high performance lubricating base stocks should have a Noack volatility no greater than current conventional Group I or Group II light neutral oils. Currently, only a small fraction of the base stocks manufactured today are able to meet these demanding specifications.

For environmental, economical, and regulatory reasons, it is of interest to produce fuels, chemicals, and lube oils from renewable sources of biological origin. So far only esters of renewable and biological origin have been used in applications such as refrigeration compressor lubricants, bio-hydraulic oils and metal working oils. In automotive and industrial lubricants, esters from biological sources are used in very small fractions as additives due to technical problems as well as their high prices. For example, ester base stocks can hydrolyze readily producing acids, which in turn cause corrosion on lubricating systems.

In contrast, base stocks consisting of hydrocarbons from biological sources do not have those technical problems associated with esters from the same sources. Most common biological sources for hydrocarbons are natural oils, which can be derived from plant sources such as canola oil, castor oil, sunflower seed oil, rapeseed oil, peanut oil, soy bean oil, and tall oil, or derived from animal fats. The basic structural unit of natural oils and fats is a triglyceride, which is an ester of glycerol with three fatty acid molecules having the structure below:

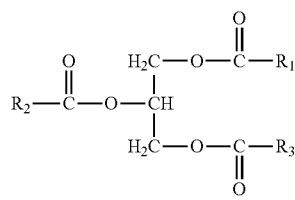

wherein $R_1$, $R_2$, and $R_3$ represent $C_4$-$C_{30}$ hydrocarbon chains. Fatty acids are carboxylic acids containing long linear hydrocarbon chains. Lengths of the hydrocarbon chains most commonly are 18 carbons ($C_{18}$). $C_{18}$ fatty acids are typically bonded to the middle hydroxyl group of glycerol. Typical carbon numbers of the fatty acids linked to the two other hydroxyl groups are even numbers, being between $C_{14}$ and $C_{22}$. Fatty acid composition of biological origin may vary considerably among feed-stocks from different sources. While several double bonds may be present in fatty acids, they are non-conjugated (with at least one —$CH_2$— unit between the double bonds). With respect to configuration, the double bonds of natural fatty acids are mostly of cis form. As the number of the double bonds increase, they are generally located at the free end of the chain. Lengths of hydrocarbon chains and numbers of double bonds depend on the various plant or animal fats or waxes serving as the source of the fatty acid. Animal fats typically contain more saturated fatty acids than unsaturated fatty acids. Fatty acids of fish oil contain high amounts of double bonds, and the average length of the hydrocarbon chains is higher compared to fatty acids of plant oils and animal fats.

Prior to processing, starting materials of biological origin are commonly pretreated with any suitable known methods such as thermally, mechanically for instance by means of shear forces, chemically for instance with acids or bases, or physically with radiation, distillation, cooling, or filtering. The purpose of said chemical and physical pretreatments is to remove impurities interfering with the process or poisoning the catalysts, and reduce unwanted side reactions.

In a hydrolysis treatment, oils and fats react with water yielding free fatty acids and glycerol as the product. Three main processes for the industrial production of fatty acids are known: vapor splitting of triglycerides under high pressure, basic hydrolysis, and enzymatic hydrolysis. In the vapor splitting process, the hydrolysis of triglycerides using steam is carried out at temperatures between 100 and 300° C., under a pressure of 1-10 MPa, preferable conditions being from 250 to 260° C. and from 4 to 5.5 MPa. Metal oxides like zinc oxide may be added as the catalyst to accelerate the reaction.

The unsaturated fatty acids obtained from hydrolysis of natural oils can be dimerized to form dimers of unsaturated fatty acids. A variety of dimerization processes have been described. For example, in Kirk-Othmer: Encyclopedia of Chemical Technology, $3^{rd}$ Ed., vol. 7, Dimer acids, p. 768, a method is presented for producing dimeric acids from unsaturated carboxylic acids with a radical reaction using a cationic catalyst, the reaction temperature being 230° C. In addition to acyclic unsaturated dimeric acid as the main product, mono- and bi-cyclic dimers are also formed. In Koster R. M. et al., Journal of Molecular Catalysis A: Chemical 134 (1998) 159-169, oligomerization of carboxylic acids, carboxylic acid methyl esters, and synthetic alcohols and olefins is described, yielding corresponding dimers.

The oxygen atoms in carboxylic acids can be removed in the form of CO (decarbonylation), $CO_2$ (decarboxylation), or $H_2O$ (deoxygenation). Processes wherein the oxygen of a carboxylic acid or ester is removed are known. Decarboxylation of fatty acids removes $CO_2$ and results in hydrocarbons with one carbon atom less than the original molecule. The feasibility of decarboxylation varies greatly with the type of carboxylic acid used as the starting material. Activated carboxylic acids containing electron-withdrawing groups in the position alpha or beta with respect to the carboxylic group lose carbon dioxide readily at slightly elevated temperatures. In this case, the RC—COOH bond is weakened by the electron-withdrawing group on the carbon chain. With other types of carboxylic acids, the RC—COOH bond is strong and cleavage of carbon dioxide is difficult. A suitable catalyst is required for this reaction. For example, in Maier, W. F. et al., Chemische Berichte (1982), 115(2), 808-812, hydrocarbons are produced from carboxylic acids using heterogeneous $Ni/Al_2O_3$ and $Pd/SiO_2$ catalysts at 180° C. under hydrogen atmosphere. Further examples of decarboxylation and hydrogenation of oxygen containing compounds are disclosed in Laurent, E., Delmon, B.: Applied Catalysis, A: General (1994), 109(1), 77-96, and 97-115, wherein pyrolysis oils derived from biomass were subjected to hydrogenation using sulfided $CoMo/\gamma-Al_2O_3$ and $NiMo/\gamma-Al_2O_3$ catalysts at 260-300° C., under a hydrogen pressure of 7 MPa.

In published U.S. Publication No. 2007/0131579, processes for converting unsaturated carboxylic acids to saturated hydrocarbons are described. The processes employ steps of: (a) oligomerization of unsaturated fatty acids forming dimer acids; (b) pre-hydrogenation to remove the C═C double bond(s); (c) de-oxygenation of the dimer acids in the form of decarboxylation and/or decarbonylation; and (d) optional hydrofinishing to remove double bonds and aromatics. Once the dimer acids are formed, tedious three steps are required in these disclosed processes to generate saturated hydrocarbons. Furthermore, this patent publication discloses a preferred product composition containing 20-90% naphthenes.

JP 76031241B discloses insulating oils formed by dimerization/trimerization of unsaturated fatty acids followed by hydrogenation. Oxygen atoms are removed in the form of water via hydrogenation, which requires two steps of hydrogenation to achieve.

With recent developments in biodiesel production, unsaturated fatty acids and their esters are increasingly available. Therefore it is desirable to take advantage of the renewable feed-stocks, thus saving non-renewable petroleum raw materials. Despite of the above teaching in the art, there is an need for an alternative and simpler process for producing saturated hydrocarbons from starting materials of biological origin, and to avoid the problems associated with the solutions disclosed in the prior art.

Low temperature performance is critical for engine oils because of the cold temperature conditions that engines are exposed to prior to start-up in various cold climates. A lube oil base stock that provides improved low temperature performance could allow inclusion of lower quality, less expensive co-base stocks or a reduction in the amount of viscosity modifier or pour point depressant in the engine oil formulation. Hence, there is also a need for lube base stocks with improved low temperature properties to improve cold start performance of engines under cold environmental conditions.

Generally, the solvency ranking of API lube base stocks is as follows: Group I>Group II>Group III>>Group IV. There is a need for lube base stocks produced from a renewable biological source and lubricant compositions produced from such base stocks with improved solubility because it would allow for lubricant compositions that more effectively keep lubricant additives in solution by preventing additive drop-out. Also a lube base stock with improved solubility will require less viscosity modifier additive in the lubricant composition to achieve the same thickening effect. In addition, a lube base stock with improved solubility may allow for the carrying of a higher amount of performance-enhancing additives and also enable higher performing formulations. In particular, there is a need for lube base stocks derived from renewable biological sources with improved solubility and % thickening relative to lube base stocks derived from petroleum based sources and lubricant compositions produced from such base stocks.

Generally, Group II lube base stocks have much poorer CCS-volatility relationships compared to Group III and Group IV base stocks. There is a need for lube base stocks produced from a renewable biological source and lubricant compositions produced from such base stocks that yield an improved CCS-volatility relationship such that it can more effectively compete with Group III and Group IV (PAO) base stocks in lubricating oils for engines.

SUMMARY

The present disclosure is directed to lubricant compositions including lube base stocks from renewable biological sources with an improved low temperature, CCS-volatility relationship and solvency properties and processes for producing such compositions from renewable biological sources.

According to the present disclosure, there is provided a lubricant composition comprising from 20 to 99.8 wt. % of a renewable lube base stock produced from a renewable biological source and an effective amount of one or more lubricant additives, wherein the renewable lube base stock comprises from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the renewable lube base stock is from 100 to 160.

According to the present disclosure, there is also provided a lubricant composition comprising from 20 to 99.8 wt. % of a renewable lube base stock produced from a renewable biological source and an effective amount of one or more lubricant additives, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

According to the present disclosure, there is provided a lubricant composition comprising from 20 to 99.8 wt. % of a renewable lube base stock produced from a renewable biological source and an effective amount of one or more lubricant additives, wherein the renewable lube base stock comprises from to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the renewable lube base stock is from 100 to 160, and the lube base stock is made by processes for making one or more unsaturated oligomeric acids and one or more saturated hydrocarbons.

According to the present disclosure, there is also provided a lubricant composition comprising from 20 to 99.8 wt. % of a renewable lube base stock produced from a renewable biological source and an effective amount of one or more lubricant additives, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C., and the lube base stock is made by processes for making one or more unsaturated oligomeric acids and one or more saturated hydrocarbons.

According to the present disclosure, there are also provided lubricant compositions including a lube base stock produced from a renewable biological source that yields compositions with improved low temperature properties as measured by the ratio of the observed Cold Crank Simulator (CCS) viscosity to the predicted CCS viscosity by Walther equation (CCS ratio), solvency properties as measured by aniline point and % thickening with a constant amount/type of viscosity modifier, and Cold Crank Simulator (CCS)—volatility properties, wherein the renewable biological lube base stock is made by processes for making one or more unsaturated oligomeric acids and one or more saturated hydrocarbons.

The lubricant compositions including a lube base stock produced from a renewable biological source that yields compositions with improved low temperature properties as measured by the ratio of the observed Cold Crank Simulator (CCS) viscosity to the predicted CCS viscosity by Walther equation (CCS ratio), solvency properties as measured by aniline point and % thickening with a constant amount/type of viscosity modifier, and Cold Crank Simulator (CCS)—volatility properties are made by processes including the following steps: (1) oligomerization of unsaturated fatty acids from biological sources forming dimer acids; and then optionally (2) hydrogenation of the dimer acids in a substantially single step for obtaining saturated hydrocarbons.

In one form of the present disclosure, lubricant compositions including a lube base stock produced from a renewable biological source that yields compositions with improved low temperature properties as measured by the ratio of the observed Cold Crank Simulator (CCS) viscosity to the predicted CCS viscosity by Walther equation (CCS ratio), solvency properties as measured by aniline point and % thickening with a constant amount/type of viscosity modifier, and Cold Crank Simulator (CCS)—volatility properties are made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers.

In another form of the present disclosure, lubricant compositions including a lube base stock produced from a renewable biological source that yields compositions with improved low temperature properties as measured by the ratio of the observed Cold Crank Simulator (CCS) viscosity to the predicted CCS viscosity by Walther equation (CCS ratio), solvency properties as measured by aniline point and % thickening with a constant amount/type of viscosity modifier, and Cold Crank Simulator (CCS)—volatility properties are made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

Further according to the present disclosure, there are provided lubricant compositions including a lube base stock produced from a renewable biological source that yields compositions with improved low temperature properties as measured by the ratio of the observed Cold Crank Simulator (CCS) viscosity to the predicted CCS viscosity by Walther equation (CCS ratio), solvency properties as measured by aniline point and % thickening with a constant amount/type of viscosity modifier, and Cold Crank Simulator (CCS)—volatility properties made by hydrogenation of dimer acids from biological sources in a substantially single step.

Further according to the present disclosure, there is provided a method of making a lubricant composition comprising: providing a renewable lube base stock produced from a renewable biological source and one or more lubricant additives, and blending from 20 to 99.8 wt. % of the renewable lube base stock with an effective amount of the one or more lubricant additives to form a lubricant composition, wherein the renewable lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160.

Further according to the present disclosure, there is also provided a method of making a lubricant composition comprising: providing a renewable lube base stock produced from a renewable biological source and one or more lubricant additives, and blending from 20 to 99.8 wt. % of the renewable lube base stock with an effective amount of the one or more lubricant additives to form a lubricant composition, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

Further according to the present disclosure, there is provided a method for lubricating a device or apparatus of moving and/or interacting mechanical parts, components, or surfaces requiring lubrication. The method has the steps of providing a lubricant composition including from 20 to 99.8 wt. % of a renewable lube base stock produced from a renewable biological source and an effective amount of one or more lubricant additives, and applying to the apparatus or machine the lubricant composition, wherein the renewable lube base stock includes from 10 to 35 wt. % paraffins, 40 to 70 wt. % 1-ring naphthenes, and 0 to wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160.

Further according to the present disclosure, there is also provided a method for lubricating a device or apparatus of moving and/or interacting mechanical parts, components, or surfaces requiring lubrication. The method has the steps of providing a lubricant composition including from 20 to 99.8 wt. % of a renewable lube base stock produced from a renewable biological source and an effective amount of one or more lubricant additives, and applying to the apparatus or machine the lubricant composition, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
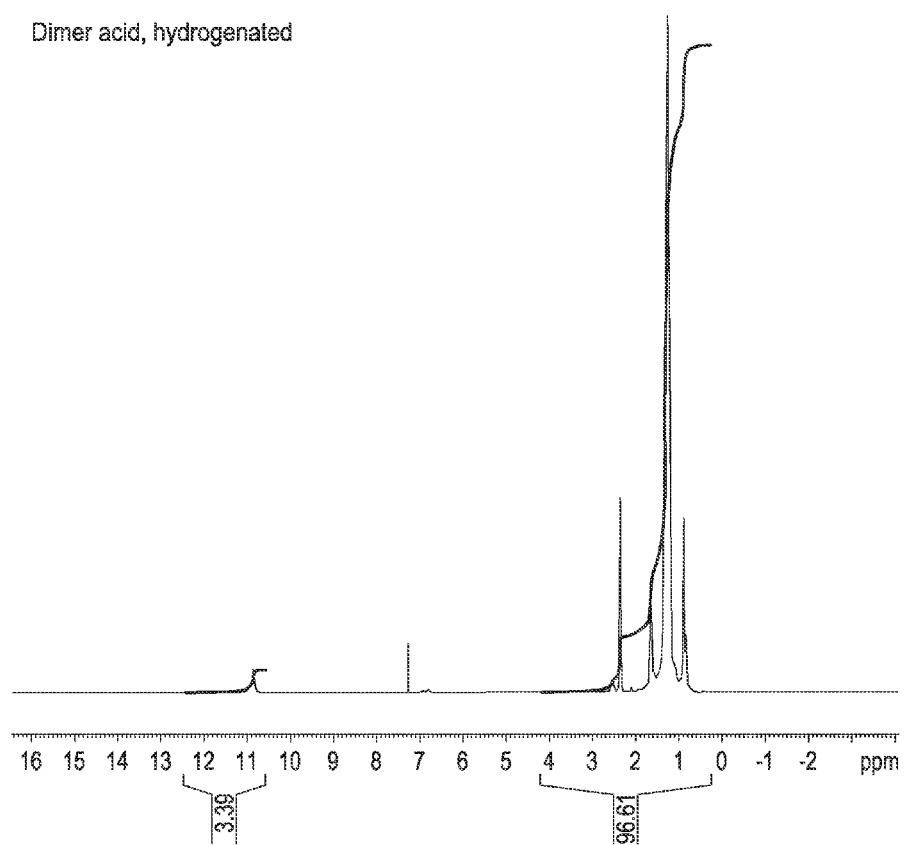
FIG. 1 is the $^1H$ NMR spectrum of hydrogenated dimer acid that was used as the starting material for Examples 1 and 2.
Figure 2:
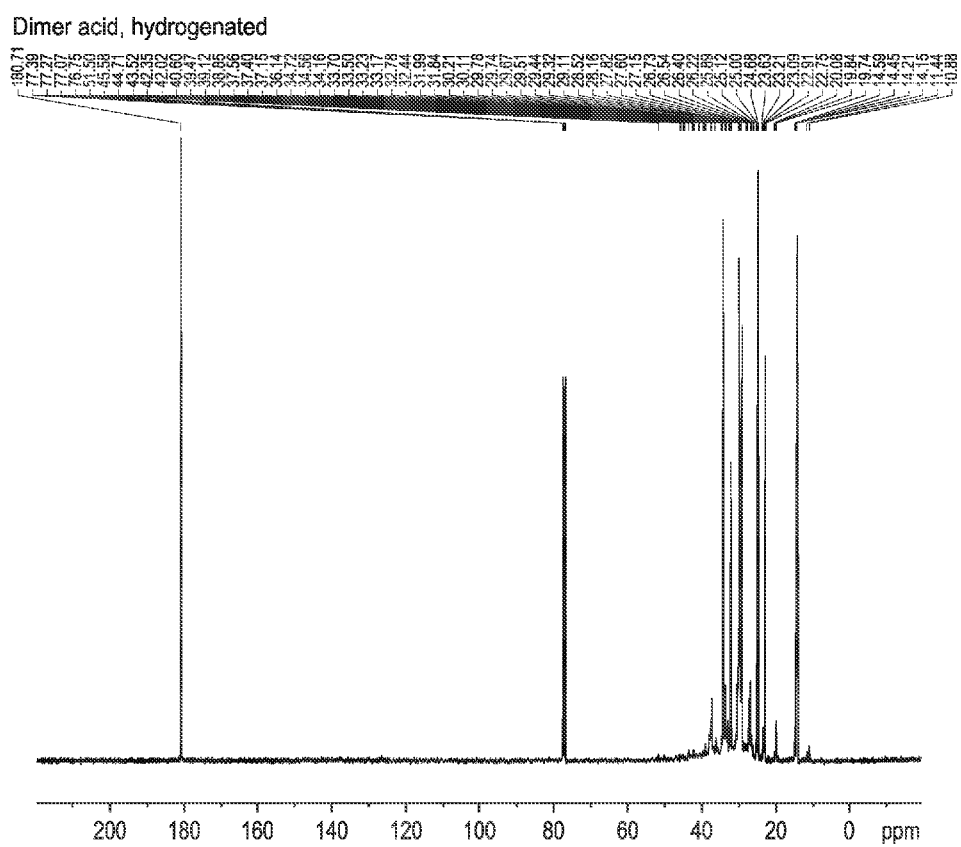
FIG. 2 is the $^{13}C$ NMR spectrum of hydrogenated dimer acid that was used as the starting material for Examples 1 and 2.
Figure 3:
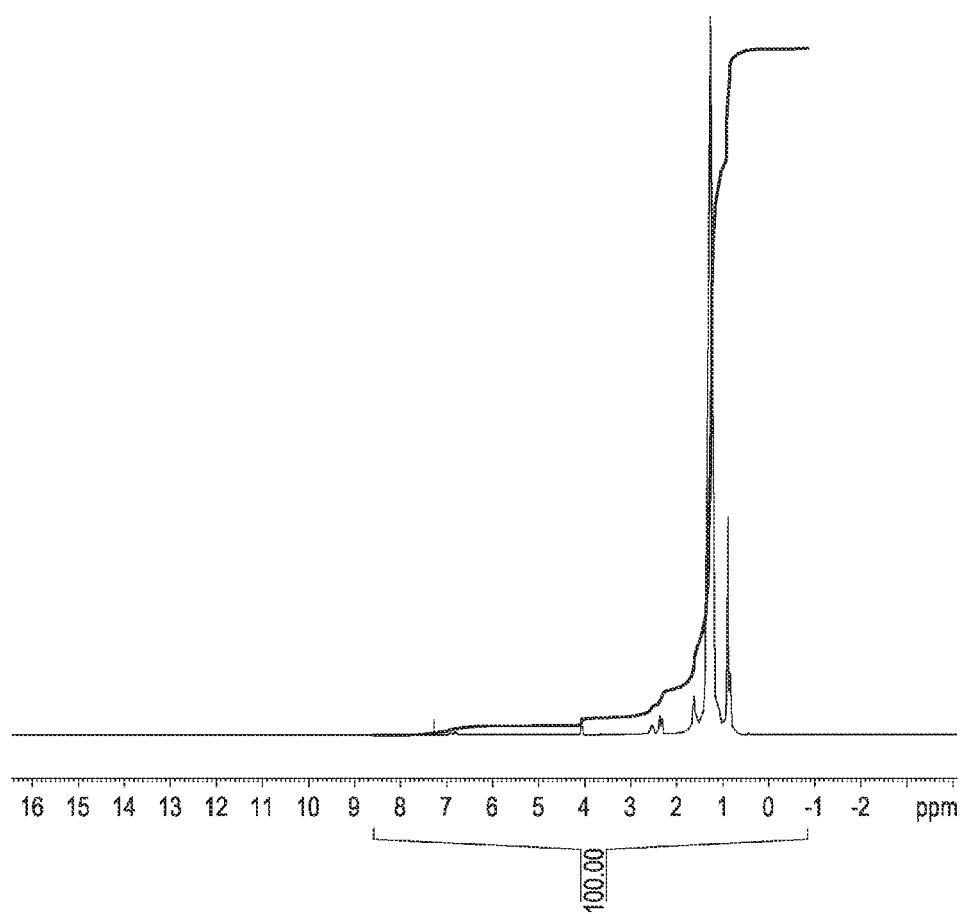
FIG. 3 is the $^1H$ NMR spectrum of products from Example 1.
Figure 4:
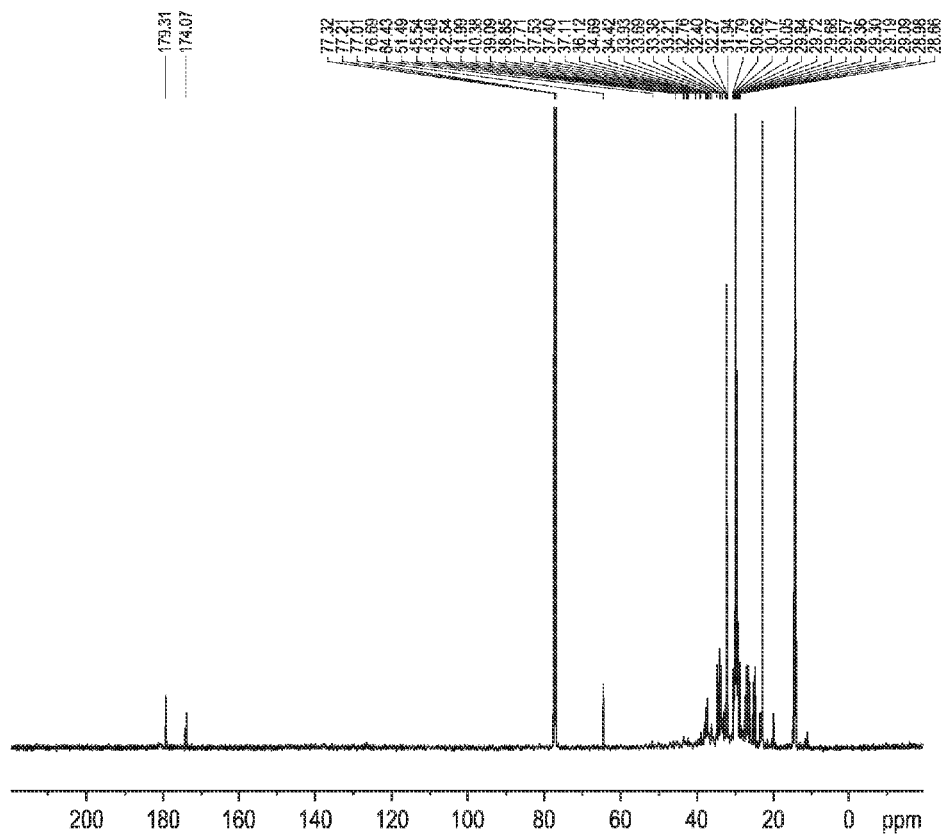
FIG. 4 is the $^{13}C$ NMR spectrum of products from Example 1.

All numerical values in this disclosure are understood as being modified by "about" or "approximately" the indicated value, and take into account experimental error and variations that would be expected by a person having ordinary skill in the art.

The Applicants have unexpectedly and surprisingly discovered that lubricant compositions including lube base stocks made from renewable biological sources via the processes disclosed herein yield improved low temperature properties compared to compositions made from nonrenewable fossil based sources. The present disclosure relates to lubricant compositions including lube base stocks made from renewable biological sources that unexpectedly yield a CCS ratio (Cold Crank Simulator (CCS) viscosity to the predicted CCS viscosity by Walther equation) at −35° C. less than or equal to 0.85, or less than or equal to 0.75, or less than or equal to 0.70, or less than or equal to 0.60, or alternatively less than or equal to 0.58, or alternatively less than or equal to 0.56, or alternatively less than or equal to 0.54, or alternatively less than or equal to 0.52, or alternatively less than or equal to 0.50, or alternatively less than or equal to 0.48, or alternatively less than or equal to 0.46. The lube base stocks made from renewable biological sources via the processes disclosed herein yield a CCS ratio lower than not only Group I and Group II lube base stocks, but also known Group III and Group IV base stocks (PAOs). This superior low temperature performance is unexpected because the inventive lube base stocks made from renewable biological sources via the processes disclosed herein were expected to behave similarly to API Group I to IV base stocks made from nonrenewable fossil based sources. The CCS ratios of prior art Group I and Group II (solvent dewaxed) lube base stocks are generally greater than 1.0. The CCS ratios of prior art Group III stocks, such as Visom™, are generally on the order of 1.0. The CCS ratios of prior art Group IV stocks (PAO) are generally on the order of 0.6. With the exception of the lube base stocks from renewable biological sources of the instant disclosure, there are no other known base stocks with CCS ratios as low as of 0.5.

In one form, the inventive lubricant composition disclosed herein comprises from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160.

In another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C.

In another form of the present disclosure, a lubricant composition including from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes for making one or more unsaturated oligomeric acids and one or more saturated hydrocarbons.

In another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by processes for making one or more unsaturated oligomeric acids and one or more saturated hydrocarbons.

In another form of the present disclosure, a lubricant composition including from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes including the following steps: (1) oligomerization of unsaturated fatty acids from biological sources forming dimer acids; and then optionally (2) hydrogenation of the dimer acids in a substantially single step for obtaining saturated hydrocarbons.

In another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by processes including the following steps: (1) oligomerization of unsaturated fatty acids from biological sources forming dimer acids; and then optionally (2) hydrogenation of the dimer acids in a substantially single step for obtaining saturated hydrocarbons.

In another form of the present disclosure, a lubricant composition including from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers In another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers.

In another form of the present disclosure, a lubricant composition including from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

In another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

In yet another form of the present disclosure, a lubricant composition including from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by hydrogenation of dimer acids from biological sources in a substantially single step.

In yet another form of the present disclosure, a lubricant composition including from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by hydrogenation of dimer acids from biological sources in a substantially single step.

The Applicants have also unexpectedly and surprisingly discovered that lubricant compositions including a lube base stock produced from a renewable biological source via the processes disclosed herein yield an improved CCS viscosity-Noack volatility relationship compared to lubricant compositions including lube base stock made from nonrenewable fossil based sources. In particular, the present disclosure also relates to lubricant compositions including lube base stocks made from renewable biological sources that unexpectedly yields a CCS viscosity-Noack volatility relationship superior to a Group II base stock and comparable to a Group III and a Group IV base stock. More particularly, the lubricant compositions including the lube base stocks made from renewable biological sources via the processes disclosed herein yield a CCS viscosity-Noack volatility relationship at least 5% lower, or at least 10% lower, or at least 15% lower, or at least 20% lower, or at least 25% lower than a Group II fossil based lube base stock. Still more particularly, the lubricant compositions including the lube base stocks made from renewable biological sources via the processes disclosed herein yield a CCS viscosity-Noack volatility relationship at least comparable to and even better than Group III lube base stocks. In addition, the lubricant compositions including the lube base stocks made from renewable biological sources via the processes disclosed herein yield a CCS viscosity-Noack volatility relationship approaching that of Group IV lube base stocks.

The Applicants have also unexpectedly and surprisingly discovered that lubricant compositions including a lube base stock produced from a renewable biological sources via the processes disclosed herein yield an improved solvency as measured by aniline point and improved % thickening with a given amount of a viscosity modifier compared to lubricant compositions including lube base stock made from nonrenewable fossil based sources. In particular, the present disclosure also relates to lubricant compositions including a lube base stock produced from renewable biological sources via the processes disclosed herein that unexpectedly yields a solvency measured by aniline point of less than 120, or less than 116, or less than 112, or less than 110, or less than 108 deg. C. Aniline point is measured according to ASTM D611 method. The present disclosure also relates to lubricant compositions including a lube base stock produced from renewable biological sources via the processes disclosed herein that unexpectedly yields a % thickening when blended with a constant amount of a viscosity modifier of at least 146%, or at least 150%, or at least 154%, or at least 158%, or at least 162%, which is at least 2%, or at least 6%, or at least 10%, or at least 15%, or at least 20% greater than a Group III and Group IV base stock from nonrenewable fossil based sources. The amount of the viscosity modifier may range from 4 to 10 wt. %, or 6 to 8 wt. %, or may be 7 wt. %. The wt. % for the viscosity modifier is for a viscosity modifier concentrate wt. % in the total lubricant composition. The concentrate includes from 80 to 90 wt. % of the viscosity modifier polymer in a base oil based on the total weight of the viscosity modifier concentrate. Non-limiting exemplary viscosity modifier polymers include styrene-isoprene star polymer, ethylene propylene copolymer and polymethacyrlates. Hence, the lubricant compositions including a lube base stock produced from renewable biological sources via the processes disclosed herein also yield a solvency as measured by aniline point and a % thickening superior than known Group III and Group IV base stocks (PAOs).

The superior CCS viscosity-Noack volatility relationship, solvency measured by aniline point, and % thickening when blended with a constant amount of a viscosity modifier for the lubricant compositions including a lube base stock produced from renewable biological sources are unexpected because lubricant compositions including lube base stocks made from non-renewable petroleum based sources yield significantly worse performance for these properties.

In another form of the present disclosure, a lubricant composition comprises from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the composition yields a CCS viscosity-Noack volatility relationship at least 10% lower than the same lubricant composition including an API Group II lube base stock made from a non-renewable petroleum based source.

In another form of the present disclosure, a lubricant composition comprises from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the composition yields a CCS viscosity-Noack volatility relationship at least 10% lower than the same lubricant composition including an API Group II lube base stock made from a non-renewable petroleum based source.

In another form of the present disclosure, a lubricant composition comprises from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the composition yields a solvency measured by aniline point of less than 112 deg. C.

In another form of the present disclosure, a lubricant composition comprises from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the composition yields a solvency measured by aniline point of less than 112 deg. C.

In another form of the present disclosure, a lubricant composition comprises from 20 to 99.8 wt. % of a lube base stock produced from a renewable biological source and an effective amount of one or more lubricant additives, wherein the lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the composition yields a % thickening when blended with a 7 wt. % of a styrene-isoprene star polymer viscosity modifier of at least 146%.

In another form of the present disclosure, a lubricant composition comprises from 20 to 99.8 wt. % of a lube base stock produced from a renewable biological source and an effective amount of one or more lubricant additives, wherein the lube base stock has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and the composition yields a % thickening when blended with a 7 wt. % of a styrene-isoprene star polymer viscosity modifier of at least 146%

Lube Base Stocks from Renewable Biological Sources Embodiments:

The first component of the lubricant compositions according to the present disclosure is a lube base stock produced from a renewable biological source, also referred to herein as a "renewable base stock" or "RBS." The lube base stocks of the present disclosure, unless otherwise indicated, are renewable base stocks produced from renewable biological sources. The lube base stock composition according to the present disclosure includes at least one lube base stock produced from a renewable biological source. Typically lube base stocks are petroleum-derived, however, according to the present disclosure, such base stocks are derived from a renewable biological source, such as for example a natural oil characterizable as lube base stock, including animal oils and vegetable oils, and also algae sources. A lube base oil is defined as a combination of two or more lube base stocks. A lube base oil of the present disclosure includes at least one renewable lube base stock made from a renewable biological source.

Two-dimensional gas chromatography (also referred to herein as "GC×GC" or "2DGC") was used for characterizing the renewable base stocks and prior art comparative base stocks of the present disclosure for chemical composition. In particular, the 2DGC technique was used for characterizing the inventive base stocks and the comparative base stocks for weight % paraffins, weight % 1-ring naphthenes, and weight % combined 2-ring naphthenes and aromatics.

Comprehensive two-dimensional gas chromatography (GC×GC) is a separation technique developed in recent years. It can provide improved chromatographic resolution of complex mixtures. GC×GC employs a single GC unit containing two separation columns of different selectivity. A modulation unit situated between these two separation columns performs solute focusing and re-injection into a short, high-speed second column. The modulation mechanism is the key to accomplish this two-dimensional separation. GC×GC may be considered as a 'continuous' heart-cutting form of a conventional single heart-cutting multidimensional GC that has been established for many years.

These advances have enabled GC×GC to become an ideal technique for analyzing complex mixtures, such as the lube base stocks disclosed in this application. One advantage of GC×GC technique is its enhanced sensitivity due to the refocusing process during the modulation operation. Another advantage of the GC×GC technique is the qualitative analysis through compound class separation. Hence, in addition to single component separation, it also provides the compound class homologous series trend information. This trend information can be further combined with the reference standard compounds or the GC-MS data to greatly improve the capability of elucidation of individual molecular structure in the complex mixtures.

Figure 12:
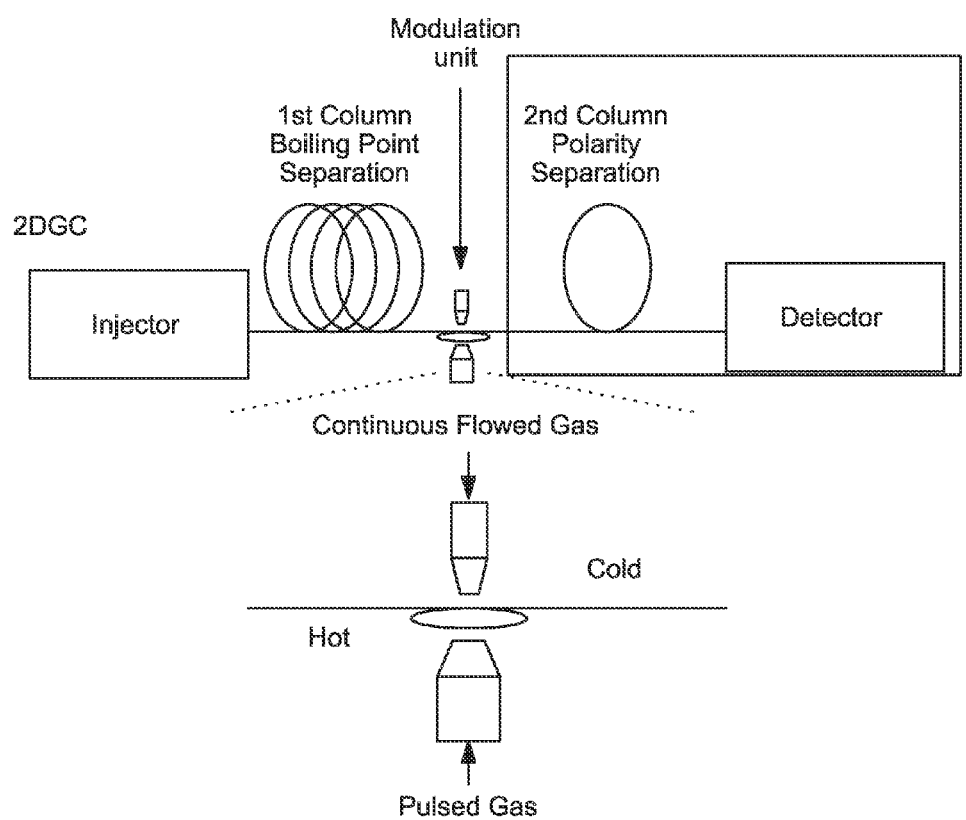
FIG. 12 is the layout of the two-dimensional gas chromatography technique used to analyze the composition of the base stocks of the present disclosure.

The 2DGC (GC×GC) system consists of an Agilent 6890 gas chromatograph (Agilent Technology, Wilmington, Del.) configured with inlet, columns, and detectors, as shown in FIG. 12. A split/splitless inlet system with a 100 sample position tray autosampler was used. The two-dimensional capillary column system utilizes a non-polar first column (BPX-5, 30 meter, 0.25 mm I.D., 1.0 micron film), and a polar (BPX-50, 2 meter, 0.25 mm I.D., 0.25 micron film), second column. Both capillary columns are the products of SGE Inc. (Austin, Tex.). A looped thermal modulation assembly based on Zoex technology (Zoex Corp. Lincoln, Nebr.), which is liquid nitrogen cooled "trap-release" looped thermal modulator, is installed between these two columns. A flame ionization detector (FID) is used for the signal detection. A 0.2 microliter sample was injected with 50:1 split at 300° C. inlet temperature. Carrier gas flow was ramped based on the head pressure. The head pressure is programmed from 24 psi with O-minute hold and 0.2 psi per minute increment to 42 psi with O-minute hold. The oven was programmed from 190° C. with O-minute hold and 2.0° C. per minute increment to 370° C. with O-minute hold. The hot jet was programmed from 240° C. with O-minute hold and 2.0° C. per minute increment to 390° C. with 15-minute hold. The total GC run time was 90 minutes. The modulation period was 10 seconds. The sampling rate for the detector was 100 Hz.

FIG. 12 shows a schematic of the GC×GC configuration. After data acquisition, it was processed for qualitative and quantitative analysis. The qualitative analysis converted data to a two-dimensional image that was processed by a commercial program ("Transform", Research Systems Inc. Boulder, Colo.). The two-dimensional image was further treated by "Photoshop" program (Adobe System Inc. San Jose, Calif.) to generate publication-ready images. An in-house program was used to quantify the peak volumes.

The two-dimensional chromatographic separation is a combination of non-polar column separation (1st column, X-axis) and polar column separation (2nd column, Y-axis). The non-polar column separation is based on the boiling point of the component in the sample mixture, which closely correlated to the carbon chain length. It can also be viewed as a boiling point separation. The polar column separation is based on the polarity of the component in the sample mixture, which closely correlated to the functional groups on the component. It can also be viewed as a compound class separation. With this detailed two-dimensional separation, the separated complex mixture can be systematically, qualitative and quantitative analyzed.

In addition to the qualitative analysis, the GC×GC technique also provides advantages in the quantitative analysis for complex mixtures than traditional GC. Because the GC×GC offers better separation for individual components, better-defined peak integrations and more accurate quantification are obtained. This improved quantitative analysis gives more accurate compositional information for complex mixtures such as the lube base stocks disclosed in this application. U.S. Pat. Nos. 7,641,786 and 7,642,095, both of which are herein incorporated by reference, further detail the 2DGC technique and its use for analyzing the composition of hydrocarbons.

The lube base stock compositions according to the present disclosure include at least one lube base stock produced from a renewable biological source. Typically lube base stocks are petroleum-derived, however, according to the present disclosure, such base stocks are derived from a renewable biological source, such as for example a natural oil characterizable as lube base stock, including animal oils and vegetable oils, and also algae sources. Such lube base stocks are also referred to herein as "renewable base stocks" or "RBS."

The origin of the lube base stocks produced by the process of the instant disclosure can be determined by the radioactive carbon $^{14}C$ level. Radiocarbon is produced in the atmosphere by collisions between cosmic-ray neutrons and $^{14}N$, after which it is quickly oxidized to $CO_2$. Plants take up the $^{14}CO_2$ for photosynthesis, and consequently they reflect "modern" levels of $^{14}C$. Once assimilation of $^{14}C$ ceases, levels of $^{14}C$ decrease through radioactive decay with a half-life of 5730 years. Hence, petroleum, which forms over millions of years, contains no detectable $^{14}C$. Therefore, $^{14}C$ is an ideal tracer for tracing the biological component in a lube base stock and fuel blends because all recent natural products are effectively pre-labeled with $^{14}$C. The $^{14}$C level in the lube base stock produced by the process of the instant disclosure is from 2 to 101%, or from 99 to 101% of present day $^{14}$C level. When used in blends with petroleum derived lube base stocks or fuels, the $^{14}$C level in the blended base stock and fuels is in the range of 2-101% of present day $^{14}$C level.

In one form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160. The wt. % paraffins, wt. % 1-ring naphthenes, and wt. % combined 2-ring naphthenes and aromatics are determined by the 2DGC technique described above.

In yet another form of the present disclosure, a lube base stock produced from a renewable biological source with improved low temperature properties produced from a renewable biological source has a $^{14}$C level ranging from 2 to 101% of the modern day $^{14}$C level in the atmosphere, and wherein the lube base stock yields a CCS ratio (Cold Crank Simulator (CCS) viscosity to the predicted CCS viscosity by Walther equation) of less than or equal to 0.85 at −35° C. The $^{14}$C level may alternatively range from 30 to 101%, or 50 to 101%, or 65 to 101%, or 80 to 101%, or 90 to 101%, or 95 to 101%, or 99 to 101% of the modern day $^{14}$C level in the atmosphere.

Alternatively, the lube base stock produced from a renewable biological source may include 15 to 30 wt. %, or 20 to 25 wt. % of paraffins. Alternatively, the lube base stock produced from a renewable biological source may include 45 to 65 wt. %, or 50 to 60 wt. % of 1-ring naphthenes. Alternatively, the lube base stock produced from a renewable biological source may include 5 to 35 wt. %, or to 30 wt. %, or 15 to 25 wt. % of combined 2-ring naphthenes and aromatics. Alternatively, the lube base stock produced from a renewable biological source may have a ratio of 1-ring naphthenes to paraffins of from 1.9 to 4.0, or 2.0 to 3.5, or 2.2 to 3.0.

The lube base stock produced from a renewable biological source has an olefin content of less than 5 wt. %, or less than 3 wt. %, or less than 2 wt. %, or less than 1 wt. %, or substantially no olefins as measured by proton NMR. Substantially no olefins means that the level is less than 0.5 wt. % in the lube base stock. Olefins are defined as unsaturated hydrocarbon compounds containing at least one carbon-to-carbon double bond.

Alternatively, the lube base stocks of present disclosure may contain less than 90% mono-cyclic (also referred to as "1-ring naphthenes" herein) naphthenes, or less than 80% mono-cyclic naphthenes, or less than 70% mono-cyclic naphthenes, or less than 60% mono-cyclic naphthenes, and greater than 20% mono-cyclic naphthenes, or greater than 30% mono-cyclic naphthenes, or greater than 40% mono-cyclic naphthenes, or greater than 50% mono-cyclic naphthenes, based on the 2DGC method.

Alternatively, the lube base stocks of present disclosure may contain less than 90% mono-cyclic (also referred to as "1-ring naphthenes" herein) naphthenes, or less than 80% mono-cyclic naphthenes, or less than 70% mono-cyclic naphthenes, or less than 60% mono-cyclic naphthenes, and greater than 20% mono-cyclic naphthenes, or greater than 30% mono-cyclic naphthenes, or greater than 40% mono-cyclic naphthenes, or greater than 50% mono-cyclic naphthenes, based on the 2DGC method. The lube base stock products of this disclosure contain less than 35%, or less than 25%, or less than 15%, or less than 5%, or less than 1%, or less than 0.1% of polycyclic naphthenes (also referred to as "2-ring naphthenes" herein) as determined by 2D GC.

The lube base stock produced from a renewable biological source of the present disclosure includes paraffins, 1-ring naphthenes, 2-ring naphthenes and aromatics. The lube base stocks produced from a renewable biological source of the present disclosure yield a unique chemical structure based on the wt. % paraffins, wt. % 1-ring naphthenes, and combined wt. % of 2-ring naphthenes and aromatics in the lube base stocks. This unique chemical structure can also be quantified by the ratio of 1-ring naphthenes to paraffins. For the purposes of the lube base stocks of the present disclosure, paraffins are molecules with long alkyl chains which are joined at positions other than the end carbon as shown below.

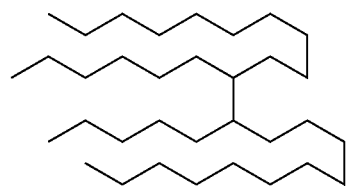 [SMILES: CCCCCCCCCCCC(CCCCC)C(CCCCCC)CCCCCCCCCC]

For the purposes of the lube base stocks of the present disclosure, 1-ring naphthenes are molecules where the naphthene ring is at least tri-substituted with alkyl groups and the length of the alkyl groups can vary as long as the total number of carbons stay constant in the molecule as shown below.

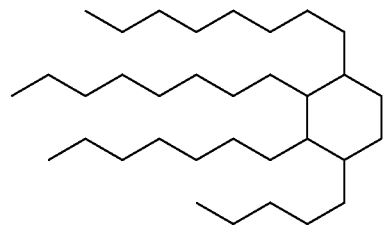 [SMILES: CCCCCCCCC1CCC(CCCCC)C(CCCCCCC)C1CCCCCCCC]

For the purposes of the lube base stocks of the present disclosure, 2-ring naphthenes are molecules where the naphthene rings are either fused or separated and are at least tri-substituted with alkyl groups, the length of the alkyl groups can vary as long as the total number of carbons stay constant in the molecule as shown below.

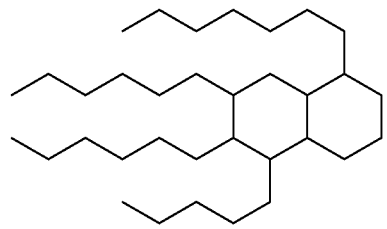

-continued

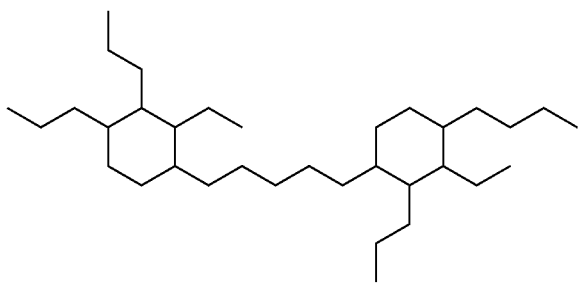

For the purposes of the lube base stocks of the present disclosure, aromatics are molecules where the aromatic ring is at least tri-substituted with alkyl groups, the length of the alkyl groups can vary as long as the total number of carbons stay constant in the molecule as shown below.

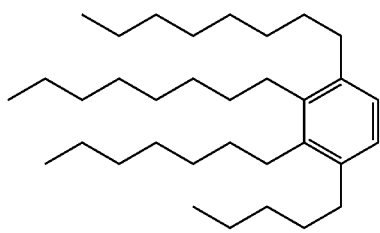 [SMILES: CCCCCCCCc1ccc(CCCCC)c(CCCCCCC)c1CCCCCCCC]

In yet another form of the present disclosure, a lube base stock produced from a renewable biological source with improved low temperature properties may be characterized using quantitative $^{13}$C NMR. Quantitative $^{13}$C NMR spectra were obtained using Cr(acac)$_3$ as a relaxation aid during acquisition. For example, all normal paraffins with carbon numbers greater than C$_9$ have only five inequivalent carbon NMR absorptions, corresponding to the terminal methyl carbons ($\alpha$), methylene carbons at the second, third, and fourth positions from the molecular ends ($\beta$, $\gamma$, and $\delta$, respectively), and the other carbon atoms along the backbone that have a common shift ($\epsilon$). The intensities of $\alpha$, $\beta$, $\gamma$, and $\delta$ are equal and the intensity of $\epsilon$ carbons depends on the length of the molecule. Similarly, side branches on the backbone of an iso-paraffin have unique chemical shifts and the presence of side-chain causes a unique shift at the tertiary site on the backbone to which it is anchored. It also perturbs the chemical shifts within three sites of the tertiary site, imparting unique chemical shifts ($\alpha'$, $\beta'$, and $\gamma'$) to the adjacent sites when they occur in the center of a long backbone. The number of free ends of molecules can be estimated by measuring the number of $\alpha$, $\beta$, $\gamma$, and $\delta$ carbons. Unique shifts also enable measuring the number of pendant side-chains of different length (which are called P-Me, P-Et, P-Pr, and P-Bu). The molecular ends that have a side branch at the 2, 3, 4, or 5 sites (which are called T-Me, T-Et, T-Pr, and T-Bu) can also be measured. The branching features are particularly valuable in characterizing lube base stocks.

The lube base stocks can be characterized by the "Free Carbon Index", which represents the measure of carbon atoms in an average molecule that are epsilon carbons:

FCI=(% epsilon carbons)*(Carbon Number)/100 where the Carbon Number is determined by $^{13}$C NMR as following:

Carbon Number=2/((mole % a carbon+mole % T-Me carbon+mole % T-Et carbon+mole % T-Pr carbon)/100)

More details of this technique can be found in "Composition and Analysis of Heavy Petroleum Fractions" by Klaus H. Altgelt and Mieczyslaw M. Boduszynski pages 182-186, which are incorporated here as reference. The lube base stocks produced from a renewable biological source with improved low temperature properties of the present disclosure have a FCI of less than 4.0, or less than 3.5, or less than 3.0.

The lube base stocks of the present disclosure also include less than 10 wt. % oxygenates, or less than 8 wt. % oxygenates, or less than 5 wt. % oxygenates, or less than 3 wt. % oxygenates, or less than 1 wt. % oxygenates, or substantially no oxygenates. Substantially no oxygenates means that the level is less than 0.5 wt. % in the lube base stock. Oxygenates are defined as chemical compounds containing oxygen as a part of their chemical structure.

The carbon number (defined as the number of carbon atoms in each molecule) and the carbon number range of the lube base stock depend both on the biological starting material of the feedstock and the production process. A carbon number range for the lube base stocks disclosed herein may range from $C_{20}$ to $C_{60}$, or $C_{30}$ to $C_{50}$, whereas the carbon number range of particularly thick lube base stocks may be as high as from $C_{150}$ to $C_{550}$. The lube base stocks of the present disclosure also have consecutive carbon numbers (that is carbon numbers that fall one after the other in order) ranging from $C_{20}$ to $C_{60}$, or $C_{25}$ to $C_{55}$, or $C_{30}$ to $C_{50}$, or $C_{30}$ to $C_{40}$, or $C_{23}$ to $C_{36}$, or $C_{31}$ to $C_{36}$. This distinguishes the biological base stocks of the present disclosure from prior art Group IV PAO base stocks which based on the comonomers (such as octene or decene) used to oligomerize such PAO base stocks would not have consecutive carbon numbers falling within these ranges because of comonomers having an even number of carbon atoms, which would not yield consecutive carbon numbers after oligomerization. In addition, the lube base stocks of the present disclosure have a narrow carbon number distribution when produced from a single biological based feed, and in particular, at least 40 wt. %, or at least 50 wt. %, or at least 60 wt. %, or at least 70 wt. %, or at least 80 wt. % of the carbon numbers of the distribution falling at a single carbon number selected from the group consisting of $C_{30}$, or $C_{31}$, or $C_{32}$, or $C_{33}$, or $C_{34}$, or $C_{35}$, or $C_{36}$, or $C_{37}$, or $C_{38}$, or $C_{39}$, or $C_{40}$. Alternatively, the lube base stocks of the present disclosure may have consecutive carbon numbers ranging from $C_{20}$ to $C_{60}$ with at least 40 wt. %, or at least 50 wt. %, or at least 60 wt. %, or at least 70 wt. %, or at least 80 wt. % falling within a carbon number range from $C_{30}$ to $C_{40}$ when produced from a mixed feed of biological based sources, which results in a broader carbon number distribution than a single feed.

For lube base stocks of the present disclosure, the viscosity index is at least 80, or at least 90, or at least 100, or at least 110 as determined by the method of ASTM D 2270. The viscosity index of the product may be as high as 160, the product thus being suitable in base stock applications for any one of API Group I-to Group V. More particularly, the lube base stocks of the present disclosure may have a viscosity index ranging from 80 to 160, or 100 to 160, or 90 to 150, or 100 to 140, or 110 to 130.

Depending on the degree of oligomerization controlled by the selection of catalyst, reaction temperature, residence time, the lube base stock produced in this disclosure can have a 100° C. viscosity of 1 to 100 cSt, most preferably 2 to 20 cSt, or alternatively 2 to 10 cSt, or alternatively 3 to 20 cSt, or alternatively 3 to 50 cSt, or alternatively 4 to 10 cSt, or alternatively 4 to 20 cSt, or alternatively 4 to 8 cSt, or alternatively 15 to 100 cSt, or alternatively 20 to 80 cSt. For the low viscosity range product, the width or distribution (from maximum carbon number to minimum carbon number) of the carbon number range is no more than 10 carbons, preferably no more than 9 carbons, and particularly preferably no more than 4 carbons (determined by field ionization mass spectrometry, FIMS). More than 50%, preferably more than 75% and particularly preferably more than 80% by weight of the base stock contains hydrocarbons belonging to this narrow carbon number distribution.

Sulfur content of the lube base stock of the disclosure is less than or equal to 300 ppm, or less than 200 ppm, or less than 100 ppm, or preferably less than 50 ppm, and particularly preferably less than 1 ppm (as measured by ASTM D 3120). Nitrogen content of said lube base stock of the disclosure is less than 100 ppm, preferably less than 10 ppm, and particularly preferably less than 1 ppm (as measured by ASTM D4629).

The properties of the lube base stocks with improved low temperature properties from renewable biological sources according to the disclosure, and described in the examples are excellent, and moreover, carbon number ranges and distillation ranges are very narrow. The process of the disclosure provides saturated hydrocarbons having superior viscosity properties and excellent low temperature properties.

Volatility of the lube base stock with a narrow boiling range, obtained according to the disclosure and measured according to Noack Volatility method (or ASTM D6375 modified method), is extremely low compared to similar lube base stock products of the prior art made from non-renewable fossil sources. The product Noack volatility can range from less than 5 wt. % for a 20 cSt and higher viscosity product to less than 50 wt. % for a fluid of 2.5 cSt. For a fluid of 3 to 8 cSt, the volatility typically can range from 3% to 25%. For fluid of 3.5 to 6 cSt, the volatility can range from 4% to 15% depending on fluid viscosity. For a 5.5 cSt base stock of this disclosure from a $C_{18}$ dimer acid, the Noack volatility is 5.5 wt. %, lower than that of a higher viscosity PAO of 5.8 cSt with Noack Volatility of 6% to 9%, depending on source. In another form of the lube base stock of the present disclosure, the Noack volatility is less than 10 wt. % for a viscosity of at least 4 cSt. In yet another form of the lube base stock of the present disclosure, the Noack the volatility is less than 8 wt. % for a viscosity of at least 4 cSt. In still yet another form of the lube base stock of the present disclosure, the Noack volatility is less than 6 wt. % for a viscosity of at least 4 cSt.

Figure 13:
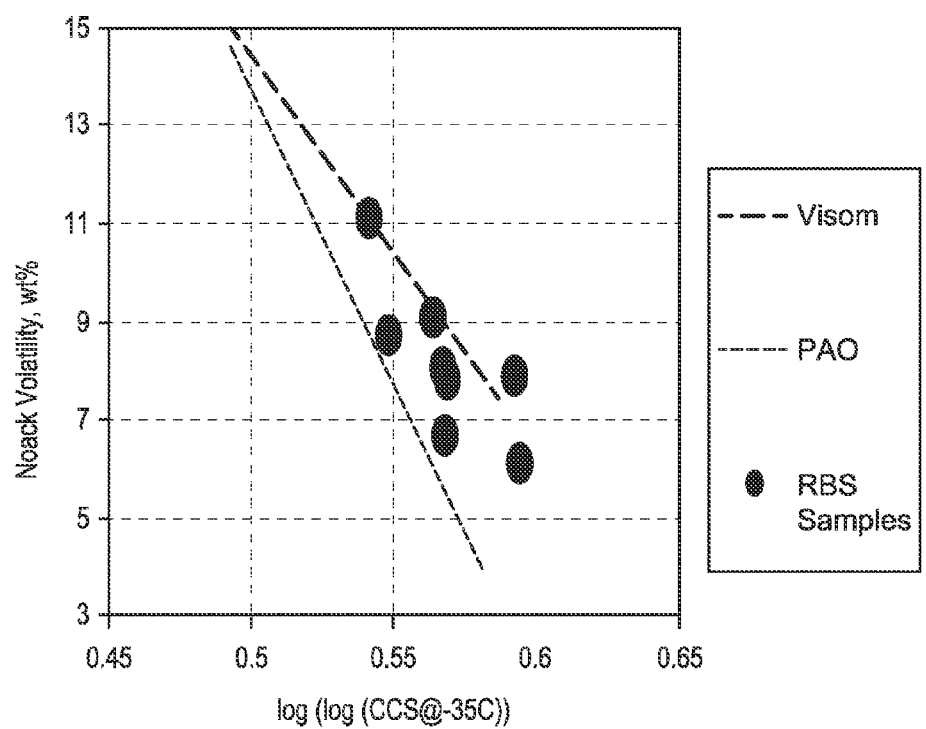
FIG. 13 is a plot of Noack volatility versus log(log(CCS viscosity at −35 deg. C.)) for inventive base stocks and prior art non-renewable Group III and Group IV base stocks.

Alternatively, the relationship between Noack volatility and CCS at –35 deg. C. for the lube base stocks of the present disclosure may be expressed by a Noack volatility of less than $(-79.8*\log_{10}(\log_{10}(\text{CCS viscosity @}-35°\text{ C.}))+54.26)$ and greater than $(-120*\log_{10}(\log_{10}(\text{CCS viscosity @}-35°\text{ C.}))+73.71)$ as depicted in FIG. 13. This plot demonstrates the Noack volatility of the inventive renewable base stocks of the present disclosure versus the Noack volatility of a Group III+ slate and PAO slate (Group IV) and shows that the inventive base stocks are better than the PAO slate and less than Group III+ slate in Noack volatility as a function of CCS viscosity.

The lube base stock prepared according to the present disclosure is hydrolytically more stable and it has a structure not decomposing under humid conditions, unlike the esters and other base stocks containing hetero-atoms, such as fatty alcohol dimers. In addition, the oxidation resistance of saturated hydrocarbons is better than that of corresponding base stocks containing unsaturated groups on the basis of fatty acid or fatty alcohol dimers, or ester base stocks. A saturated hydrocarbon component does not decompose as easily as esters that form corrosive acids. A non-polar and saturated hydrocarbon component is obtained using the process of the present disclosure by removing the oxygen of alcohols, esters, or carboxylic acids in the hydrogenation step as well as the hetero-atoms of any impurities of the feedstock. Oligomerizing carboxylic acid derivatives yield a structure having branches formed by carbon-carbon bonds following hydrogenation treatment. In oligomerization of $C_{12:1}$-$C_{20:1}$ feed, lengths of the obtained branches are typically from $C_3$ to $C_{11}$. Such hydrocarbons have very low pour points favorable for lube base stock applications, and thus the product is liquid at very low temperatures, and further, it has a superior viscosity index. The produced saturated hydrocarbon product is a suitable component of lubricant base stocks without any mixing limitations, and further, it is compatible with lubricant additives.

Pour point of the high quality lube base stock obtained with the process of the present disclosure is usually, much lower than comparable prior art lube base stock obtained from direct petroleum processing. Depending on viscosity, the biological lube base stock will have pour point less than –15° C., preferably less than –20° C., preferably less than –30° C., preferably less than –40° C., still more preferably less than –45° C., even more preferably less than –50° C., and accordingly, the lube base stock is very suitable for demanding low temperature conditions.

Method of Making Embodiments:

The present disclosure also provides processes for making lube base stocks and lubricant compositions with improved properties from renewable biological sources. In one embodiment, the method of making a lubricant composition includes the steps of: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160.

In another embodiment, the method of making a lubricant composition includes the steps of: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock has a $^{14}$C level ranging from 2 to 101% of the modern day $^{14}$C level in the atmosphere, and wherein the renewable lube base stock yields a CCS ratio (Cold Crank Simulator (CCS) viscosity to the predicted CCS viscosity by Walther equation) of less than or equal to 0.85 at –35° C.

Fatty acids derived from natural oils from plant or animal or algae sources can be dimerized to form dimer acids. Subsequently, the C=C double bonds in the dimer acids are saturated and the oxygen removed in the form of $CO_2$, CO, or $H_2O$ under a hydrogen atmosphere in a substantially single step. The resulting saturated hydrocarbon molecules have surprisingly excellent low temperature lubricating properties.

In the process of the present disclosure, the feed comprises one or more component(s) selected from the group consisting of triglycerides, carboxylic acids having carbon numbers from $C_4$ to $C_{38}$, esters of $C_4$ to $C_{38}$ carboxylic acids and $C_1$-$C_{11}$ alcohols, $C_4$-$C_{38}$ carboxylic acid anhydrides, and $C_4$-$C_{38}$ alcohols. The feedstock is preferably selected from the group consisting of triglycerides, fatty acids having carbon numbers from $C_4$ to $C_{24}$, esters of $C_{12}$ to $C_{24}$ fatty acids and $C_1$-$C_3$ alcohols, $C_{12}$-$C_{24}$ fatty acid anhydrides, and $C_{12}$-$C_{24}$ fatty alcohols, and mixtures thereof. The feedstock preferably originates from starting materials of biological origin, or mixtures thereof.

Suitable starting materials of biological origin are selected from the group consisting of: a) plant fats, plant oils, plant waxes; animal fats, animal oils, animal waxes; fish fats, fish oils, fish waxes, and mixtures thereof; and b) free fatty acids or fatty acids obtained by hydrolysis, acid transesterification or pyrolysis reactions from plant fats, plant oils, plant waxes, animal fats, animal oils, animal waxes, fish fats, fish oils, fish waxes, and mixtures thereof; and c) esters obtained by transesterification from plant fats, plant oils, plant waxes, animal fats, animal oils, animal waxes, fish fats, fish oils, fish waxes, and mixtures thereof, and d) esters obtained by esterification of free fatty acids of plant, animal and fish origin with alcohols, and mixtures thereof; and e) fatty alcohols obtained as reduction products of fatty acids from plant fats, plant oils, plant waxes, animal fats, animal oils, animal waxes, fish fats, fish oils, fish waxes, and mixtures thereof; and f) waste and recycled food grade fats and oils, and fats, oils and waxes obtained by genetic engineering, and mixtures thereof; and g) mixtures of said starting materials.

In this context, plants and animals also include algae and insects, respectively. The starting material of biological origin may also contain free carboxylic acids and/or esters of carboxylic acids, or oligomerization products of biological starting materials, without substantially interfering with the process. Suitable feed-stocks are also all compound types mentioned that are produced either totally or partly synthetically.

Advantageous starting natural oils for the processes of the present disclosure for making lube base stocks with improved low temperature properties should contain a relatively high amount of components having a single double bond in the fatty acid (e.g., mono-unsaturated fatty acids). Examples of the mono-unsaturated fatty acids include cis-5-dodecenoic acid, myristoleic acid (cis-9-tetradecenoic acid, C14:1), palmitoleic (cis-9-hexadecenoic acid, C16:1), oleic acid (cis-9-octadecenoic acid, C18:1), gadoleic acid (cis-11-eicosenoic acid C20:1), erucic acid (cis-13-docosenoic acid C22:1). Although most natural occurring oils contain cis-isomers of fatty acids, their trans-analogs occurred naturally or via isomerization process during treatment, such as hydrogenation, can also be used. Other odd carbon number mono-unsaturated acids, cis or trans form, although rare in natural products, can also be used. Generally, oils rich in the cis-form of the mono-unsaturated acids are most abundant in natural oils especially plant-based oils, and are the preferred feeds. For example, Canola oil, some rapeseed oil or some mustard oil contains 57%-60% monounsaturated fat, olive oil is has 75% monounsaturated fat while tea seed oil commonly contains over 80% monounsaturated fat. Oils that contain some di-unsaturated fatty acid moiety can also be used for the processes disclosed herein. For lube applications, it may be advantageous to use oils with low amount of di-unsaturated fatty acid moiety.

When choosing a feed from animal fats, it is advantageous to choose one that contains high percentages of mono-unsaturated fatty acids and low amounts of fully saturated fatty acid or multi-unsaturated fatty acid. Although animal fats, lard and oils can be used for this process, the yields to unsaturated fatty acids and the final synthetic hydrocarbon base stocks may be lower than from plant-based oils because most animal fats, such as beef fat, pork fat, and suet, contain higher amounts of saturated fats than plant-based oils.

Freshly produced plant-based oils or animal-based fats/oils can be used as starting material. Used or treated plant oil or animal fats/oils can also be used as starting material. The used plant oils can be obtained from food preparation, cooking, or other processes that recover or recycle used plant oils or animal fats/oils. Many of the used plant oils may contain partially hydrogenated plant oils. Thus, they may contain glycerides of the naturally occurring acids (mostly cis-acids) and also glycerides of the corresponding isomerized trans-acids. These trans-acids of mono- or di-unsaturated acids are also suitable for the processes of this disclosure. In order to optimize product yields, the impurities in the used plant oils, such as water, decomposed products, sludge, and carry-over component from the foods should be removed by pretreatments known in the art, such as settlement and decantation, clarification, passing through drying column and similar procedures.

The rapeseed oils, canola oils, mustard oils or olive oils usually are—triglycerides of long-chain fatty acid esters. In particular, suitable seed oils for this embodiment may include oils which have a significant amount of the glycerides of mono-unsaturated acids, such as myristoleic acid, palmitoleic, oleic, gadoleic, behenic, erucic, and lauroleic acids. These fatty acids are most suitable in this disclosure. Fatty acid compositions of common plant oils are listed in Table 2.

Soybean oil contains a relatively high amount of di-unsaturation in the form of linolenic acid in the fatty acid moiety. It can be used as a starting material for this process. However, the high content of di- or tri-unsaturated fatty acids is not as desirable as the mono-unsaturated acids or esters. There are many reports of utilizing a genetically modified soybean plant to produce soybean oil ["Genetic enhancement of soybean oil for industrial uses: prospects and challenges", by Edgar B. Cahoon, USDA Research Service, AgBioForum 6 (1&2): 11-13; at the 2003 AgBioForum, and references therein]. Such genetically modified soy beans can produce oil with very high amount of oleic acid moiety, sometimes as high as 85% oleic acid content, vs. 25% oleic acid content from the traditional, i.e., naturally occurring, soybean plant. Oils from these genetically modified soybean plant with high oleic content are most-suitable for the processes described herein.

TABLE 2

Compositions of Common Plant Oils

| (Cn:no. of double bonds) | Soybean Oil (wt %) | Canola Oil (wt %) | Rapeseed Oil (wt %) | Sunflower Oil (wt %) | H. Mustard 2 (wt %) |
|---|---|---|---|---|---|
| Myristic (14:0) | | | 0.1 | | |
| Palmitic (16:0) | 11.0 | 3.9 | 2.8 | 6.1 | 2.5 |
| Palmitoleic (16:1) | 0.1 | 0.2 | 0.2 | | |
| Stearic (18:0) | 4.0 | 1.9 | 1.3 | 5.3 | 2.4 |
| Oleic (18:1) | 23.4 | 64.1 | 23.8 | 21.4 | 56.3 |
| Linoleic (18:2) | 53.2 | 18.7 | 14.6 | 66.4 | 5.5 |
| Linolenic (18:3) | 7.8 | 9.2 | 7.3 | | 2.2 |
| Arachidic (20:0) | 0.3 | 0.6 | 0.7 | | |
| Gadoleic (20:1) | | 1.0 | 12.1 | | 4.5 |

TABLE 2-continued

Compositions of Common Plant Oils

| (Cn:no. of double bonds) | Soybean Oil (wt %) | Canola Oil (wt %) | Rapeseed Oil (wt %) | Sunflower Oil (wt %) | H. Mustard 2 (wt %) |
|---|---|---|---|---|---|
| Eicosadienoic (20:2) | | | 0.6 | | |
| Behenic (22:0) | 0.1 | 0.2 | 0.4 | | |
| Erucic (22:1) | | | 34.8 | | 20.7 |
| Others | | 0.2 | 1.3 | | |

In addition to the plant oils or animal fats/oils that can be used for these processes for making renewable biological based lube base stocks with improved low temperature properties, the fatty acid derivatives from plant oils or animal fats/oils can also be used herein. Examples of the derivatives include mono-esters derived from triglycerides (also known as mono-esters of the fatty acid moieties of the triglycerides). Methods of making such derivatives are known in the art, e.g., see Process Economic Program Report 251 "Biodiesel Production" by Stanford Research Institute (SRI), or U.S. Pat. Nos. 4,303,590; 5,354,878; and 5,525,126 and U.S. Patent Application Publication Nos. 2002/0010359 and 2003/0149289. Further examples of such derivatives include methyl esters of these fatty acids, commonly known as fatty acid methyl ester (FAME) or biodiesel, ethyl esters, propyl esters, and simple fatty acids. In the cases of the derivatives such as the methyl ester or unsaturated fatty acids, they can also be oligomerized to give oligomeric esters which can be converted into saturated hydrocarbons.

Since the purpose of the first step in the process is the oligomerization of components having double bonds, the feedstock preferably contains at least 10%, and more preferably at least 50%, by weight, of unsaturated and/or polyunsaturated compounds. The unsaturated compound can be mono- or poly-unsaturated, but is preferably a mono-unsaturated component, particularly preferably a $C_{16:1}$ and/or $C_{18:1}$ component present in the feedstock in concentrations of above 10%, and preferably above 40%, by weight.

Unsaturated fatty acids can be obtained from triglycerides in natural oil via hydrolysis. In a hydrolysis treatment, oils and fats react with water yielding free fatty acids and glycerol as the product. Three main processes for the industrial production of fatty acids are known: vapor splitting of triglycerides under high pressure, basic hydrolysis, and enzymatic hydrolysis. In the vapor splitting process, the hydrolysis of triglycerides using steam is carried out at temperatures between 100 and 300° C., under a pressure of 1-10 MPa, preferable conditions being from 250 to 260° C. and from 4 to 5.5 MPa. Metal oxides like zinc oxide may be added as the catalyst to accelerate the reaction.

In the processes for making renewable biological based lube base stocks with improved low temperature properties of the present disclosure, especially oligomerization reactions of materials of biological origin may be utilized in combination with hydrogenation reaction for the production of saturated hydrocarbons in a novel manner. For the oligomerization of unsaturated carboxylic acids and/or derivatives thereof, such as fatty acids, fatty acid esters, fatty alcohols, fatty acid anhydrides, and/or mixtures thereof, the monomers are converted into dimers with two monomers and/or into higher oligomers with three or more monomer units. In cases where starting materials of biological origin are used for the production of the lube base stocks with improved low temperature properties, it is necessary to extend the hydrocarbon chain length to reach the carbon number range required in the base stock applications, leaving predominantly carbon-carbon bonds in the main structure of the molecule. According to the disclosure, this is carried out by allowing the compounds having double bonds to react with each other, thus yielding hydrocarbons with carbon numbers in the range from $C_{20}$ to $C_{60}$. In the lube base stock applications, the carbon number range is typically from $C_{30}$ to $C_{50}$. In the oligomerization reaction, for instance, double bonds of the unsaturated fatty acid molecules react with each other, thus forming oligomers of fatty acids. For lube base stock applications, dimers of unsaturated fatty acids are the most preferable form, although trimers and tetramers are also formed and may be used. In case the feedstock contains polyunsaturated hydrocarbon chains, after oligomerization and hydrogenation treatment, greater amounts of trimers and hydrocarbons with ring structures are obtained than with monounsaturated hydrocarbon chains. Generally, it is preferable to use feed stock containing higher than 20% mono-unsaturated acid or ester, alternatively, higher than 40%, alternatively, higher than 50%, alternatively higher than 60% or alternatively high than 70%, alternatively higher than 80%, or alternatively greater than 90% mono-unsaturated acid or ester. Mixed unsaturated acid or esters, containing $C_{12}$, $C_{14}$, $C_{16}$, $C_{18}$, $C_{20}$, $C_{22}$, or $C_{24}$ unsaturated acid and/or esters can be used as feed. It is also preferable to choose the combination of the acids to give the average carbon number of feeds in the range of $C_{14}$ to $C_{22}$. This range of feeds will produce final lube base stocks with viscosity similar to Group IV base stock, ranging from 1 cSt at 100° C. to 100 cSt at 100° C. Unsaturated fatty acids can be used as starting materials. Corresponding unsaturated fatty esters and mixtures of fatty acid and esters can also be used as starting materials to give the same final product.

The unsaturated fatty acids obtained from hydrolysis of natural oils are oligomerized to form dimers and/or higher oligomers of unsaturated fatty acids. Oligomerization reactions are carried out with suitable catalysts at high temperature. Suitable catalysts include molecular sieves (both aluminosilicate zeolites and silicoaluminophosphates), amorphous aluminosilicates, cationic acidic clays, and other solid acid catalysts. According to International Zeolite Association (IZA) definitions, molecular sieves can be categorized according to the size of the pore opening. Examples of the molecular sieves can be of the large (>12-ring pore opening), medium (10-ring opening) or small (<8-ring pore opening) pore type. The molecular sieves structure types can be defined using three letter codes. Non-limiting examples of small pore molecular sieves include AEI, AFT, ANA, APC, ATN, ATT, ATV, AWW, BIK, CAS, CHA, CHI, DAC, DDR, EDI, ERI, GIS, GOO, KFI, LEV, LOV, LTA, MER, MON, PAU, PHI, RHO, ROG, SOD, THO, and substituted forms thereof. Non-limiting examples of medium pore molecular sieves include AFO, AEL, EUO, HEU, FER, MEL, MFI, MTW, MTT, MWW, TON, and substituted forms thereof. Non-limiting examples of large pore molecular sieves include BEA, CFI, CLO, DNO, EMT, FAU, LTL, MOR and substituted forms thereof. More preferred zeolite catalyst have a Si/Al molar ratio of greater than 2 and at least one dimension of the pore openings greater than or equal to 10-ring. Most preferred solid zeolites include ZSM-5 (MFI), zeolite beta (BEA), USY family zeolites (FAU), MCM-22, MCM-49, MCM-56 (MWW). Mesoporous materials with pore openings greater than 20 Å, such as the MCM-41 family and SBA-15 type with aluminum incorporated into the structure and thus possess acidity, can also be used as oligomerization catalysts. Acidic clays include acidic, natural or synthetic Montmorillonites, bentonite, silica clay, alumina clay or magnesia clay or silica-alumina clay. Commercially available acidic forms of Filtrol clays are also suitable for this oligomerization process. Other solid acid catalysts, such as activated $WO_x/ZrO_2$ catalysts, other metal oxides, Nafions or other acidic ion-exchanged resins, such as Dowex or Amberlyst cation exchanged are also suitable for the oligomerization reaction.

These oligomerization reactions can be carried out at 50° C. to 350° C., preferably 100° C. to 250° C., preferably 100° C. to 200° C. The reaction pressure can be atmospheric pressure to 500 psi. Atmospheric pressure or slightly above, up to 150 psi are convenient operating pressure. The reaction can also be carried out in the presence of small amount of hydrogen gas to prevent or improve catalyst aging and promote long catalyst lifetime. The hydrogen pressure can range from 1 psi to 300 psi, alternatively, 5 psi to 250 psi, alternatively 30 psi to 200 psi, and alternatively 50 to 250 psi. Optimum amount of hydrogen is used to reduce coke or deposit formation on catalyst, to promote long catalyst life time without significant hydrogenation of mono-unsaturated fatty acids. Furthermore, the presence of hydrogen may slightly reduce the di- or poly-unsaturated fatty acid. Thus, the presence of hydrogen may reduce the cyclic dimer or oligomer formation. This is beneficial for production of high paraffinic hydrocarbons at the end of the conversion. When solid catalyst is used, the reaction can be carried out in batch mode or in continuously stirred tank (CSTR) mode, or in fixed bed continuous mode. In a batch or CSTR mode, the amount of catalyst used may vary from less than 0.01% to 30 wt % of the feed, preferably 0.5 to 10 wt %, depending on reaction time or conversion level. The reaction time or residence time may vary from 5 minutes to 50 hours, preferably 20 minutes to 10 hours, preferably 30 minutes to 5 hours. The crude product can be isolated by filtration to remove the product. In fixed bed mode, the reaction residence time may vary from 5 minutes to 50 hours, preferably 20 minutes to 10 hours, more preferably 30 minutes to 5 hours; the weight hourly space velocity may vary from 0.2 g of feed/g of catalyst to 50 g of feed/g of catalyst, and preferably 0.3 to 10 g of feed/g of catalyst. The final conversion level varies from 10% to 100%, and alternatively from 20% to 90%. Usually high conversion is better. High conversion minimizes problems associated with product separation. In some instances, partial conversion, such as 50 to 80%, is preferred to prevent excessive formation of undesirable by-products.

The oligomerization reaction can also be catalyzed by homogeneous catalysts. Examples are hydrochloric acid, sulfuric acid, nitric acid, other small carboxylic acids or $BF_3$, promoted $BF_3$ catalysts, $AlCl_3$ or promoted $AlCl_3$ catalysts. When these homogeneous catalysts are used, 0.1 wt % to 10 wt % of catalyst may be used. Reaction temperatures for homogeneous acid catalyzed reaction range from 20° C. to 150° C. At the end of the reaction, these homogeneous acid catalysts are removed by aqueous wash or by adsorption by solid sorbents. The oligomerization reaction can also be catalyzed by the fatty acid itself when no other catalysts are added.

Generally, certain type of catalysts, such as shape-selective zeolites, the MCM-22 family (MWW), or the USY family (FAU), may impart unique control of the oligomerization reaction to favor the formation of dimer acid and minimize the formation of higher oligomers. The oligomerization by homogeneous catalysts, amorphous catalysts or clays may promote oligomerization to give higher degrees of oligomerization, such as trimers and tetramers. Furthermore, the proper choice of catalyst, catalyst pretreatment conditions, reaction temperature, and reaction time should help to minimize formation of cyclic dimer acid or ester, or hydrogen transfer reaction to produce poly-unsaturated starting acid or dimer acid and co-production of saturated starting acid. Formation of saturated starting acid will decrease the ultimate lube yields. Many clays, especially natural montmorillonite clay, can catalyze dimer formation with significantly higher amount of cyclic dimer formation. Molecular sieve catalysts can provide advantages of more dimerization and less cyclization. This improves the non-naphthene or paraffinic content of the finished lube base stock product.

The choice of catalyst is important for high conversion. Use of low cyclic oligomers and/or low hydrogen transfer yields saturated acid/esters, and, ultimately, high yields of final lubes with high desirable paraffinic content. Generally, molecular sieve material and clays of high silica to alumina ratio ($SiO_2/Al_2O_3$) are more desirable. The ratio of silica to alumina of these materials can range from 1 to 10,000. Typically, it is preferable to have a ratio of silica to alumina of from 2 to 5000, alternatively from 2 to 1000, alternatively from 2 to 500, alternatively from 4 to 1000, alternatively from 4 to 500, alternatively from 4 to 300, alternatively from 10 to 1000, or alternatively from 10 to 200. Higher silica to alumina ratio is generally equivalent to lower total number of acid sites. A lower total number of acid sites usually promotes the dimerization or oligomerization reaction and reduces the hydrogen transfer reaction, which reduces the formation of coke or very high molecular weight carbonaceous material, which prolongs catalyst lifetime and increase catalyst productivity.

Synthetic microporous materials are generally more preferable than naturally occurring clay materials because synthetic materials typically have a more controlled silica to alumina ratio and more controlled acid site density. Naturally occurring clay materials usually have very high density of acid sites, which promotes by-product formation and reduces catalyst productivity. Also, many naturally occurring clay materials have high amounts of other metal components, such as iron, calcium, and magnesium. These metals or oxides thereof promote by-product formation and reduce catalyst productivity.

In the processes of the current disclosure, the oligomerization products of unsaturated fatty acids or esters have less than 90% by weight of cyclic oligomers, preferably less than 80% by weight of cyclic oligomers, preferably less than 70% by weight of cyclic oligomers, preferably less than 60% by weight of cyclic oligomers, preferably less than 50% by weight of cyclic oligomers, preferably less than 40% by weight of cyclic oligomers, preferably less than 30% by weight of cyclic oligomers, preferably less than 20% by weight of cyclic oligomers, and still more preferably less than 10% by weight of cyclic oligomers. The products of the present disclosure may also have less than 3.0% by weight of cyclic oligomers, preferably less than 1.0% by weight of cyclic oligomers, and most preferably less than 0.1% by weight of cyclic oligomers.

The C=C double bond(s) in dimer acids can be saturated and the oxygen atoms removed in the form of $CO_2$ or CO or $H_2O$ in a single hydrogenation step. As used herein, the term "hydrogenation" is used to describe these conversions without specifically implying the actual reaction mechanisms or pathways. Alternatively, the term "hydro-deoxygenation" can be used to describe the conversion where the oxygen is substantially removed in the form of $H_2O$ and the double bonds are substantially saturated by hydrogen. Alternatively, the term "hydro-decarbonylation" can be used to describe the conversion where the oxygen is substantially removed in the form of CO and the double bonds are substantially saturated by hydrogen. Alternatively, the term "hydro-decarboxylation" can be used to describe the conversion where the oxygen is substantially removed in the form of $CO_2$ and the double bonds are substantially saturated by hydrogen.

In one process embodiment of this disclosure, the acid functionalities, i.e., carboxylic acid groups, are substantially removed in the form of $CO_2$ and double bonds are substantially saturated by hydrogen, in a single operation step. Consequently the term "hydro-decarboxylation" is used to describe the conversion. Removal of double bonds is inclusive of both aliphatic double bonds and aromatic double bonds. Hydro-decarboxylation can be carried out in a batch reactor such as an autoclave. The autoclave can have either static $H_2$ gas supply flow-through capability of $H_2$ gas. Hydrogen pressure should be greater than atmospheric, preferably greater than 1 MPa, more preferably higher than 3 MPa. Temperature for the reaction should be in the range from 100 to 500° C., preferably from 200 to 400° C., and more preferably from 250 to 350° C. Catalysts suitable for the conversion reaction include metals such as Mo, Re, Fe, Ru, Co, Rh, Ir, Ni, Pd, Pt, Cu, Zn, as well as binary or ternary mixtures thereof supported on silica, alumina, zirconia, clays such as Kieselguhr, amorphous aluminosilicates, or zeolites. More preferably, the catalysts include Mo, Co, Ni, Pd, Pt, and binary or ternary mixtures thereof supported on silica, alumina, amorphous aluminosilicates, or clays, especially Kieselguhr. Most preferably the catalysts are Ni supported on Kieselguhr, $CoMo/\gamma$-$Al_2O_3$, and $NiMo/\gamma$-$Al_2O_3$. Metal content in the catalyst ranges from 0.1 wt % to 70 wt % of the catalyst. Loading of the catalyst is 1-30% by weight of the dimer acids, preferably 2-20%, or more preferably 5-10% by weight. Duration of the reaction ranges from 1-48 hours, or 1-20 hours, or 12-36 hours, or 24-30 hours. This conversion step can be carried out in fixed bed reactor, continuous stir tank reactor, or batch reactor. In any of these operations, it is advantageous to maintain partial pressure of hydrogen above 300 psi, or above 400 psi, or above 500 psi, or above 600 psi, or above 700 psi. During conversion, if $CO_2$, CO or $H_2O$ are generated, they can be present as gaseous form, thus increasing the total reactor pressure. Under this condition, it is important to maintain hydrogen partial pressure. This can be achieved by intermittently purge of the reactor gas, re-charge with hydrogen gas in batch or CSTR operation. Or alternatively, as in fixed bed operation, this can be achieved by withdrawing reactor gas at different location along the in fixed bed reactor; by two-stage hydrogenation with withdrawing reactor gas in between stages, or alternatively by stage injection of hydrogen. Many other means to maintain hydrogen pressure is also possible.

The reaction time or residence time can range from 5 minutes to 50 hours depending on type of catalyst used, reaction temperature and the amount (wt %) of catalyst in reactor. It is preferred to have a residence time of 10 minutes to 10 hours. Shorter residence time gives better efficiency for reactor usage. Longer residence time ensures high conversion to pure hydrocarbons. Usually an optimized reactor time is most desirable.

In various process steps disclosed herein, hydrocarbons may be used as diluents in the feedstock. Hydrocarbon can be for instance from biological origin and boil in diesel fuel range between 150 and 400° C., typically between 180 and 360° C. Sometimes, non-biological originated solvent can also be used. This includes solvents derived from petroleum or coal.

Selection of the biological feedstock has a strong influence on the composition and boiling range of the lube base stock product. Moreover, the feed may be fractioned by distillation to fractions having narrow carbon numbers that may be tailored for different applications. For feed-stocks containing carbon number $C_n$, where n=12, 14, 16, 18, 20, 22, or 24, the final hydrocarbon products may contain the carbon number of $x*C_n$, $x*C_n-1$, $x*C_n-2$, and down to $x*C_n-x$ (* is the multiplication sign), where x is the degree of oligomerization and can be any integer in the range of 2-10, preferable be 2-5, more preferably 2-3, and most preferably 2. For feed-stocks containing mixtures of unsaturated fatty acids with carbon numbers $C_n$ and $C_m$, where n and m can be 12, 14, 16, 18, 20, 22, or 24, dimerization will lead to products with carbon number of $C_{2n}$, $C_{n+m}$, and $C_{2m}$. Subsequent hydrogenation treatment will give hydrocarbon products containing carbon numbers of $C_{2n}$, $C_{2n-1}$, $C_{2n-2}$, $C_{n+m}$, $C_{n+m-1}$, $C_{n+m-2}$, $C_{2m}$, $C_{2m-1}$, and $C_{2m-2}$.

In one embodiment of the current disclosure, feed-stocks having hydrocarbon chain lengths of $C_{16}$, $C_{18}$, $C_{20}$, and $C_{22}$ and mixtures thereof can be used, dimerization gives dimer acids with the carbon number range of $C_{32}$-$C_{44}$. Hydrogenation treatment of the dimer acids gives carbon numbers of the hydrocarbon products in the range of $C_{30}$-$C_{44}$. The low end carbon number $C_{30}$ is achieved by hydro-decarboxylation of the $C_{32}$ dimer acids, while the high end carbon number $C_{44}$ is achieved by hydro-deoxygenation of $C_{44}$ dimer acids. Since the distillation range of the product mainly depends on the hydrocarbon chain length, narrow product fractions are obtained.

The carbon number range of the renewable biological based lube base stocks produced by the oligomerization and hydrogenation or hydro-decarboxylation process of the disclosure is narrow. For example, starting from feed-stocks containing $C_{18}$ unsaturated fatty acids, the carbon numbers in the products range from $C_{33}$ to $C_{36}$.

The molecular mass of the renewable biological based lube base stock product may be adjusted according to carbon number ranges necessary for different applications by adding suitable unsaturated carboxylic acids or olefins to the feed-stock. Carboxylic acids having small molecules, or olefins cross-linking or oligomerizing with the fatty acids of triglycerides form short branches on the main hydrocarbon chain of the fatty acid. In case other natural cyclic compounds such as alpha pinene are used as additional components of the feed-stock, molecules having ring structures in the side chain within the molecular chain are obtained. One or two additional components are preferably oligomerized in the product. According to the disclosure, corresponding lube base stock products tailored with respect to hydrocarbon chain lengths may also be produced from other carboxylic acids and from other biological components with short chains.

It was surprisingly found that with the processes of the present disclosure comprising oligomerization and hydro-decarboxylation steps, high-quality lube base stocks with improved low temperature properties may be produced from unsaturated carboxylic acids containing hetero-atoms, and from derivatives thereof, particularly from fatty acids, fatty acid esters, fatty alcohols, respective fatty acid anhydrides of biological origin, and/or mixtures thereof. The problems of the prior art processes and products obtained therewith may be avoided, or at least substantially reduced by means of the processes of the present disclosure.

Lubricant Composition Embodiments:

The lube base stocks from renewable biological sources of the present disclosure are well suited as lube base stocks without blending limitations, and further, the lube base stock products are also compatible with lubricant additives for lubricant formulations. In one embodiment, the lubricant composition of the present disclosure includes from 20 to 99.8 wt. % of a lube base stock produced from a renewable biological source and an effective amount of one or more lubricant additives. For the purposes of the present disclosure, an effective amount of one or more lubricant additives may range from 0.1 to 30 wt. %, or 0.2 to 20 wt. %, or 1 to 15 wt. %, or 2 to 12 wt. % of the total lubricant composition. Alternatively, the lube base stock produced from a renewable biological source may range from 30 to 99 wt. %, or 40 to 98 wt. %, or 50 to 95 wt. % of the total lubricant composition. In one form, the lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160. In another form, the lube base stock produced from a renewable biological source has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

The lubricant compositions of the present disclosure may have a kinematic viscosity at 100° C. ranging from 1 to 100 cSt, or 2 to 20 cSt, or alternatively 2 to 10 cSt, or alternatively 3 to 20 cSt, or alternatively 2 to 40 cSt, or alternatively 4 to 10 cSt, or alternatively 4 to 20 cSt, or alternatively 4 to 8 cSt, alternatively 15 to 100 cSt, or alternatively 20 to 80 cSt. The lubricant compositions of the present disclosure may have a Viscosity Index of at least 80, or at least 90, or at least 100, or at least 110 as determined by the method of ASTM D 2270. The viscosity index of the product may be as high as 160, the product thus being suitable in base oil applications for any one of API Group I to Group V. More particularly, the lubricant compositions of the present disclosure may have a viscosity index ranging from 80 to 160, or 90 to 150, or 100 to 140, or 110 to 130. The lubricant composition of the present disclosure includes a lube base stock from a renewable biological source having a Noack volatility of less than 10 wt. % for a viscosity of at least 4 cSt and having a pour point less than −15° C. Further ranges for the components and properties of the lube base stock are included in the above lube base stocks from renewable biological sources section of the present application.

The lubricant composition of the present disclosure yields a CCS viscosity-Noack volatility relationship at least 5%, or at least 10%, or at least 15%, or at least 20%, or at least 25% lower than the same lubricant composition including an API Group II lube base stock made from a non-renewable petroleum based source. The lubricant composition of the present disclosure yields a solvency measured by aniline point of less than 120, or less than 115, or less than 112 deg, or less than 110, or less than 107 deg. C. Moreover, the lubricant composition of the present disclosure yields a % thickening when blended with a 7 wt. % of a styrene-isoprene star polymer viscosity modifier of at least 140%, or at least 143%, or at least 146%, or at least 150%, or at least 155%, or at least 160%, or at least 162%. Alternatively, the lubricant composition of the present disclosure yields a % thickening when blended with a 7 wt. % of a viscosity modifier of at least 2%, or at least 4%, or at least 6%, or at least 8%, or at least 10%, or at least 15%, or at least 20% greater than a comparable Group III or IV lubricant composition made from a non-renewable petroleum based source. The amount of the viscosity modifier may range from 4 to 10 wt. %, or 6 to 8 wt. %, or may be 7 wt. %. The wt. % for the viscosity modifier is for a viscosity modifier concentrate wt. % in the total lubricant composition. The concentrate includes from 80 to 90 wt. % of the viscosity modifier polymer in a base oil based on the total weight of the viscosity modifier concentrate. Non-limiting exemplary viscosity modifier polymers include styrene-isoprene star polymer, ethylene propylene copolymer and polymethacyrlates.

The biological based lubricant composition of the present disclosure can optionally be blended with other lube base stocks to form lubricants. Useful co-base lube stocks include Group I, II, III, IV and V base oils and gas-to-liquid (GTL) oils from non-renewable fossil based sources. One or more of the co-base stocks may be blended into a lubricant composition including the lube base stock from a biological renewable source at from 2 to 80 wt. %, or 5 to 75 wt. %, or 10 to 70 wt. %, or 20 to 60 wt. %, or 30 to 50 wt. % based on the total weight of the lubricating oil composition.

The biological based lubricant compositions of the present disclosure also include one or more lubricant additives, such as antioxidants, stabilizers, detergents, dispersants, demulsifiers, antioxidants, anti-wear additives, pour point depressants, viscosity index modifiers, friction modifiers, anti-foam additives, defoaming agents, corrosion inhibitors, wetting agents, rust inhibitors, copper passivators, metal deactivators, extreme pressure additives, and the like. The additives are incorporated with the biological based lube base stocks of the present disclosure to make a finished lubricant that has desired viscosity and physical properties. Typical additives used in lubricant formulation can be found in the book "Lubricant Additives, Chemistry and Applications", Ed. L. R. Rudnick, Marcel Dekker, Inc. 270 Madison Ave. New York, N.J. 10016, 2003.

When lubricating oil compositions contain one or more of the additives discussed above, the additive(s) are blended into the composition in an amount effective for it to perform its intended function. Typical amounts of such lubricant additives useful in the present disclosure are shown in Table 3 below. The total of the additional additives in the lubricating oil composition may range from 0.05 to 50 wt. %., or 0.1 to 40 wt. %, or 0.2 to 20 wt. %, or 0.5 to 15 wt. %, or 1 to 15 wt. %, or 2 to 12 wt. %, or 4 to 10 wt. %, or 5 to 8 wt. % of the total lubricant composition. Note that many of the additives are shipped from the manufacturer and used with a certain amount of base oil solvent in the formulation. Accordingly, the weight amounts in the table below, as well as other amounts mentioned in this patent, unless otherwise indicated are directed to the amount of active ingredient (that is the non-solvent portion of the ingredient). The wt. % indicated below are based on the total weight of the lubricating oil composition. The additives listed below are non-limiting examples and are not intended to limit the claims.

TABLE 3

| Typical Amounts of Various Lubricant Oil Components | | |
|---|---|---|
| Compound | Approximate wt % (useful) | Approximate wt % (preferred) |
| Detergent | 0.01-6 | 0.01-4 |
| Dispersant | 0.1-20 | 0.1-8 |
| Friction Reducer | 0.01-5 | 0.01-1.5 |
| Antioxidant | 0.0-5 | 0.0-1.5 |
| Corrosion Inhibitor | 0.01-5 | 0.01-1.5 |
| Anti-wear Additive | 0.01-6 | 0.01-4 |
| Pour Point Depressant | 0.0-5 | 0.01-1.5 |
| Anti-foam Agent | 0.001-3 | 0.001-0.15 |
| Base stock(s) or base oil(s) or co-base stock(s) | Balance | Balance |

A. Dispersants:

Dispersants should contain the alkenyl or alkyl group R has an Mn value of 500 to 5000 and an Mw/Mn ratio of 1 to 5. The preferred Mn intervals depend on the chemical nature of the agent improving filterability. Polyolefinic polymers suitable for the reaction with maleic anhydride or other acid materials or acid forming materials, include polymers containing a predominant quantity of $C_2$ to $C_5$ monoolefins, for example, ethylene, propylene, butylene, isobutylene and pentene. A highly suitable polyolefinic polymer is polyisobutene. The succinic anhydride preferred as a reaction substance is PIBSA, that is, polyisobutenyl succinic anhydride.

If the dispersant contains a succinimide comprising the reaction product of a succinic anhydride with a polyamine, the alkenyl or alkyl substituent of the succinic anhydride serving as the reaction substance consists preferably of polymerized isobutene having an Mn value of 1200 to 2500. More advantageously, the alkenyl or alkyl substituent of the succinic anhydride serving as the reaction substance consists in a polymerized isobutene having an Mn value of 2100 to 2400. If the agent improving filterability contains an ester of succinic acid comprising the reaction product of a succinic anhydride and an aliphatic polyhydric alcohol, the alkenyl or alkyl substituent of the succinic anhydride serving as the reaction substance consists advantageously of a polymerized isobutene having an Mn value of 500 to 1500. In preference, a polymerized isobutene having an Mn value of 850 to 1200 is used.

Amides suitable uses of amines include antiwear agents, extreme pressure additives, friction modifiers or Dispersants. The amides which are utilized in the compositions of the present invention may be amides of mono- or polycarboxylic acids or reactive derivatives thereof. The amides may be characterized by a hydrocarbyl group containing from 6 to 90 carbon atoms; each is independently hydrogen or a hydrocarbyl, aminohydrocarbyl, hydroxyhydrocarbyl or a heterocyclic-substituted hydrocarbyl group, provided that both are not hydrogen; each is, independently, a hydrocarbylene group containing up to 10 carbon atoms; Alk is an alkylene group containing up to 10 carbon atoms.

The amide can be derived from a monocarboxylic acid, a hydrocarbyl group containing from 6 to 30 or 38 carbon atoms and more often will be a hydrocarbyl group derived from a fatty acid containing from 12 to 24 carbon atoms.

The amide is derived from a di- or tricarboxylic acid, will contain from 6 to 90 or more carbon atoms depending on the type of polycarboxylic acid. For example, when the amide is derived from a dimer acid, will contain from 18 to 44 carbon atoms or more, and amides derived from trimer acids generally will contain an average of from 44 to 90 carbon atoms. Each is independently hydrogen or a hydrocarbyl, aminohydrocarbyl, hydroxyhydrocarbyl or a heterocyclic-substituted hydrocarbon group containing up to 10 carbon atoms. It may be independently heterocyclic substituted hydrocarbyl groups wherein the heterocyclic substituent is derived from pyrrole, pyrroline, pyrrolidine, morpholine, piperazine, piperidine, pyridine, pipecoline, etc. Specific examples include methyl, ethyl, n-propyl, n-butyl, n-hexyl, hydroxymethyl, hydroxyethyl, hydroxypropyl, amino-methyl, aminoethyl, aminopropyl, 2-ethylpyridine, 1-ethylpyrrolidine, 1-ethylpiperidine, etc.

The alkyl group can be an alkylene group containing from 1 to 10 carbon atoms. Examples of such alkylene groups include, methylene, ethylene, propylene, etc. Also are hydrocarbylene groups, and in particular, alkylene group containing up to 10 carbon atoms. Examples of such hydrocarbylene groups include, methylene, ethylene, propylene, etc. The amide contains at least one morpholinyl group. In one embodiment, the morpholine structure is formed as a result of the condensation of two hydroxy groups which are attached to the hydrocarbylene groups. Typically, the amides are prepared by reacting a carboxylic acid or reactive derivative thereof with an amine which contains at least one >NH group.

Aliphatic monoamines include mono-aliphatic and di-aliphatic-substituted amines wherein the aliphatic groups may be saturated or unsaturated and straight chain or branched chain. Such amines include, for example, mono- and di-alkyl-substituted amines, mono- and dialkenyl-substituted amines, etc. Specific examples of such monoamines include ethyl amine, diethyl amine, n-butyl amine, di-n-butyl amine, isobutyl amine, coco amine, stearyl amine, oleyl amine, etc. An example of a cycloaliphatic-substituted aliphatic amine is 2-(cyclohexyl)-ethyl amine. Examples of heterocyclic-substituted aliphatic amines include 2-(2-aminoethyl)-pyrrole, 2-(2-aminoethyl)-1-methylpyrrole, 2-(2-aminoethyl)-1-methylpyrrolidine and 4-(2-aminoethyl)morpholine, 1-(2-aminoethyl)piperazine, 1-(2-aminoethyl)piperidine, 2-(2-aminoethyl)pyridine, 1-(2-aminoethyl)pyrrolidine, 1-(3-aminopropyl)imidazole, 3-(2-aminopropyl)indole, 4-(3-aminopropyl)morpholine, 1-(3-aminopropyl)-2-pipecoline, 1-(3-aminopropyl)-2-pyrrolidinone, etc.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexyl-amines, phenyl-substituted cyclopentylamines, and pyranyl-substituted cyclohexylamine.

Aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include aniline, di-(para-methylphenyl)amine, naphthylamine, N-(n-butyl)-aniline, and the like. Examples of aliphatic-substituted, cycloaliphatic-substituted, and heterocyclic-substituted aromatic monoamines are para-ethoxyaniline, para-dodecylaniline, cyclohexyl-substituted naphthylamine, variously substituted phenathiazines, and thienyl-substituted aniline.

Polyamines are aliphatic, cycloaliphatic and aromatic polyamines analogous to the above-described monoamines except for the presence within their structure of additional amino nitrogens. The additional amino nitrogens can be primary, secondary or tertiary amino nitrogens. Examples of such polyamines include N-amino-propyl-cyclohexylamines, N,N'-di-n-butyl-paraphenylene diamine, bis-(para-aminophenyl)methane, 1,4-diaminocyclohexane, and the like.

The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutyl-amine, diethanolamine, di-(2-hydroxyamine, N-(hydroxypropyl)-propylamine, N-(2-methyl)-cyclohexylamine, 3-hydroxycyclopentyl parahydroxyaniline, N-hydroxyethal piperazine and the like.

In one embodiment, the amines useful in the present disclosure are alkylene polyamines including hydrogen, or a hydrocarbyl, amino hydrocarbyl, hydroxyhydrocarbyl or heterocyclic-substituted hydrocarbyl group containing up to 10 carbon atoms, Alk is an alkylene group containing up to 10 carbon atoms, and is 2 to 10. Preferably, Alk is ethylene or propylene. Usually, a will have an average value of from 2 to 7. Examples of such alkylene polyamines include methylene polyamines, ethylene polyamines, butylene polyamines, propylene polyamines, pentylene polyamines, hexylene polyamines, heptylene polyamines, etc.

Alkylene polyamines include ethylene diamine, triethylene tetramine, propylene diamine, trimethylene diamine, hexamethylene diamine, decamethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene)triamine, and the like. Higher homologs as are obtained by condensing two or more of the above-illustrated alkylene amines are useful, as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27-39, Interscience Publishers, Division of John Wiley and Sons, 1965, which is hereby incorporated by reference for the disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms." In general, alkylene polyamine bottoms can be characterized as having less than 2, usually less than 1% (by weight) material boiling below 200° C. In the instance of ethylene polyamine bottoms, which are readily available and found to be quite useful, the bottoms contain less than 2% (by weight) total diethylene triamine (DETA) or triethylene tetramine (TETA). A typical sample of such ethylene polyamine bottoms obtained from the Dow Chemical Company of Freeport, Tex. designated "E-100". Gas chromatography analysis of such a sample showed it to contain 0.93% "Light Ends" (most probably DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylene triamine, triethylene tetramine and the like.

The dispersants are selected from: Mannich bases that are condensation reaction products of a high molecular weight phenol, an alkylene polyamine and an aldehyde such as formaldehyde, succinic-based dispersants that are reaction products of a olefin polymer and succinic acylating agent (acid, anhydride, ester or halide) further reacted with an organic hydroxy compound and/or an amine, High molecular weight amides and esters such as reaction products of a hydrocarbyl acylating agent and a polyhydric aliphatic alcohol (such as glycerol, pentaerythritol or sorbitol). Ashless (metal-free) polymeric materials that usually contain an oil soluble high molecular weight backbone linked to a polar functional group that associates with particles to be dispersed are typically used as dispersants. Zinc acetate capped, also any treated dispersant, which include borated, cyclic carbonate, end-capped, polyalkylene maleic anhydride and the like; mixtures of some of the above, in treat rates that range from 0.1% up to 10-20% or more. Commonly used hydrocarbon backbone materials are olefin polymers and copolymers, i.e.—ethylene, propylene, butylene, isobutylene, styrene; there may or may not be further functional groups incorporated into the backbone of the polymer, whose molecular weight ranges from 300 to 5000. Polar materials such as amines, alcohols, amides or esters are attached to the backbone via a bridge.

B. Antioxidants

Antioxidants include sterically hindered alkyl phenols such as 2,6-di-tert-butylphenol, 2,6-di-tert-butyl-p-cresol and 2,6-di-tert-butyl-4-(2-octyl-3-propanoic) phenol; N,N-di (alkylphenyl) amines; and alkylated phenylene-diamines.

The antioxidant component may be a hindered phenolic antioxidant such as butylated hydroxytoluene, suitably present in an amount of 0.01 to 5%, preferably 0.4 to 0.8%, by weight of the lubricant composition. Alternatively, or in addition, component b) may comprise an aromatic amine antioxidant such as mono-octylphenylalphanapthylamine or p,p-dioctyldiphenylamine, used singly or in admixture. The amine anti-oxidant component is suitably present in a range of from 0.01 to 5% by weight of the lubricant composition, more preferably 0.5 to 1.5%.

A sulfur-containing antioxidant may be any and every antioxidant containing sulfur, for example, including dialkyl thiodipropionates such as dilauryl thiodipropionate and distearyl thiodipropionate, dialkyldithiocarbamic acid derivatives (excluding metal salts), bis(3,5-di-t-butyl-4-hydroxybenzyl)sulfide, mercaptobenzothiazole, reaction products of phosphorus pentoxide and olefins, and dicetyl sulfide. Of these, preferred are dialkyl thiodipropionates such as dilauryl thiodipropionate and distearyl thiodipropionate. The amine-type antioxidant includes, for example, monoalkyldiphenylamines such as monooctyldiphenylamine and mononylyl-diphenylamine; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine and 4,4'-dinonyldiphenylamine; polyalkyldiphenylamines such as tetrabutyldiphenylamine, tetrahexyldiphenylamine, tetraoctyldiphenylamine and tetranonyldiphenylamine; and naphthylamines such as α-naphthylamine, phenyl-α-naphthylamine, butylphenyl-α-naphthylamine, pentylphenyl-α-naphthylamine, hexylphenyl-α-naphthylamine, heptylphenyl-α-naphthylamine, octylphenyl-α-naphthylamine and nonylphenyl-α-naphthylamine. Of these, preferred are dialkyldiphenylamines. The sulfur-containing antioxidant and the amine-type antioxidant are added to the base oil in an amount of from 0.01 to 5% by weight, preferably from 0.03 to 3% by weight, relative to the total weight of the composition.

The oxidation inhibitors that are particularly useful in lube compositions of the disclosure are the hindered phenols (e.g., 2,6-di-(t-butyl)phenol); aromatic amines (e.g., alkylated diphenyl amines); alkyl polysulfides; selenides; borates (e.g., epoxide/boric acid reaction products); phosphorodithioic acids, esters and/or salts; and the dithiocarbamate (e.g., zinc dithiocarbamates). These oxidation inhibitors as well as the oxidation inhibitors discussed above the preferably of the invention at levels of 0.05% to 5%, more preferably 0.25 to 2% by weight based on the total weight of such compositions; with ratios of amine/phenolic to be from 1:10 to 10:1 of the mixtures preferred.

The oxidation inhibitors that are also useful in lube compositions of the invention are chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)(phosphorodithioate, cadmium dinonylphosphorodithioate, and the reaction of phosphorus pentasulfide with an equimolar mixture of isopropyl alcohol, 4-methyl-2-pentanol, and n-hexyl alcohol.

Oxidation inhibitors, organic compounds containing sulfur, nitrogen, phosphorus and some alkylphenols are also employed. Two general types of oxidation inhibitors are those that react with the initiators, peroxy radicals, and hydroperoxides to form inactive compounds, and those that decompose these materials to form less active compounds. Examples are hindered (alkylated) phenols, e.g. 6-di(tert-butyl)-4-methylphenol[2,6-di(tert-butyl)-p-cresol, DBPC], and aromatic amines, e.g. N-phenyL-α-naphthalamine. These are used in turbine, circulation, and hydraulic oils that are intended for extended service.

Examples of amine-based antioxidants include dialkyldiphenylamines such as p,p'-dioctyldiphenylamine (manufactured by the Seiko Kagaku Co. under the trade designation "Nonflex OD-3"), p,p'-di-.alpha.-methylbenzyl-diphenylamine and N-p-butylphenyl-N-p'-octylphenylamine; monoalkyldiphenylamines such as mono-t-butyldiphenylamine, and monooctyldiphenylamine; bis(dialkylphenyl) amines such as di(2,4-diethylphenyl)amine and di(2-ethyl-4-nonylphenyl)amine; alkylphenyl-1-naphthylamines such as octylphenyl-1-naphthylamine and N-t-dodecylphenyl-1-naphthylamine; arylnaphthylamines such as 1-naphthylamine, phenyl-1-naphthylamine, phenyl-2-naphthylamine, N-hexylphenyl-2-naphthylamine and N-octylphenyl-2-naphthylamine, phenylenediamines such as N,N'-diisopropyl-p-phenylenediamine and N,N'-diphenyl-p-phenylenediamine, and phenothiazines such as phenothiazine (manufactured by the Hodogaya Kagaku Co.: Phenothiazine) and 3,7-dioctylphenothiazine.

Examples of sulphur-based antioxidants include dialkylsulphides such as didodecylsulphide and dioctadecylsulphide; thiodipropionic acid esters such as didodecyl thiodipropionate, dioctadecyl thiodipropionate, dimyristyl thiodipropionate and dodecyloctadecyl thiodipropionate, and 2-mercaptobenzimidazole.

Examples of phenol-based antioxidants include 2-t-butylphenol, 2-t-butyl-4-methylphenol, 2-t-butyl-5-methylphenol, 2,4-di-t-butylphenol, 2,4-dimethyl-6-t-butylphenol, 2-t-butyl-4-methoxyphenol, 3-t-butyl-4-methoxyphenol, 2,5-di-t-butylhydroquinone (manufactured by the Kawaguchi Kagaku Co. under trade designation "Antage DBH"), 2,6-di-t-butylphenol and 2,6-di-t-butyl-4-alkylphenols such as 2,6-di-t-butyl-4-methylphenol and 2,6-di-t-butyl-4-ethylphenol; 2,6-di-t-butyl-4-alkoxyphenols such as 2,6-di-t-butyl-4-methoxyphenol and 2,6-di-t-butyl-4-ethoxyphenol, 3,5-di-t-butyl-4-hydroxybenzylmercaptoocty-1 acetate, alkyl-3-(3,5-di-t-butyl-4-hydroxyphenyl)propionates such as n-octyl-3-(3,5-di-t-butyl-4-hydroxyphenyl)propionate (manufactured by the Yoshitomi Seiyaku Co. under the trade designation "Yonox SS"), n-dodecyl-3-(3,5-di-t-butyl-4-hydroxyphenyl) propionate and 2'-ethylhexyl-3-(3,5-di-t-butyl-4-hydroxyphenyl)propionate; 2,6-di-t-butyl-.alpha.-dimethylamino-p-cresol, 2,2'-methylenebis(4-alkyl-6-t-butylphenol) compounds such as 2,2'-methylenebis(4-methyl-6-t-butylphenol) (manufactured by the Kawaguchi Kagaku Co. under the trade designation "Antage W-400") and 2,2'-methylenebis(4-ethyl-6-t-butylphenol) (manufactured by the Kawaguchi Kagaku Co. under the trade designation "Antage W-500"); bisphenols such as 4,4'-butylidenebis(3-methyl-6-t-butyl-phenol) (manufactured by the Kawaguchi Kagaku Co. under the trade designation "Antage W-300"), 4,4'-methylenebis(2,6-di-t-butylphenol) (manufactured by Laporte Performance Chemicals under the trade designation "Ionox 220AH"), 4,4'-bis(2,6-di-t-butylphenol), 2,2-(di-p-hydroxyphenyl)propane (Bisphenol A), 2,2-bis(3,5-di-t-butyl-4-hydroxyphenyl)propane, 4,4'-cyclohexylidenebis(2,6-di-t-butylphenol), hexamethylene glycol bis[3, (3,5-di-t-butyl-4-hydroxyphenyl)propionate](manufactured by the Ciba Speciality Chemicals Co. under the trade designation "Irganox L109"), triethylene glycol bis[3-(3-t-butyl-4-hydroxy-5-methylphenyl)propionate](manufactured by the Yoshitomi Seiyaku Co. under the trade designation "Tominox 917"), 2,2'-thio[diethyl-3-(3,5-di-t-butyl-4-hydroxyphenyl)propionate](manufactured by the Ciba Speciality Chemicals Co. under the trade designation "Irganox L115"), 3,9-bis{1,1-dimethyl-2-[3-(3-t-butyl-4-hydroxy-5-methylphenyl)-propionylo-xy]ethyl}2,4,8,10-tetraoxaspiro[5,5]undecane (manufactured by the Sumitomo Kagaku Co. under the trade designation "Sumilizer GA80") and 4,4'-thiobis(3-methyl-6-t-butylphenol) (manufactured by the Kawaguchi Kagaku Co. under the trade designation "Antage RC"), 2,2'-thiobis(4,6-di-t-butylresorcinol); polyphenols such as tetrakis[methylene-3-(3,5-di-t-butyl-4-hydroxyphenyl)propionato]methane (manufactured by the Ciba Speciality Chemicals Co. under the trade designation "Irganox L101"), 1,1,3-tris(2-methyl-4-hydroxy-5-t-butylpheny-1)butane (manufactured by the Yoshitomi Seiyaku Co. under the trade designation "Yoshinox 930"), 1,3,5-trimethyl-2,4,6-tris(3,5-di-t-butyl-4-hydroxybenzyl)benzene (manufactured by Ciba Speciality Chemicals under the trade designation "Irganox 330"), bis[3, 3'-bis(4'-hydroxy-3'-t-butylpheny-1)butyric acid]glycol ester, 2-(3',5'-di-t-butyl-4-hydroxyphenyl)-methyl-4-(2",4"-di-t-butyl-3"-hydroxyphenyl)methyl-6-t-butylphenol and 2,6-bis(2'-hydroxy-3'-t-butyl-5'-methylbenzyl)-4-methylphenol; and phenol/aldehyde condensates such as the condensates of p-t-butylphenol and formaldehyde and the condensates of p-t-butylphenol and acetaldehyde.

C. VI Improvers and Pour Point Depressants:

Viscosity index improvers and/or the pour point depressant include polymeric alkylmethacrylates and olefinic copolymers such as an ethylene-propylene copolymer or a styrene-butadiene copolymer or polyalkene such as PIB. Viscosity index improvers (VI improvers), high molecular weight polymers that increase the relative viscosity of an oil at high temperatures more than they do at low temperatures. The most common VI improvers are methacrylate polymers and copolymers, acrylate polymers, olefin polymers and copolymers, and styrene-butadiene copolymers.

Other examples of the viscosity index improver include polymethacrylate, polyisobutylene, alpha-olefin polymers, alpha-olefin copolymers (e.g., an ethylene-propylene copolymer), polyalkylstyrene, phenol condensates, naphthalene condensates, a styrenebutadiene copolymer and the like. Of these, polymethacrylate having a number average molecular weight of 10,000 to 300,000, and α-olefin polymers or α-olefin copolymers having a number average molecular weight of 1,000 to 30,000, particularly ethylene-α-olefin copolymers having a number average molecular weight of 1,000 to 10,000 are preferred.

The viscosity index increasing agents which can be used include, for example, polymethacrylates and ethylene/propylene copolymers, other non-dispersion type viscosity index increasing agents such as olefin copolymers like styrene/diene copolymers, and dispersible type viscosity index increasing agents where a nitrogen containing monomer has been copolymerized in such materials. These materials can be added and used individually or in the form of mixtures, conveniently in an amount within the range of from 0.05 to 20 parts by weight per 100 parts by weight of base oil.

Pour point depressors (PPD) include polymethacrylates. Commonly used additives such as alkylaromatic polymers and polymethacrylates are useful for this purpose; typically the treat rates range from 0.001% to 1.0%.

D. Detergents:

Detergents include calcium alkylsalicylates, calcium alkylphenates and calcium alkarylsulfonates with alternate metal ions used such as magnesium, barium, or sodium. Examples of the cleaning and dispersing agents which can be used include metal-based detergents such as the neutral and basic alkaline earth metal sulphonates, alkaline earth metal phenates and alkaline earth metal salicylates alkenylsuccinimide and alkenylsuccinimide esters and their borohydrides, phenates, salienius complex detergents and ashless dispersing agents which have been modified with sulphur compounds. These agents can be added and used individually or in the form of mixtures, conveniently in an amount within the range of from 0.01 to 1 part by weight per 100 parts by weight of base oil; these can also be high TBN, low TBN, or mixtures of high/low TBN.

E. Anti-Rust Additives:

Anti-rust additives include (short-chain) alkenyl succinic acids, partial esters thereof and nitrogen-containing derivatives thereof; and synthetic alkarylsulfonates, such as metal dinonylnaphthalene sulfonates. Anti-rust agents include, for example, monocarboxylic acids which have from 8 to 30 carbon atoms, alkyl or alkenyl succinates or partial esters thereof, hydroxy-fatty acids which have from 12 to 30 carbon atoms and derivatives thereof, sarcosines which have from 8 to 24 carbon atoms and derivatives thereof, amino acids and derivatives thereof, naphthenic acid and derivatives thereof, lanolin fatty acid, mercapto-fatty acids and paraffin oxides.

Particularly preferred anti-rust agents are indicated below. Examples of Monocarboxylic Acids ($C_8$-$C_{30}$), Caprylic acid, pelargonic acid, decanoic acid, undecanoic acid, lauric acid, myristic acid, palmitic acid, stearic acid, arachic acid, behenic acid, cerotic acid, montanic acid, melissic acid, oleic acid, docosanic acid, erucic acid, eicosenic acid, beef tallow fatty acid, soy bean fatty acid, coconut oil fatty acid, linolic acid, linoleic acid, tall oil fatty acid, 12-hydroxystearic acid, laurylsarcosinic acid, myritsylsarcosinic acid, palmitylsarcosinic acid, stearylsarcosinic acid, oleylsarcosinic acid, alkylated ($C_8$-$C_{20}$) phenoxyacetic acids, lanolin fatty acid and $C_8$-$C_{24}$ mercapto-fatty acids.

Examples of Polybasic Carboxylic Acids: The alkenyl (C10-C100) succinic acids indicated in CAS No. 27859-58-1 and ester derivatives thereof, dimer acid, N-acyl-N-alkyloxyalkyl aspartic acid esters (U.S. Pat. No. 5,275,749). Examples of the alkylamines which function as antirust additives or as reaction products with the above carboxylates to give amides and the like are represented by primary amines such as laurylamine, coconut-amine, n-tridecylamine, myristylamine, n-pentadecylamine, palmitylamine, n-heptadecylamine, stearylamine, n-nonadecylamine, n-eicosylamine, n-heneicosylamine, n-docosylamine, n-tricosylamine, n-pentacosylamine, oleylamine, beef tallow-amine, hydrogenated beef tallow-amine and soy bean-amine. Examples of the secondary amines include dilaurylamine, di-coconut-amine, di-n-tridecylamine, dimyristylamine, di-n-pentadecylamine, dipalmitylamine, di-n-pentadecylamine, distearylamine, di-n-nonadecylamine, di-n-eicosylamine, di-n-heneicosylamine, di-n-docosylamine, di-n-tricosylamine, di-n-pentacosyl-amine, dioleylamine, di-beef tallow-amine, di-hydrogenated beef tallow-amine and di-soy bean-amine. Examples of the aforementioned N-alkylpolyalkyenediamines include: ethylenediamines such as laurylethylenediamine, coconut ethylenediamine, n-tridecylethylenediamine-, myristylethylenediamine, n-pentadecylethylenediamine, palmitylethylenediamine, n-heptadecylethylenediamine, stearylethylenediamine, n-nonadecylethylenediamine, n-eicosylethylenediamine, n-heneicosylethylenediamine, n-docosylethylendiamine, n-tricosylethylenediamine, n-pentacosylethylenediamine, oleylethylenediamine, beef tallow-ethylenediamine, hydrogenated beef tallow-ethylenediamine and soy bean-ethylenediamine; propylenediamines such as laurylpropylenediamine, coconut propylenediamine, n-tridecylpropylenediamine, myristylpropylenediamine, n-pentadecylpropylenediamine, palmitylpropylenediamine, n-heptadecylpropylenediamine, stearylpropylenediamine, n-nonadecylpropylenediamine, n-eicosylpropylenediamine, n-heneicosylpropylenediamine, n-docosylpropylendiamine, n-tricosylpropylenediamine, n-pentacosylpropylenediamine, diethylene triamine (DETA) or triethylene tetramine (TETA), oleylpropylenediamine, beef tallow-propylenediamine, hydrogenated beef tallow-propylenediamine and soy bean-propylenediamine; butylenediamines such as laurylbutylenediamine, coconut butylenediamine, n-tridecylbutylenediamine-, myristylbutylenediamine, n-pentadecylbutylenediamine, stearylbutylenediamine, n-eicosylbutylenediamine, n-heneicosylbutylenediamine, n-docosylbutylendiamine, n-tricosylbutylenediamine, n-pentacosylbutylenediamine, oleylbutylenediamine, beef tallow-butylenediamine, hydrogenated beef tallow-butylenediamine and soy bean butylenediamine; and pentylenediamines such as laurylpentylenediamine, coconut pentylenediamine, myristylpentylenediamin-e, palmitylpentylenediamine, stearylpentylenediamine, oleylpentylenediamine, beef tallow-pentylenediamine, hydrogenated beef tallow-pentylenediamine and soy bean pentylenediamine.

F. Demulsifying Agents

Demulsifying agents include alkoxylated phenols and phenol-formaldehyde resins and synthetic alkylaryl sulfonates such as metallic dinonylnaphthalene sulfonates. A demulsifying agent is a predominant amount of a water-soluble polyoxyalkylene glycol having a pre-selected molecular weight of any value in the range of between 450 and 5000 or more. An especially preferred family of water soluble polyoxyalkylene glycol useful in the compositions of the present invention may also be one produced from alkoxylation of n-butanol with a mixture of alkylene oxides to form a random alkoxylated product.

Functional fluids according to the invention possess a pour point of less than −20 degree C., and exhibit compatibility with a wide range of anti-wear additive and extreme pressure additives. The formulations according to the invention also are devoid of fatigue failure that is normally expected by those of ordinary skill in the art when dealing with polar lubricant base stocks.

Polyoxyalkylene glycols useful in the present invention may be produced by a well-known process for preparing polyalkylene oxide having hydroxyl end-groups by subjecting an alcohol or a glycol ether and one or more alkylene oxide monomers such as ethylene oxide, butylene oxide, or propylene oxide to form block copolymers in addition polymerization while employing a strong base such as potassium hydroxide as a catalyst. In such process, the polymerization is commonly carried out under a catalytic concentration of 0.3 to 1.0% by mole of potassium hydroxide to the monomer(s) and at high temperature, as 100 degrees C. to 160 degrees C. It is well known fact that the potassium hydroxide being a catalyst is for the most part bonded to the chain-end of the produced polyalkylene oxide in a form of alkoxide in the polymer solution so obtained.

An especially preferred family of soluble polyoxyalkylene glycol useful in the compositions of the present invention may also be one produced from alkoxylation of n-butanol with a mixture of alkylene oxides to form a random alkoxylated product.

F. Foam Inhibitors

Foam inhibitors (defoamants or defoamers) include polymers of alkyl methacrylate especially useful poly alkyl acrylate polymers where alkyl is generally understood to be methyl, ethyl propyl, isopropyl, butyl, or iso butyl and polymers of dimethylsilicone which form materials called dimethylsiloxane polymers in the viscosity range of 100 cSt to 100,000 cSt. Other additives are defoamers, such as silicone polymers which have been post reacted with various carbon containing moieties, are the most widely used defoamers. Organic polymers are sometimes used as defoamers although much higher concentrations are required.

G. Metal Deactivating Compounds and Corrosion Inhibitors

Metal deactivating compounds/Corrosion inhibitors include 2,5-dimercapto-1,3,4-thiadiazoles and derivatives thereof, mercaptobenzothiazoles, alkyltriazoles and benzotriazoles. Examples of dibasic acids useful as anti-corrosion agents, other than sebacic acids, which may be used in the present invention, are adipic acid, azelaic acid, dodecanedioic acid, 3-methyladipic acid, 3-nitrophthalic acid, 1,10-decanedicarboxylic acid, and fumaric acid. The anti-corrosion combination is a straight or branch-chained, saturated or unsaturated monocarboxylic acid or ester thereof which may optionally be sulphurised in an amount up to 35% by weight. Preferably the acid is a $C_4$ to $C_{22}$ straight chain unsaturated monocarboxylic acid. The preferred concentration of this additive is from 0.001% to 0.35% by weight of the total lubricant composition. The preferred monocarboxylic acid is sulphurised oleic acid. However, other suitable materials are oleic acid itself; valeric acid and erucic acid. A component of the anti-corrosion combination is a triazole as previously defined. The triazole should be used at a concentration from 0.005% to 0.25% by weight of the total composition. The preferred triazole is tolylotriazole which may be included in the compositions of the invention include triazoles, thiazoles and certain diamine compounds which are useful as metal deactivators or metal passivators. Examples include triazole, benzotriazole and substituted benzotriazoles such as alkyl substituted derivatives. The alkyl substituent generally contains up to 1.5 carbon atoms, preferably up to 8 carbon atoms. The triazoles may contain other substituents on the aromatic ring such as halogens, nitro, amino, mercapto, etc. Examples of suitable compounds are benzotriazole and the tolyltriazoles, ethylbenzotriazoles, hexylbenzotriazoles, octylbenzotriazoles, chlorobenzotriazoles and nitrobenzotriazoles. Benzotriazole and tolyltriazole are particularly preferred. A straight or branched chain saturated or unsaturated monocarboxylic acid which is optionally sulphurised in an amount which may be up to 35% by weight; or an ester of such an acid; and a triazole or alkyl derivatives thereof, or short chain alkyl of up to 5 carbon atoms; n is zero or an integer between 1 and 3 inclusive; and is hydrogen, morpholino, alkyl, amido, amino, hydroxy or alkyl or aryl substituted derivatives thereof; or a triazole selected from 1,2,4 triazole, 1,2,3 triazole, 5-anilo-1,2,3,4-thiatriazole, 3-amino-1,2,4 triazole, 1-H-benzotriazole-1-yl-methylisocyanide, methylene-bis-benzotriazole and naphthotriazole.

Alkyl is straight or branched chain and is for example methyl, ethyl, n-propyl, iso-propyl, n-butyl, sec-butyl, n-pentyl, n-hexyl, n-heptyl, n-octyl, 2-ethylhexyl, n-nonyl, n-decyl, n-dodecyl, n-tetradecyl, n-hexadecyl, n-octadecyl or n-eicosyl.

Alkenyl is straight or branched chain and is for example prop-2-enyl, but-2-enyl, 2-methyl-prop-2-enyl, pent-2-enyl, hexa-2,4-dienyl, dec-10-enyl or eicos-2-enyl.

Cylcoalkyl is for example cyclopentyl, cyclohexyl, cyclooctyl, cyclodecyl, adamantyl or cyclododecyl.

Aralkyl is for example benzyl, 2-phenylethyl, benzhydryl or naphthylmethyl. Aryl is for example phenyl or naphthyl.

The heterocyclic group is for example a morpholine, pyrrolidine, piperidine or a perhydroazepine ring.

Alkylene moieties include for example methylene, ethylene, 1:2- or 1:3-propylene, 1:4-butylene, 1:6-hexylene, 1:8-octylene, 1:10-decylene and 1:12-dodecylene.

Arylene moieties include for example phenylene and naphthylene. 1-(or 4)-(dimethylaminomethyl) triazole, 1-(or 4)-(diethylaminomethyl) triazole, 1-(or 4)-(di-isopropylaminomethyl) triazole, 1-(or 4)-(di-n-butylaminomethyl) triazole, 1-(or 4)-(di-n-hexylaminomethyl) triazole, 1-(or 4)-(di-isooctylaminomethyl) triazole, 1-(or 4)-(di-(2-ethylhexyl)aminomethyl) triazole, 1-(or 4)-(di-n-decylaminomethyl) triazole, 1-(or 4)-(di-n-dodecylaminomethyl) triazole, 1-(or 4)-(di-n-octadecylaminomethyl) triazole, 1-(or 4)-(di-n-eicosylaminomethyl) triazole, 1-(or 4)-[di-(prop-2'-enyl)aminomethyl]triazole, 1-(or 4)-[di-(but-2'-enyl)aminomethyl]triazole, 1-(or 4)-[di-(eicos-2'-enyl)aminomethyl] triazole, 1-(or 4)-(di-cyclohexylaminomethyl) triazole, 1-(or 4)-(di-benzylaminomethyl) triazole, 1-(or 4)-(di-phenylaminomethyl) triazole, 1-(or 4)-(4'-morpholinomethyl) triazole, 1-(or 4)-(1'-pyrrolidinomethyl) triazole, 1-(or 4)-(1'-piperidinomethyl) triazole, 1-(or 4)-(1'-perhydroroazepinomethyl) triazole, 1-(or 4)-(2',2''-dihydroxyethyl)aminomethyl]triazole, 1-(or 4)-(dibutoxypropyl-aminomethyl) triazole, 1-(or 4)-(dibutylthiopropyl-aminomethyl) triazole, 1-(or 4)-(dibutylaminopropyl-aminomethyl) triazole, 1-(or -4)-(1-methanomine)-N,N-bis(2-ethylhexyl)-methyl benzotriazole, N,N-bis-(1- or 4-triazolylmethyl) laurylamine, N,N-bis-(1- or 4-triazolylmethyl) oleylamine, N,N-bis-(1- or 4-triazolylmethyl)ethanolamine and N,N,N',N'-tetra(1- or 4-triazolylmethyl)ethylene diamine.

Also, dihydrocarbyl dithiophosphate metal salts where the metal is aluminum, lead, tin, manganese, molybdenum, antimony, cobalt, nickel, zinc or copper, but most often zinc. Sulfur- and/or phosphorus- and/or halogen-containing compounds, such as sulfurized olefins and vegetable oils, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, di(2-ethylhexyl)-aminomethyltolyltriazole, derivatives of 2,5-dimercapto-1,3,4-thiadiazole, ethyl ((bisisopropyloxyphosphinothioyl)-thio) propionate, triphenyl thiophosphate (triphenyl phosphorothioate), tris(alkylphenyl) phosphorothioates and mixtures thereof (for example tris(isononylphenyl) phosphorothioate), diphenylmonononylphenyl phosphorothioate, isobutylphenyl diphenyl phosphorothioate, the dodecylamine salt of 3-hydroxy-1,3-thiaphosphetan 3-oxide, trithiophosphoric acid 5,5,5-tris(isooctyl 2-acetate), derivatives of 2-mercaptobenzothiazole, such as 1-(N,N-bis(2-ethylhexyl) aminomethyl)-2-m-ercapto-1H-1,3-benzothiazole or ethoxycarbonyl 5-octyldithiocarbamate.

The metal deactivating agents which can be used in the lubricating oil a composition of the present invention include benzotriazole and the 4-alkylbenzotriazoles such as 4-methylbenzotriazole and 4-ethylbenzotriazole; 5-alkylbenzotriazoles such as 5-methylbenzotriazole, 5-ethylbenzotriazole; 1-alkylbenzotriazoles such as 1-dioctylauainomethyl-2,3-benzotriazole; benzotriazole derivatives such as the 1-alkyltolutriazoles, for example, 1-dioctylaminomethyl-2,3-t-olutriazole; benzimidazole and benzimidazole derivatives such as 2-(alkyldithio)-benzimidazoles, for example, such as 2-(octyldithio)-benzimidazole, 2-(decyldithio)benzimidazole and 2-(dodecyldithio)-benzimidazole; 2-(alkyldithio)-toluimidazoles such as 2-(octyldithio)-toluimidazole, 2-(decyldithio)-toluimidazole and 2-(dodecyldithio)-toluimidazole; indazole and indazole derivatives of toluimidazoles such as 4-alkylindazole, 5-alkylindazole; benzothiazole, 2-mercaptobenzothiazole derivatives (manufactured by the Chiyoda Kagaku Co. under the trade designation "Thiolite B-3100") and 2-(alkyldithio)benzothiazoles such as 2-(hexyldithio)benzothiazole and 2-(octyldithio)benzothiazole; 2-(alkyl-dithio)toluthiazoles such as 2-(benzyldithio)toluthiazole and 2-(octyldithio)toluthiazole, 2-(N, N-dialkyldithiocarbamyl)benzothiazoles such as 2-(N,N-diethyldithiocarbamyl)benzothiazole, 2-(N,N-dibutyldithiocarbamyl)-benzotriazole and 2-N,N-dihexyl-dithiocarbamyl)benzotriazole; benzothiazole derivatives of 2-(N,N-dialkyldithiocarbamyl)toluthiazoles such as 2-(N,N-diethyldithiocarbamyl)toluthiazole, 2-(N,N-dibutyldithiocarbamyl)toluthiazole, 2-(N,N-dihexyl-dithiocarbamyl)-toluthiazole; 2-(alkyldithio)benzoxazoles such as 2-(octyldithio)benzoxazole, 2-(decyldithio)-benzoxazole and 2-(dodecyldithio)benzoxazole; benzoxazole derivatives of 2-(alkyldithio)toluoxazoles such as 2-(octyldithio)toluoxazole, 2-(decyldithio)toluoxazole, 2-(dodecyldithio)toluoxazole; 2,5-bis(alkyldithio)-1,3,4-thiadiazoles such as 2,5-bis(heptyldithio)-1,3,4-thiadiazole, 2,5-bis-(nonyldithio)-1,-3, 4-thiadiazole, 2,5-bis(dodecyldithio)-1,3,4-thiadiazole and 2,5-bis-(octadecyldithio)-1,3,4-thiadiazole; 2,5-bis(N,N-dialkyl-dithiocarbamyl)-1,3,4-thiadiazoles such as 2,5-bis(N, N-diethyldithiocarbamyl)-1,3,-4-thiadiazole, 2,5-bis(N,N-dibutyldithiocarbamyl)-1,3,4-thiadiazole and 2,5-bis(N,N-dioctyldithiocarbamyl) 1,3,4-thiadiazole; thiadiazole derivatives of 2-N,N-dialkyldithiocarbamyl-5-mercapto-1,3, 4-thiadiazoles such as 2-N,N-dibutyldithiocarbamyl-5-mercapto-1,3,4-thiadiazole and 2-N,N-dioctyl-dithiocarbamyl-5-mercapto-1,3,4-thiadiazole, and triazole derivatives of 1-alkyl-2,4-triazoles such as 1-dioctylaminomethyl-2,4-triazole or concentrates and/or mixtures thereof.

H. Anti-Wear Agents/Extreme Pressure Agent/Friction Reducers

Anti-wear agents/Extreme pressure agent/Friction Reducer: zinc alkyldithiophosphates, aryl phosphates and phosphites, sulfur-containing esters, phosphosulfur compounds, and metal or ash-free dithiocarbamates.

A phosphate ester or salt may be a monohydrocarbyl, dihydrocarbyl or a trihydrocarbyl phosphate, wherein each hydrocarbyl group is saturated. In one embodiment, each hydrocarbyl group independently contains from 8 to 30, or from 12 up to 28, or from 14 up to 24, or from 14 up to 18 carbons atoms. In one embodiment, the hydrocarbyl groups are alkyl groups. Examples of hydrocarbyl groups include tridecyl, tetradecyl, pentadecyl, hexadecyl, heptadecyl, octadecyl groups and mixtures thereof.

A phosphate ester or salt is a phosphorus acid ester prepared by reacting one or more phosphorus acid or anhydride with a saturated alcohol. The phosphorus acid or anhydride is generally an inorganic phosphorus reagent, such as phosphorus pentoxide, phosphorus trioxide, phosphorus tetroxide, phosphorous acid, phosphoric acid, phosphorus halide, lower phosphorus esters, or a phosphorus sulfide, including phosphorus pentasulfide, and the like. Lower phosphorus acid esters generally contain from 1 to 7 carbon atoms in each ester group. Alcohols used to prepare the phosphorus acid esters or salts. Examples of commercially available alcohols and alcohol mixtures include Alfol 1218 (a mixture of synthetic, primary, straight-chain alcohols containing 12 to 18 carbon atoms); Alfol 20+ alcohols (mixtures of $C_{18}$-$C_{28}$ primary alcohols having mostly $C_{20}$ alcohols as determined by GLC (gas-liquid-chromatography)); and Alfo122+ alcohols ($C_{18}$-$C_{28}$ primary alcohols containing primarily $C_{22}$ alcohols). Alfol alcohols are available from Continental Oil Company. Another example of a commercially available alcohol mixture is Adol 60 (75% by weight of a straight chain $C_{22}$ primary alcohol, 15% of a $C_{20}$ primary alcohol and 8% of $C_{18}$ and $C_{24}$ alcohols). The Adol alcohols are marketed by Ashland Chemical.

A variety of mixtures of monohydric fatty alcohols derived from naturally occurring triglycerides and ranging in chain length from C8 to C18 are available from Procter & Gamble Company. These mixtures contain various amounts of fatty alcohols containing 12, 14, 16, or 18 carbon atoms. For example, CO-1214 is a fatty alcohol mixture containing 0.5% of $C_{10}$ alcohol, 66.0% of $C_{12}$ alcohol, 26.0% of $C_{14}$ alcohol and 6.5% of $C_{16}$ alcohol.

Another group of commercially available mixtures include the "Neodol" products available from Shell Chemical Co. For example, Neodol 23 is a mixture of $C_{12}$ and $C_{13}$ alcohols; Neodol 25 is a mixture of $C_{12}$ to $C_{15}$ alcohols; and Neodol 45 is a mixture of $C_{14}$ to $C_{15}$ linear alcohols. The phosphate contains from 14 to 18 carbon atoms in each hydrocarbyl group. The hydrocarbyl groups of the phosphate are generally derived from a mixture of fatty alcohols having from 14 up to 18 carbon atoms. The hydrocarbyl phosphate may also be derived from a fatty vicinal diol. Fatty vicinal diols include those available from Ashland Oil under the general trade designation Adol 114 and Adol 158. The former is derived from a straight chain alpha olefin fraction of $C_{11}$-$C_{14}$, and the latter is derived from a $C_{15}$-$C_{18}$ fraction.

The phosphate salts may be prepared by reacting an acidic phosphate ester with an amine compound or a metallic base to form an amine or a metal salt. The amines may be monoamines or polyamines. Useful amines include those amines disclosed in U.S. Pat. No. 4,234,435.

The monoamines generally contain a hydrocarbyl group which contains from 1 to 30 carbon atoms, or from 1 to 12, or from 1 to 6. Examples of primary monoamines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary monoamines include dimethylamine, diethylamine, dipropylamine, dibutylamine, dicyclopentylamine, dicyclohexylamine, methylbutylamine, ethylhexylamine, etc.

An amine is a fatty ($C_{8-30}$) amine which includes n-octylamine, n-decylamine, n-dodecylamine, n-tetradecylamine, n-hexadecylamine, n-octadecylamine, oleyamine, etc. Also useful fatty amines include commercially available fatty amines such as "Armeen" amines (products available from Akzo Chemicals, Chicago, Ill.), such Armeen C, Armeen O, Armeen OL, Armeen T, Armeen HT, Armeen S and Armeen SD, wherein the letter designation relates to the fatty group, such as coco, oleyl, tallow, or stearyl groups.

Other useful amines include primary ether amines, such as those represented by the formula, R"(OR')xNH2, wherein R' is a divalent alkylene group having 2 to 6 carbon atoms; x is a number from one to 150, or from one to five, or one; and R" is a hydrocarbyl group of 5 to 150 carbon atoms. An example of an ether amine is available under the name SURFAM™ amines produced and marketed by Mars Chemical Company, Atlanta, Ga. Preferred etheramines are exemplified by those identified as SURFAM P14B (decyloxypropylamine), SURFAM P16A (linear $C_{16}$), SURFAM P17B (tridecyloxypropylamine). The carbon chain lengths (i.e., $C_{14}$, etc.) of the SURFAMS described above and used hereinafter are approximate and include the oxygen ether linkage.

An amine is a tertiary-aliphatic primary amine. Generally, the aliphatic group, preferably an alkyl group, contains from 4 to 30, or from 6 to 24, or from 8 to 22 carbon atoms. Usually the tertiary alkyl primary amines are monoamines the alkyl group is a hydrocarbyl group containing from one to 27 carbon atoms and R6 is a hydrocarbyl group containing from 1 to 12 carbon atoms. Such amines are illustrated by tert-butylamine, tert-hexylamine, 1-methyl-1-amino-cyclohexane, tert-octylamine, tert-decylamine, tert-dodecylamine, tert-tetradecylamine, tert-hexadecylamine, tert-octadecylamine, tert-tetracosanylamine, and tert-octacosanylamine. Mixtures of tertiary aliphatic amines may also be used in preparing the phosphate salt. Illustrative of amine mixtures of this type are "Primene 81R" which is a mixture of $C_{11}$-$C_{14}$ tertiary alkyl primary amines and "Primene JMT" which is a similar mixture of $C_{18}$-$C_{22}$ tertiary alkyl primary amines (both are available from Rohm and Haas Company). The tertiary aliphatic primary amines and methods for their preparation are known to those of ordinary skill in the art. An amine is a heterocyclic polyamine. The heterocyclic polyamines include aziridines, azetidines, azolidines, tetra- and dihydropyridines, pyrroles, indoles, piperidines, imidazoles, di- and tetra-hydroimidazoles, piperazines, isoindoles, purines, morpholines, thiomorpholines, N-aminoalkylmorpholines, N-aminoalkylthiomorpholines, N-aminoalkyl-piperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl substituted piperidines, piperazine, aminoalkyl substituted piperazines, morpholine, aminoalkyl substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

The metal salts of the phosphorus acid esters are prepared by the reaction of a metal base with the acidic phosphorus ester. The metal base may be any metal compound capable of forming a metal salt. Examples of metal bases include metal oxides, hydroxides, carbonates, sulfates, borates, or the like. The metals of the metal base include Group IA, IIA, IB through VIIB, and VIII metals (CAS version of the Periodic Table of the Elements). These metals include the alkali metals, alkaline earth metals and transition metals. In one embodiment, the metal is a Group IIA metal, such as calcium or magnesium, Group IIB metal, such as zinc, or a Group VIIB metal, such as manganese. Preferably, the metal is magnesium, calcium, manganese or zinc. Examples of metal compounds which may be reacted with the phosphorus acid include zinc hydroxide, zinc oxide, copper hydroxide, copper oxide, etc.

Lubricating compositions also may include a fatty imidazoline or a reaction product of a fatty carboxylic acid and at least one polyamine. The fatty imidazoline has fatty substituents containing from 8 to 30, or from 12 to 24 carbon atoms. The substituent may be saturated or unsaturated for example, heptadeceneyl derived olyel groups, preferably saturated. In one aspect, the fatty imidazoline may be prepared by reacting a fatty carboxylic acid with a polyalkylenepolyamine, such as those discussed above. The fatty carboxylic acids are generally mixtures of straight and branched chain fatty carboxylic acids containing 8 to 30 carbon atoms, or from 12 to 24, or from 16 to 18. Carboxylic acids include the polycarboxylic acids or carboxylic acids or anhydrides having from 2 to 4 carbonyl groups, preferably 2. The polycarboxylic acids include succinic acids and anhydrides and Diels-Alder reaction products of unsaturated monocarboxylic acids with unsaturated carboxylic acids (such as acrylic, methacrylic, maleic, fumaric, crotonic and itaconic acids). Preferably, the fatty carboxylic acids are fatty monocarboxylic acids, having from 8 to 30, preferably 12 to 24 carbon atoms, such as octanoic, oleic, stearic, linoleic, dodecanoic, and tall oil acids, preferably stearic acid. The fatty carboxylic acid is reacted with at least one polyamine. The polyamines may be aliphatic, cycloaliphatic, heterocyclic or aromatic. Examples of the polyamines include alkylene polyamines and heterocyclic polyamines.

Hydroxyalkyl groups are to be understood as meaning, for example, monoethanolamine, diethanolamine or triethanolamine, and the term amine also includes diamine. The amine used for the neutralization depends on the phosphoric esters used. The EP additive according to the invention has the following advantages: It very high effectiveness when used in low concentrations and it is free of chlorine. For the neutralization of the phosphoric esters, the latter are taken and the corresponding amine slowly added with stirring. The resulting heat of neutralization is removed by cooling. The EP additive according to the invention can be incorporated into the respective base liquid with the aid of fatty substances (e.g. tall oil fatty acid, oleic acid, etc.) as solubilizers. The base liquids used are napthenic or paraffinic base oils, synthetic oils (e.g. polyglycols, mixed polyglycols), polyolefins, carboxylic esters, etc.

The composition comprises at least one phosphorus containing extreme pressure additive. Examples of such additives are amine phosphate extreme pressure additives such as that known under the trade name IRGALUBE 349 and/or triphenyl phosphorothionate extreme pressure/anti-wear additives such as that known under the trade name IRGALUBE TPPT.

Such amine phosphates are suitably present in an amount of from 0.01 to 2%, preferably 0.2 to 0.6% by weight of the lubricant composition while such phosphorothionates are suitably present in an amount of from 0.01 to 3%, preferably 0.5 to 1.5% by weight of the lubricant composition. A mixture of an amine phosphate and phosphorothionate is employed.

At least one straight and/or branched chain saturated or unsaturated monocarboxylic acid which is optionally sulphurised in an amount which may be up to 35% by weight; and/or an ester of such an acid. At least one triazole or alkyl derivatives thereof, or short chain alkyl of up to 5 carbon atoms and is hydrogen, morphilino, alkyl, amido, amino, hydroxy or alkyl or aryl substituted derivatives thereof; or a triazole selected from 1,2,4 triazole, 1,2,3 triazole, 5-anilo-1,2,3,4-thiatriazole, 3-amino-1,2,4 triazole, 1-H-benzotriazole-1-yl-methylisocyanide, methylene-bis-benzotriazole and naphthotriazole; and The neutral organic phosphate which forms a component of the formulation may be present in an amount of 0.01 to 4%, preferably 1.5 to 2.5% by weight of the composition. The above amine phosphates and any of the aforementioned benzo- or tolyltriazoles can be mixed together to form a single component capable of delivering antiwear performance. The neutral organic phosphate is also a conventional ingredient of lubricating compositions and any such neutral organic phosphate falling within the formula as previously defined may be employed.

Phosphates for use in the present invention include phosphates, acid phosphates, phosphites and acid phosphites. The phosphates include triaryl phosphates, trialkyl phosphates, trialkylaryl phosphates, triarylalkyl phosphates and trialkenyl phosphates. As specific examples of these, referred to are triphenyl phosphate, tricresyl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, propylphenyldiphenyl phosphate, dipropylphenylphenyl phosphate, triethylphenyl phosphate, tripropylphenyl phosphate, butylphenyldiphenyl phosphate, dibutylphenylphenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate. The acid phosphates include, for example, 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate. The phosphites include, for example, triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, and trioleyl phosphite.

The acid phosphites include, for example, dibutyl hydrogenphosphite, dilauryl hydrogenphosphite, dioleyl hydrogenphosphite, distearyl hydrogenphosphite, and diphenyl hydrogenphosphite.

Amines that form amine salts with such phosphates include, for example, mono-substituted amines, di-substituted amines and tri-substituted amines. Examples of the mono-substituted amines include butylamine, pentylamine, hexylamine, cyclohexylamine, octylamine, laurylamine, stearylamine, oleylamine and benzylamine; and those of the di-substituted amines include dibutylamine, dipentylamine, dihexylamine, dicyclohexylamine, dioctylamine, dilaurylamine, distearylamine, dioleylamine, dibenzylamine, stearyl monoethanolamine, decyl monoethanolamine, hexyl monopropanolamine, benzyl monoethanolamine, phenyl monoethanolamine, and tolyl monopropanolamine. Examples of tri-substituted amines include tributylamine, tripentylamine, trihexylamine, tricyclohexylamine, trioctylamine, trilaurylamine, tristearylamine, trioleylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine, and tripropanolamine. Phosphates or their amine salts are added to the base oil in an amount of from 0.03 to 5% by weight, preferably from 0.1 to 4% by weight, relative to the total weight of the composition.

Carboxylic acids to be reacted with amines include, for example, aliphatic carboxylic acids, dicarboxylic acids (dibasic acids), and aromatic carboxylic acids. The aliphatic carboxylic acids have from 8 to 30 carbon atoms, and may be saturated or unsaturated, and linear or branched. Specific examples of the aliphatic carboxylic acids include pelargonic acid, lauric acid, tridecanoic acid, myristic acid, palmitic acid, stearic acid, isostearic acid, eicosanoic acid, behenic acid, triacontanoic acid, caproleic acid, undecylenic acid, oleic acid, linolenic acid, erucic acid, and linoleic acid. Specific examples of the dicarboxylic acids include octadecylsuccinic acid, octadecenylsuccinic acid, adipic acid, azelaic acid, and sebacic acid. One example of the aromatic carboxylic acids is salicylic acid. The amines to be reacted with carboxylic acids include, for example, polyalkylenepolyamines such as diethylenetriamine, triethylenetetramine, tetraethylenepentamine, pentaethylenehexamine, hexaethyleneheptamine, heptaethyleneoctamine, dipropylenetriamine, tetrapropylenepentamine, and hexabutyleneheptamine; and alkanolamines such as monoethanolamine and diethanolamine. Of these, preferred are a combination of isostearic acid and tetraethylenepentamine, and a combination of oleic acid and diethanolamine. The reaction products of carboxylic acids and amines are added to the base oil in an amount of from 0.01 to 5% by weight, preferably from 0.03 to 3% by weight, relative to the total weight of the composition.

Important components are phosphites, thiophosphites phosphates, and thiophosphates, including mixed materials having, for instance, one or two sulfur atoms, i.e., monothio- or dithio compounds. As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

Hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); the substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy); and hetero-atom containing substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

The term "hydrocarbyl group," in the context of the present invention, is also intended to encompass cyclic hydrocarbyl or hydrocarbylene groups, where two or more of the alkyl groups in the above structures together form a cyclic structure. The hydrocarbyl or hydrocarbylene groups of the present invention generally are alkyl or cycloalkyl groups which contain at least 3 carbon atoms. Preferably or optimally containing sulfur, nitrogen, or oxygen, they will contain 4 to 24, and alternatively 5 to 18 carbon atoms. In another embodiment they contain 6, or exactly 6 carbon atoms. The hydrocarbyl groups can be tertiary or preferably primary or secondary groups; in one embodiment the component is a di(hydrocarbyl)hydrogen phosphite and each of the hydrocarbyl groups is a primary alkyl group; in another embodiment the component is a di(hydrocarbyl)hydrogen phosphite and each of the hydrocarbyl groups is a secondary alkyl group. In yet another embodiment the component is a hydrocarbylenehydrogen phosphite.

Examples of straight chain hydrocarbyl groups include methyl, ethyl, n-propyl, n-butyl, n-hexyl, n-octyl, n-decyl, n-dodecyl, n-tetradecyl, stearyl, n-hexadecyl, n-octadecyl, oleyl, and cetyl. Examples of branched-chain hydrocarbon groups include isopropyl, isobutyl, secondary butyl, tertiary butyl, neopentyl, 2-ethylhexyl, and 2,6-dimethylheptyl. Examples of cyclic groups include cyclobutyl, cyclopentyl, methylcyclopentyl, cyclohexyl, methylcyclohexyl, cycloheptyl, and cyclooctyl. A few examples of aromatic hydrocarbyl groups and mixed aromatic-aliphatic hydrocarbyl groups include phenyl, methylphenyl, tolyl, and naphthyl.

The R groups can also comprise a mixture of hydrocarbyl groups derived from commercial alcohols. Examples of some monohydric alcohols and alcohol mixtures include the commercially available "Alfol™" alcohols marketed by Continental Oil Corporation. Alfol™ 810, for instance, is a mixture containing alcohols consisting essentially of straight chain, primary alcohols having from 8 to 12 carbon atoms. Alfol™ 12 is a mixture of mostly $C_{12}$ fatty alcohols; Alfol™ 22+ comprises $C_{18-28}$ primary alcohols having mostly $C_{22}$ alcohols, and so on. Various mixtures of monohydric fatty alcohols derived from naturally occurring triglycerides and ranging in chain length from $C_8$ to $C_{18}$ are available from Procter & Gamble Company. "Neodol™" alcohols are available from Shell Chemical Co., where, for instance, Neodol™ 25 is a mixture of $C_{12}$ to $C_{15}$ alcohols.

Specific examples of some of the phosphites and thiophosphites within the scope of the invention include phosphorous acid, mono-, di-, or tri-thiophosphorous acid, mono-, di-, or tri-propyl phosphite or mono-, di-, or tri-thiophosphite; mono-, di-, or tri-butyl phosphite or mono-, di-, or tri-thiophosphite; mono-, di-, or tri-amyl phosphite or mono-, di-, or tri-thiophosphite; mono-, di-, or tri-hexyl phosphite or mono-, di-, or tri-thiophosphite; mono-, di-, or tri-phenyl phosphite or mono-, di-, or tri-thiophosphite; mono-, di-, or tri-tolyl phosphite or mono-, di-, or tri-thiophosphite; mono-, di-, or tri-cresyl phosphite or mono-, di-, or tri-thiophosphite; dibutyl phenyl phosphite or mono-, di-, or tri-phosphite, amyl dicresyl phosphite or mono-, di-, or tri-thiophosphite, and any of the above with substituted groups, such as chlorophenyl or chlorobutyl.

Specific examples of the phosphates and thiophosphates within the scope of the invention include phosphoric acid, mono-, di-, or tri-thiophosphoric acid, mono-, di-, or tri-propyl phosphate or mono-, di-, or tri-thiophosphate; mono-, di-, or tri-butyl phosphate or mono-, di-, or tri-thiophosphate; mono-, di-, or tri-amyl phosphate or mono-, di-, or tri-thiophosphate; mono-, di-, or tri-hexyl phosphate or mono-, di-, or tri-thiophosphate; mono-, di-, or tri-phenyl phosphate or mono-, di-, or tri-thiophosphate; mono-, di-, or tritolyl phosphate or mono-, di-, or trithiophosphate; mono-, di-, or tri-cresyl phosphate or mono-, di-, or tri-thiophosphate; dibutyl phenyl phosphate or mono-, di-, or tri-phosphate, amyl dicresyl phosphate or mono-, di-, or tri-thiophosphate, and any of the above with substituted groups, such as chlorophenyl or chlorobutyl.

The phosphorus compounds of the present invention are prepared by well known reactions. One route the reaction of an alcohol or a phenol with phosphorus trichloride or by a transesterification reaction. Alcohols and phenols can be reacted with phosphorus pentoxide to provide a mixture of an alkyl or aryl phosphoric acid and a dialkyl or diaryl phosphoric acid. Alkyl phosphates can also be prepared by the oxidation of the corresponding phosphites. Thiophosphates can be prepared by the reaction of phosphites with elemental sulfur. In any case, the reaction can be conducted with moderate heating. Moreover, various phosphorus esters can be prepared by reaction using other phosphorus esters as starting materials. Thus, medium chain ($C_9$ to $C_{22}$) phosphorus esters have been prepared by reaction of dimethylphosphite with a mixture of medium-chain alcohols by means of a thermal transesterification or an acid- or base-catalyzed transesterification; see for example U.S. Pat. No. 4,652,416. Most such materials are also commercially available; for instance, triphenyl phosphite is available from Albright and Wilson as Duraphos TPP™; di-n-butyl hydrogen phosphite from Albright and Wilson as Duraphos DBHP™; and triphenylthiophosphate from Ciba Specialty Chemicals as Irgalube TPPT™.

The other major component of the present composition is a hydrocarbon having ethylenic unsaturation. This would normally be described as an olefin or a diene, triene, polyene, and so on, depending on the number of ethylenic unsaturations present. Preferably the olefin is mono unsaturated, that is, containing only a single ethylenic double bond per molecule. The olefin can be a cyclic or a linear olefin. If a linear olefin, it can be an internal olefin or an alpha-olefin. The olefin can also contain aromatic unsaturation, i.e., one or more aromatic rings, provided that it also contains ethylenic (non-aromatic) unsaturation.

The olefin normally will contain 6 to 30 carbon atoms. Olefins having significantly fewer than 6 carbon atoms tend to be volatile liquids or gases which are not normally suitable for formulation into a composition suitable as an antiwear lubricant. Preferably the olefin will contain 6 to 18 or 6 to 12 carbon atoms, and alternatively 6 or 8 carbon atoms.

Among suitable olefins are alkyl-substituted cyclopentenes, hexenes, cyclohexene, alkyl-substituted cyclohexenes, heptenes, cycloheptenes, alkyl-substituted cycloheptenes, octenes including diisobutylene, cyclooctenes, alkyl-substituted cyclooctenes, nonenes, decenes, undecenes, dodecenes including propylene tetramer, tridecenes, tetradecenes, pentadecenes, hexadecenes, heptadecenes, octadecenes, cyclooctadiene, norbornene, dicyclopentadiene, squalene, diphenylacetylene, and styrene. Highly preferred olefins are cyclohexene and 1-octene.

Examples of esters of the dialkylphosphorodithioic acids include esters obtained by reaction of the dialkyl phosphorodithioic acid with an alpha, beta-unsaturated carboxylic acid (e.g., methyl acrylate) and, optionally an alkylene oxide such as propylene oxide.

Generally, the compositions of the present invention will contain varying amounts of one or more of the above-identified metal dithiophosphates such as from 0.01 to 2% by weight, and more generally from 0.01 to 1% by weight, based on the weight of the total composition.

The hydrocarbyl in the dithiophosphate may be alkyl, cycloalkyl, aralkyl or alkaryl groups, or a substantially hydrocarbon group of similar structure. Illustrative alkyl groups include isopropyl, isobutyl, n-butyl, sec-butyl, the various amyl groups, n-hexyl, methylisobutyl, heptyl, 2-ethylhexyl, diisobutyl, isooctyl, nonyl, behenyl, decyl, dodecyl, tridecyl, etc. Illustrative lower alkylphenyl groups include butylphenyl, amylphenyl, heptylphenyl, etc. Cycloalkyl groups likewise are useful and these include chiefly cyclohexyl and the lower alkyl-cyclohexyl radicals. Many substituted hydrocarbon groups may also be used, e.g., chloropentyl, dichlorophenyl, and dichlorodecyl.

The phosphorodithioic acids from which the metal salts useful in this invention are prepared are well known. Examples of dihydrocarbylphosphorodithioic acids and metal salts, and processes for preparing such acids and salts are found in, for example U.S. Pat. Nos. 4,263,150; 4,289,635; 4,308,154; and 4,417,990. These patents are hereby incorporated by reference.

The phosphorodithioic acids are prepared by the reaction of a phosphorus sulfide with an alcohol or phenol or mixtures of alcohols. A typical reaction involves four moles of the alcohol or phenol and one mole of phosphorus pentasulfide, and may be carried out within the temperature range from 50° C. to 200° C. Thus, the preparation of O,O-di-n-hexyl phosphorodithioic acid involves the reaction of a mole of phosphorus pentasulfide with four moles of n-hexyl alcohol at 10° C. for two hours. Hydrogen sulfide is liberated and the residue is the desired acid. The preparation of the metal salts of these acids may be affected by reaction with metal compounds as well known in the art.

The metal salts of dihydrocarbyldithiophosphates which are useful in this invention include those salts containing Group I metals, Group II metals, aluminum, lead, tin, molybdenum, manganese, cobalt, and nickel. The Group II metals, aluminum, tin, iron, cobalt, lead, molybdenum, manganese, nickel and copper are among the preferred metals. Zinc and copper are especially useful metals. Examples of metal compounds which may be reacted with the acid include lithium oxide, lithium hydroxide, sodium hydroxide, sodium carbonate, potassium hydroxide, potassium carbonate, silver oxide, magnesium oxide, magnesium hydroxide, calcium oxide, zinc hydroxide, strontium hydroxide, cadmium oxide, cadmium hydroxide, barium oxide, aluminum oxide, iron carbonate, copper hydroxide, lead hydroxide, tin butylate, cobalt hydroxide, nickel hydroxide, nickel carbonate, and the like.

In some instances, the incorporation of certain ingredients such as small amounts of the metal acetate or acetic acid in conjunction with the metal reactant will facilitate the reaction and result in an improved product. For example, the use of up to 5% of zinc acetate in combination with the required amount of zinc oxide facilitates the formation of a zinc phosphorodithioate with potentially improved performance properties.

Especially useful metal phosphorodithloates can be prepared from phosphorodithloic acids which in turn are prepared by the reaction of phosphorus pentasulfide with mixtures of alcohols. In addition, the use of such mixtures enables the utilization of less expensive alcohols which individually may not yield oil-soluble phosphorodithioic acids. Thus a mixture of isopropyl and hexylalcohols can be used to produce a very effective, oil-soluble metal phosphorodithioate.

For the same reason mixtures of phosphorodithioic acids can be reacted with the metal compounds to form less expensive, oil-soluble salts.

The mixtures of alcohols may be mixtures of different primary alcohols, mixtures of different secondary alcohols or mixtures of primary and secondary alcohols. Examples of useful mixtures include: n-butanol and n-octanol; n-pentanol and 2-ethyl-1-hexanol; isobutanol and n-hexanol; isobutanol and isoamyl alcohol; isopropanol and 2-methyl-4-pentanol; isopropanol and sec-butyl alcohol; isopropanol and isooctyl alcohol; and the like.

Organic triesters of phosphorus acids are also employed in lubricants. Typical esters include triarylphosphates, trialkyl phosphates, neutral alkylaryl phosphates, alkoxyalkyl phosphates, triaryl phosphite, trialkylphosphite, neutral alkyl aryl phosphites, neutral phosphonate esters and neutral phosphine oxide esters. In one embodiment, the long chain dialkyl phosphonate esters are used. More preferentially, the dimethyl-, diethyl-, and dipropyl-oleyl phosphonates can be used. Neutral acids of phosphorus acids are the triesters rather than an acid (HO—P) or a salt of an acid.

Any $C_4$ to $C_8$ alkyl or higher phosphate ester may be employed in the invention. For example, tributyl phosphate (TBP) and tri isooctal phosphate (TOF) can be used. The specific triphosphate ester or combination of esters can easily be selected by one skilled in the art to adjust the density, viscosity etc. of the formulated fluid. Mixed esters, such as dibutyl octyl phosphate or the like may be employed rather than a mixture of two or more trialkyl phosphates.

A trialkyl phosphate is often useful to adjust the specific gravity of the formulation, but it is desirable that the specific trialkyl phosphate be a liquid at low temperatures. Consequently, a mixed ester containing at least one partially alkylated with a $C_3$ to $C_4$ alkyl group is very desirable, for example, 4-isopropylphenyl diphenyl phosphate or 3-butylphenyl diphenyl phosphate. Even more desirable is a triaryl phosphate produced by partially alkylating phenol with butylene or propylene to form a mixed phenol which is then reacted with phosphorus oxychloride as taught in U.S. Pat. No. 3,576,923.

Any mixed triaryl phosphate (TAP) esters may be used as cresyl diphenyl phosphate, tricresyl phosphate, mixed xylyl cresyl phosphates, lower alkylphenyl/phenyl phosphates, such as mixed isopropylphenyl/phenyl phosphates, t-butylphenyl phenyl phosphates. These esters are used extensively as plasticizers, functional fluids, gasoline additives, flame-retardant additives and the like.

An extreme pressure agent, sulfur-based extreme pressure agents, such as sulfides, sulfoxides, sulfones, thiophosphinates, thiocarbonates, sulfurized fats and oils, sulfurized olefins and the like; phosphorus-based extreme pressure agents, such as phosphoric acid esters (e.g., tricresyl phosphate (TCP) and the like), phosphorous acid esters, phosphoric acid ester amine salts, phosphorous acid ester amine salts, and the like; halogen-based extreme pressure agents, such as chlorinated hydrocarbons and the like; organometallic extreme pressure agents, such as thiophosphoric acid salts (e.g., zinc dithiophosphate (ZnDTP) and the like) and thiocarbamic acid salts; and the like can be used. As the anti-wear agent, organomolybdenum compounds such as molybdenum dithiophosphate (MoDTP), molybdenum dithiocarbamate (MoDTC) and the like; organoboric compounds such as alkylmercaptyl borate and the like; solid lubricant anti-wear agents such as graphite, molybdenum disulfide, antimony sulfide, boron compounds, polytetrafluoroethylene and the like; and the like can be used.

The phosphoric acid ester, thiophosphoric acid ester, and amine salt thereof functions to enhance the lubricating performances, and can be selected from known compounds conventionally employed as extreme pressure agents. Generally employed are phosphoric acid esters, a thiophosphoric acid ester, or an amine salt thereof which has an alkyl group, an alkenyl group, an alkylaryl group, or an aralkyl group, any of which contains approximately 3 to 30 carbon atoms.

Examples of the phosphoric acid esters include aliphatic phosphoric acid esters such as triisopropyl phosphate, tributyl phosphate, ethyl dibutyl phosphate, trihexyl phosphate, tri-2-ethylhexyl phosphate, trilauryl phosphate, tristearyl phosphate, and trioleyl phosphate; and aromatic phosphoric acid esters such as benzyl phenyl phosphate, allyl diphenyl phosphate, triphenyl phosphate, tricresyl phosphate, ethyl diphenyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, and tributylphenyl phosphate. Preferably, the phosphoric acid ester is a trialkylphenyl phosphate.

Examples of the thiophosphoric acid esters include aliphatic thiophosphoric acid esters such as triisopropyl thiophosphate, tributyl thiophosphate, ethyl dibutyl thiophosphate, trihexyl thiophosphate, tri-2-ethylhexyl thiophosphate, trilauryl thiophosphate, tristearyl thiophosphate, and trioleyl thiophosphate; and aromatic thiophosphoric acid esters such as benzyl phenyl thiophosphate, allyl diphenyl thiophosphate, triphenyl thiophosphate, tricresyl thiophosphate, ethyl diphenyl thiophosphate, cresyl diphenyl thiophosphate, dicresyl phenyl thiophosphate, ethylphenyl diphenyl thiophosphate, diethylphenyl phenyl thiophosphate, propylphenyl diphenyl thiophosphate, dipropylphenyl phenyl thiophosphate, triethylphenyl thiophosphate, tripropylphenyl thiophosphate, butylphenyl diphenyl thiophosphate, dibutylphenyl phenyl thiophosphate, and tributylphenyl thiophosphate. Preferably, the thiophosphoric acid ester is a tri-alkylphenyl thiophosphate.

Also employable are amine salts of the above-mentioned phosphates and thiophosphates. Amine salts of acidic alkyl or aryl esters of the phosphoric acid and thiophosphoric acid are also employable. Preferably, the amine salt is an amine salt of trialkylphenyl phosphate or an amine salt of alkyl phosphate.

One or any combination of the compounds selected from the group consisting of a phosphoric acid ester, a thiophosphoric acid ester, and an amine salt thereof may be used.

The phosphorus acid ester and/or its amine salt function to enhance the lubricating performances, and can be selected from known compounds conventionally employed as extreme pressure agents. Generally employed are a phosphorus acid ester or an amine salt thereof which has an alkyl group, an alkenyl group, an alkylaryl group, or an aralkyl group, any of which contains approximately 3 to 30 carbon atoms.

Examples of the phosphorus acid esters include aliphatic phosphorus acid esters such as triisopropyl phosphite, tributyl phosphite, ethyl dibutyl phosphite, trihexyl phosphite, tri-2-ethylhexyl phosphite, trilauryl phosphite, tristearyl phosphite, and trioleyl phosphite; and aromatic phosphorus acid esters such as benzyl phenyl phosphite, allyl diphenylphosphite, triphenyl phosphite, tricresyl phosphite, ethyl diphenyl phosphite, tributyl phosphite, ethyl dibutyl phosphite, cresyl diphenyl phosphite, dicresyl phenyl phosphite, ethylphenyl diphenyl phosphite, diethylphenyl phenyl phosphite, propylphenyl diphenyl phosphite, dipropylphenyl phenyl phosphite, triethylphenyl phosphite, tripropylphenyl phosphite, butylphenyl diphenyl phosphite, dibutylphenyl phenyl phosphite, and tributylphenyl phosphite. Also favorably employed are dilauryl phosphite, dioleyl phosphite, dialkyl phosphites, and diphenyl phosphite. Preferably, the phosphorus acid ester is a dialkyl phosphite or a trialkyl phosphite.

The phosphate salt may be derived from a polyamine. The polyamines include alkoxylated diamines, fatty polyamine diamines, alkylenepolyamines, hydroxy containing polyamines, condensed polyamines arylpolyamines, and heterocyclic polyamines. Commercially available examples of alkoxylated diamines include those amine where y in the above formula is one. Examples of these amines include Ethoduomeen T/13 and T/20 which are ethylene oxide condensation products of N-tallowtrimethylenediamine containing 3 and 10 moles of ethylene oxide per mole of diamine, respectively.

In another embodiment, the polyamine is a fatty diamine. The fatty diamines include mono- or dialkyl, symmetrical or asymmetrical ethylene diamines, propane diamines (1, 2 or 1,3), and polyamine analogs of the above. Suitable commercial fatty polyamines are Duomeen C. (N-coco-1,3-diaminopropane), Duomeen S(N-soya-1,3-diaminopropane), Duomeen T (N-tallow-1,3-diaminopropane), and Duomeen O(N-oleyl-1,3-diaminopropane). "Duomeens" are commercially available from Armak Chemical Co., Chicago, Ill.

Such alkylenepolyamines include methylenepolyamines, ethylenepolyamines, butylenepolyamines, propylenepolyamines, pentylenepolyamines, etc. The higher homologs and related heterocyclic amines such as piperazines and N-amino alkyl-substituted piperazines are also included. Specific examples of such polyamines are ethylenediamine, triethylenetetramine, tris-(2-aminoethyl)amine, propylenediamine, trimethylenediamine, tripropylenetetramine, tetraethylenepentamine, hexaethyleneheptamine, pentaethylenehexamine, etc. Higher homologs obtained by condensing two or more of the above-noted alkyleneamines are similarly useful as are mixtures of two or more of the aforedescribed polyamines.

In one embodiment the polyamine is an ethylenepolyamine. Such polyamines are described in detail under the heading Ethylene Amines in Kirk Othmer's "Encyclopedia of Chemical Technology", 2d Edition, Vol. 7, pages 22-37, Interscience Publishers, New York (1965). Ethylenepolyamines are often a complex mixture of polyalkylenepolyamines including cyclic condensation products.

Other useful types of polyamine mixtures are those resulting from stripping of the above-described polyamine mixtures to leave, as residue, what is often termed "polyamine bottoms". In general, alkylenepolyamine bottoms can be characterized as having less than 2%, usually less than 1% (by weight) material boiling below 200° C. A typical sample of such ethylene polyamine bottoms obtained from the Dow Chemical Company of Freeport, Tex. designated "E-100". These alkylenepolyamine bottoms include cyclic condensation products such as piperazine and higher analogs of diethylenetriamine, triethylenetetramine and the like. These alkylenepolyamine bottoms can be reacted solely with the acylating agent or they can be used with other amines, polyamines, or mixtures thereof. Another useful polyamine is a condensation reaction between at least one hydroxy compound with at least one polyamine reactant containing at least one primary or secondary amino group. The hydroxy compounds are preferably polyhydric alcohols and amines. The polyhydric alcohols are described below. (See carboxylic ester dispersants.) In one embodiment, the hydroxy compounds are polyhydric amines. Polyhydric amines include any of the above-described monoamines reacted with an alkylene oxide (e.g., ethylene oxide, propylene oxide, butylene oxide, etc.) having from two to 20 carbon atoms, or from two to four. Examples of polyhydric amines include tri-(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris(hydroxymethyl)aminomethane (THAM).

Polyamines which react with the polyhydric alcohol or amine to form the condensation products or condensed amines, are described above. Preferred polyamines include triethylenetetramine (TETA), tetraethylenepentamine (TEPA), pentaethylenehexamine (PEHA), and mixtures of polyamines such as the above-described "amine bottoms".

Examples of extreme pressure additives include sulphur-based extreme pressure additives such as dialkyl sulphides, dibenzyl sulphide, dialkyl polysulphides, dibenzyl disulphide, alkyl mercaptans, dibenzothiophene and 2,2'-dithiobis(benzothiazole); phosphorus-based extreme pressure additives such as trialkyl phosphates, triaryl phosphates, trialkyl phosphonates, trialkyl phosphites, triaryl phosphites and dialkylhydrozine phosphites, and phosphorus- and sulphur-based extreme pressure additives such as zinc dialkyldithiophosphates, dialkylthiophosphoric acid, trialkyl thiophosphate esters, acidic thiophosphate esters and trialkyl trithiophosphates. These extreme pressure additives can be used individually or in the form of mixtures, conveniently in an amount within the range from 0.1 to 2 parts by weight, per 100 parts by weight of the base oil.

All the above can be performance enhanced using a variety of cobase stocks, AN, AB, ADPO, ADPS, ADPM, and/or a variety of mono-basic, di-basic, and tribasic esters in conjunction with low sulfur, low aromatic, low iodine number, low bromine number, high analine point, isoparafin.

Method of Use of Lubricant Composition Embodiments:

The biological based lubricant compositions can be employed in the present disclosure in a variety of lubricant-related end uses, such as a lubricant oil or grease for a device or apparatus requiring lubrication of moving and/or interacting mechanical parts, components, or surfaces. Useful apparatuses include engines and machines. More specific equipment includes, but is not limited to, gasoline fired engines, diesel fired engines, natural gas fired engines, gear boxes, wind turbines and circulating hydraulic pumps. The biological based lube base oils with improved low temperature properties of the present disclosure are most suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants, metal working fluids.

Furthermore, the biological based lube base oils with improved low temperature properties of this disclosure are derived from renewable sources; it is considered a sustainable product and can meet "sustainability" standards set by different industry groups or government regulations.

The disclosure is now illustrated by means of the following non-limiting examples.

EXAMPLES

Example 1

Hydrogenation of Dimer Acid Using Supported Nickel Catalyst

An amount of 102.8 g hydrogenated $C_{36}$ dimer acid (CAS No. [68783-41-5], Aldrich catalogue #432369) was mixed with 5.32 grams of nickel on Kieselguhr (60 wt % nickel, Aldrich catalogue #208787) in a glass liner (catalyst loading: 5.2 wt %). The glass liner was then inserted in a 300-cc autoclave, sealed, and heated under a flowing $H_2$ (100 cc/min) at 516 psig and 300° C. with stirring for 24 hours. The products were separated by filtration and dried with anhydrous magnesium sulfate, yield 86% (24791-1234-4; theoretical yield: 89% for complete hydrogenation). Both NMR ($^1H$, $^{13}C$) and IR suggest that the carboxylic acid functionality has been significantly removed by hydrogenation (FIGS. 1-4, 6, and 7).

Example 2

Hydrogenation of Dimer Acid Using Supported Nickel Catalyst

Figure 5:
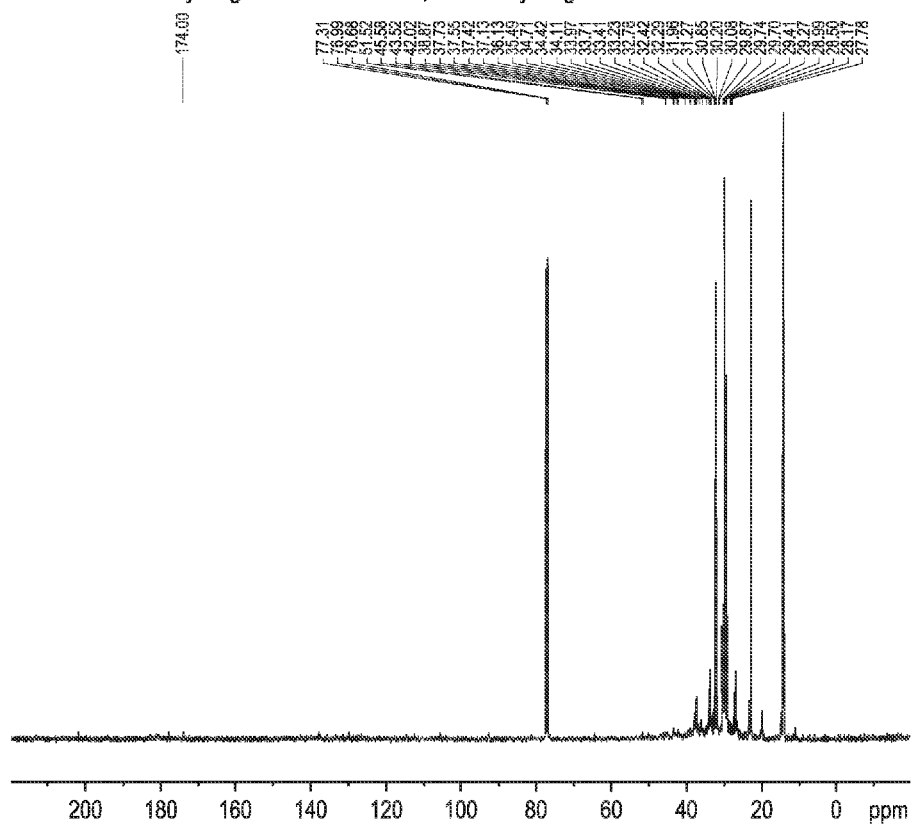
FIG. 5 is the $^{13}C$ NMR spectrum of products from Example 2.
Figure 6:
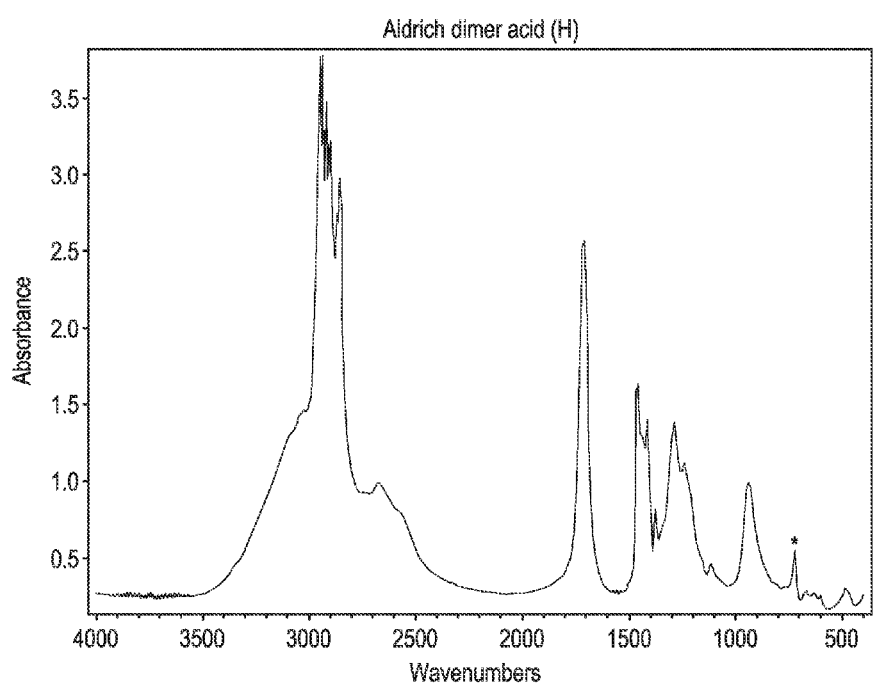
FIG. 6 is the IR spectrum of hydrogenated dimer acid that was used as starting material for Examples 1 and 2.
Figure 7:
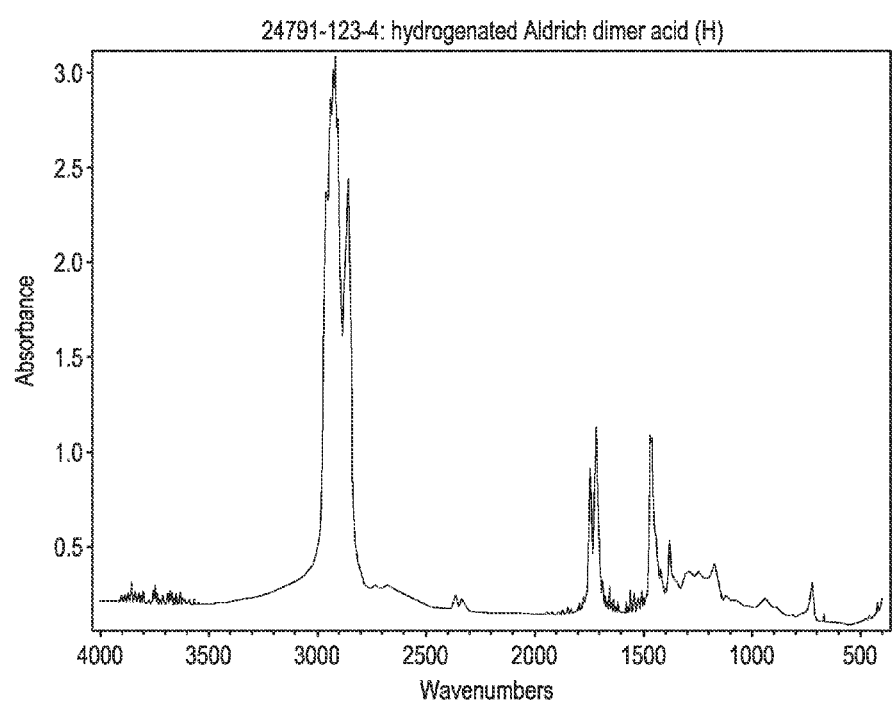
FIG. 7 is the IR spectrum of products from Example 1.
Figure 8:
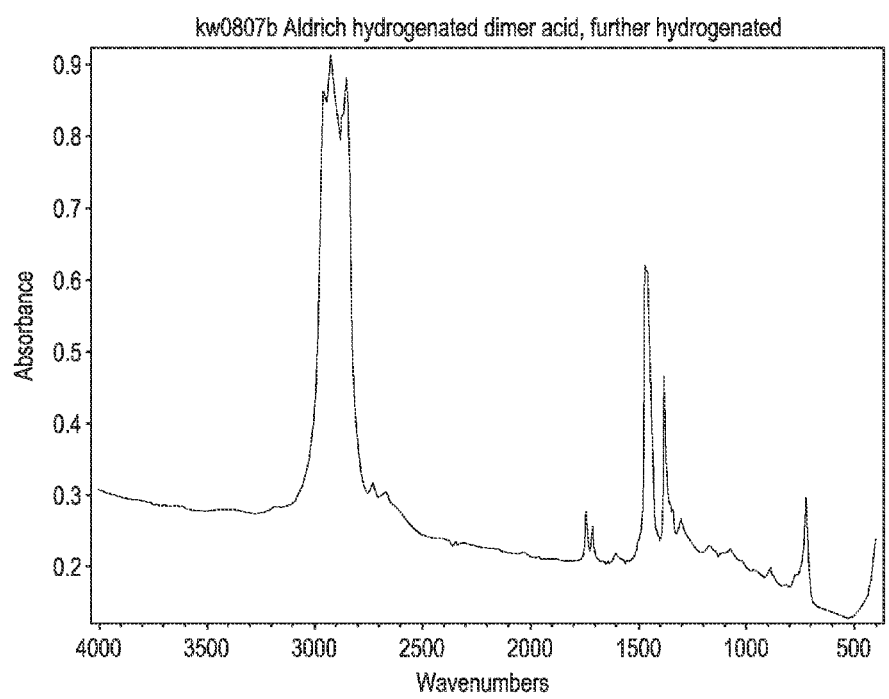
FIG. 8 is the IR spectrum of products from Example 2.

An amount of 110 grams hydrogenated $C_{36}$ dimer acid from Aldrich (CAS No. [68783-41-5], catalogue #432369) was mixed with 7.7 g of nickel on Kieselguhr (60 wt % nickel, Aldrich catalogue #208787) in a glass liner (catalyst loading: 7 wt %). The glass liner was then inserted in a 300-cc autoclave, sealed, and heated under a flowing $H_2$ (100 cc/min) at 520 psig and 313° C. with stirring for 24 hours. The products were separated by filtration and dried with anhydrous magnesium sulfate, yield 78% (24534-2; theoretical yield: 89% for complete hydrogenation). Both $^{13}C$ NMR and IR suggest that the carboxylic acid functionality has been nearly completely removed by hydrogenation (FIGS. 5 and 8).

Example 3

Hydrogenation of Dimer Acid Using Supported Nickel Catalyst

Figure 9:
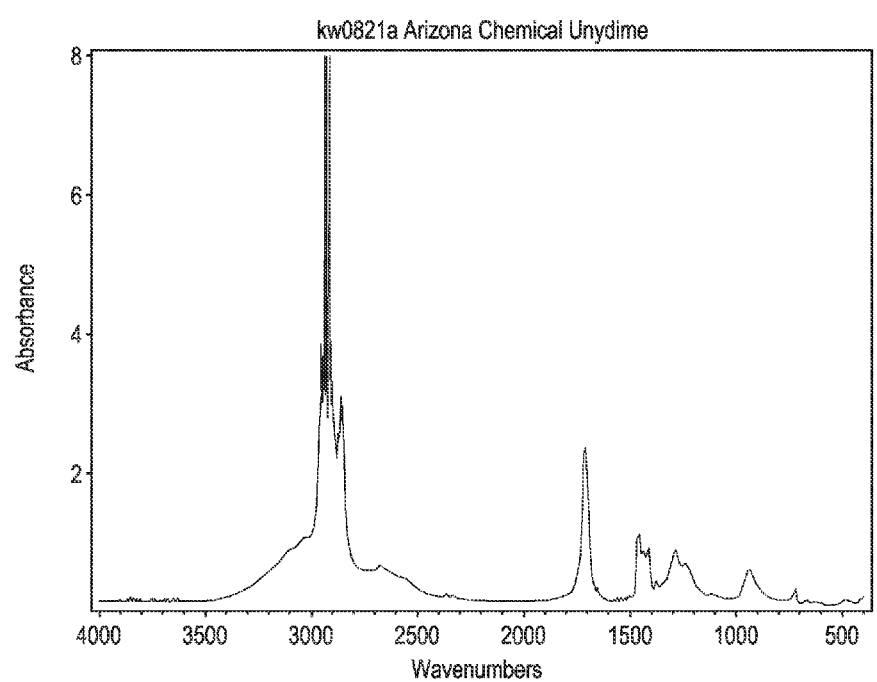
FIG. 9 is the IR spectrum of the starting material for Example 3.
Figure 10:
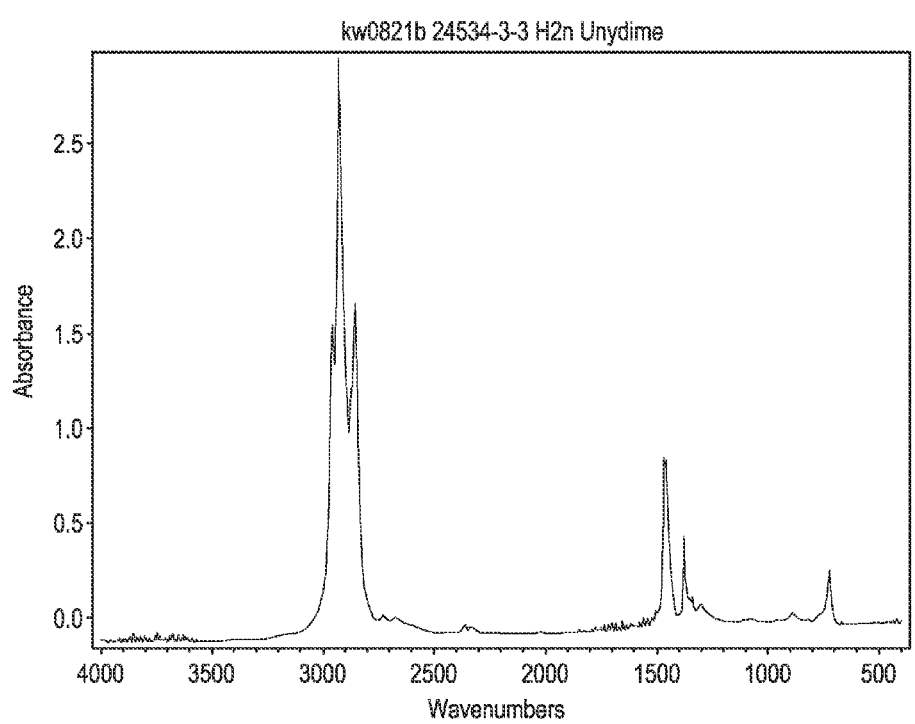
FIG. 10 is the IR spectrum of products from Example 3.

An amount of 150 grams of $C_{36}$ dimer acid (UNIDYME from Arizona Chemical) was mixed with 10.5 grams of nickel on Kieselguhr (60 wt % nickel, Aldrich catalogue #208787) in a glass liner (catalyst loading: 7 wt %). The glass liner was then inserted in a 300-cc autoclave, sealed, and heated under a flowing $H_2$ at 100 cubic centimeters per minute (cc/min) at 516 pounds per square inch gauge (psig) and 310° C. with stirring for 26.75 hours. The products were separated by filtration, yield 77% (24534-3; theoretical yield: 89% for complete hydrogenation). IR suggests that the carboxylic acid functionality has been completely removed by hydrogenation (FIGS. 9-10).

Example 4

Physical Properties of Hydrogenated Products

Viscosity and pour point for the starting materials and their corresponding hydrogenated products were measured and the results are listed in the Table 4 below.

TABLE 4

| | dimer acid - starting material for Examples 1 and 2 | Product from Example 1 | Product from Example 2 | UNIDYME- starting material for Example 3 | Product from Example 3 | PAO6 |
|---|---|---|---|---|---|---|
| Hydrogenation catalyst | | Nickel on Kiesel-guhr | Nickel on Kiesel-guhr | | Nickel on Kiesel-guhr | From 1-decene |
| Wt % catalyst | | 5.2 | 7 | | 7 | |
| Temperature (° C.) | | 300 | 313 | | 310 | |
| $H_2$ pressure (psig) | | 516 | 520 | | 516 | |
| $H_2$ flow rate (cc/minute) | | 100 | 100 | | 100 | |
| Hydrogenation time (hours) | | 24 | 24 | | 26.75 | |
| Pour point (° C.) | | −42 | −45 | −21 | −48 | −57 |
| Kv 100° C. (cS) | 86.69 | 25.41 | 6.53 | 77.73 | 5.4 | 5.8 |
| Kv 40° C. (cS) | 2360.73 | 261.94 | 38.86 | 2010.12 | 30.15 | 31 |
| VI | 91 | 116 | 121 | 96 | 114 | 138 |
| Wt % Noack volatility | | | | | 5.5 | 6-9 |

The lube product from Examples 1-3 showed excellent viscometrics, good VI and very low pour points. Furthermore, the lube in Example 3 showed lower Noack volatility of 5.5% than the synthetic poly-alpha-olefin lube of 5.8 cSt. The Example 1-3 lubes are derived from natural resources and can be made by efficient processes and have lube properties comparable to synthetic lube base stocks made from PAOs.

Both the starting material (Unidyme 10) and the products in Example 3 were analyzed using mass spectroscopy. The starting material was analyzed using Field Desorption Mass Spectroscopy (FDMS) and the products by Field Ionization Mass Spectroscopy (FIMS). Major species are listed in Table 5 below. The term DBE refers to double bond equivalent, indicating the degree of unsaturation for a given hydrocarbon molecule compared with the fully saturated hydrocarbon formula $C_nH_{2n+2}$ (n is an integer). By definition, a hydrocarbon molecule containing one C=C double bond ($C_nH_{2n}$) has a DBE of one. A hydrocarbon molecule containing one naphthenic ring but otherwise saturated ($C_nH_{2n}$) has a DBE of one. Similarly, the double bond equivalent can also be defined for the acid dimer. In this case, the degree of unsaturation for a given dicarboxylic acid is compared with a fully saturated dicarboxylic acid with the formula $C_nH_{2n-2}O_4$, which only refers to the hydrocarbon fragment of the molecule and excludes the C=O bond in the carboxylic group.

TABLE 5

(Composition of feed and products for Example 3)

| Unidyme 10 | | | | Product | | | |
|---|---|---|---|---|---|---|---|
| Mass | Percent | Formula | DBE ex. C=O | Mass | Percent | Formula | DBE |
| 562 | 53 | $C_{36}H_{66}O_4$ | 2 | 476 | 37.2 | $C_{34}H_{68}$ | 1 |
| 564 | 18 | $C_{36}H_{68}O_4$ | 1 | 478 | 6.7 | $C_{34}H_{70}$ | 0 |
| 560 | 12 | $C_{36}H_{64}O_4$ | 3 | 474 | 8.2 | $C_{34}H_{66}$ | 2 |
| 558 | 7 | $C_{36}H_{62}O_4$ | 4 | 472 | 1.8 | $C_{34}H_{64}$ | 3 |
| 556 | 6 | $C_{36}H_{60}O_4$ | 5 | 470 | 9.6 | $C_{34}H_{62}$ | 4 |
| 554 | 1.5 | $C_{36}H_{58}O_4$ | 6 | 468 | 9.1 | $C_{34}H_{60}$ | 5 |
| Sub-total | 97.5 | | | Sub-total | 72.6 | | |
| | | | | 504 | 0.6 | $C_{36}H_{72}$ | 1 |
| | | | | 492 | 0.4 | $C_{35}H_{72}$ | 0 |
| | | | | 490 | 2.5 | $C_{35}H_{70}$ | 1 |
| | | | | 488 | 1.3 | $C_{35}H_{68}$ | 2 |
| | | | | 462 | 4.7 | $C_{33}H_{66}$ | 1 |
| | | | | 460 | 1.2 | $C_{33}H_{64}$ | 2 |
| | | | | 456 | 1.4 | $C_{33}H_{60}$ | 4 |
| | | | | 454 | 1.6 | $C_{33}H_{58}$ | 5 |
| | | | | 448 | 2.3 | $C_{32}H_{64}$ | 1 |
| | | | | 434 | 1.6 | $C_{31}H_{62}$ | 1 |
| | | | | 420 | 1.3 | $C_{30}H_{60}$ | 1 |
| | | | | 406 | 1.1 | $C_{29}H_{58}$ | 1 |
| | | | | 392 | 1 | $C_{28}H_{56}$ | 1 |
| | | | | 378 | 1 | $C_{27}H_{54}$ | 1 |
| | | | | Subtotal | 22 | | |
| Others | 2.5 | | | Others | 5.4 | | |

By comparing the major components in the starting material and the products, the difference in mass for the corresponding pairs is 86. Thus, the major reaction is hydro-decarboxylation, wherein the oxygen atoms in the starting material are removed in the form of $CO_2$ and the C=C double bond is saturated by hydrogen. Therefore both the saturation for the hydrocarbon fragment and the oxygen removal are achieved in a substantially single step.

Figure 11:
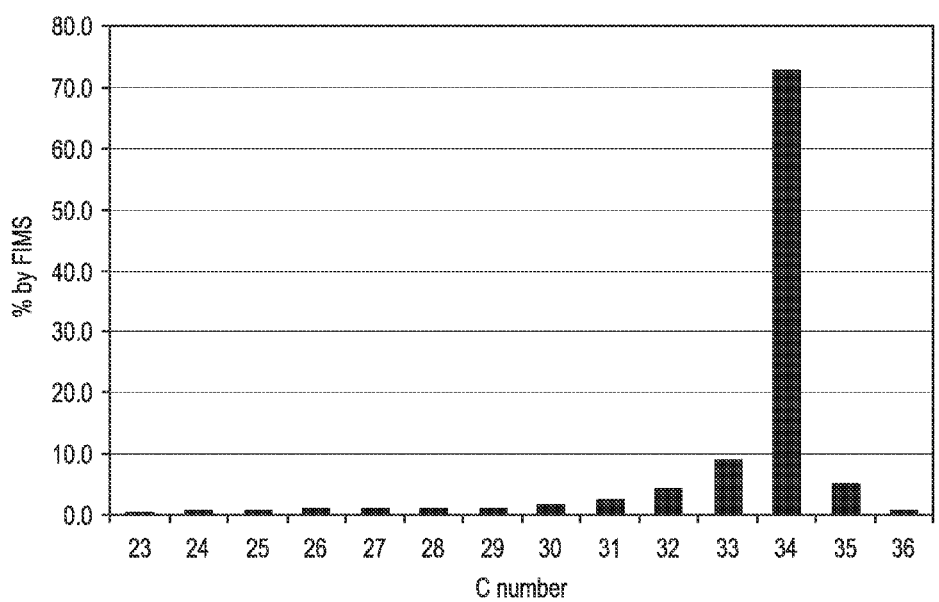
FIG. 11 is the carbon number distribution for products from Example 3.

The composition for the products in Example 3 is illustrated in FIG. 11 below. The products contain predominantly components with 34 carbon atoms. In those products, two carbons were lost during the hydrogenation step.

Example 5

Low Temperature Properties of Hydrogenated Products

Several different lube base stocks were evaluated for low temperature performance by measuring the ratio of the observed Cold Crank Simulator (CCS) viscosity to the predicted CCS viscosity (by Walther equation) for many different prior art lube base stocks and inventive base stocks. The observed Cold Crank Simulator (CCS) viscosity is measured according to ASTM D5293. The predicted CCS viscosity (by Walther equation) is estimated according to ASTM D341. The CCS viscosity was measured at −35° C., which is the most demanding temperature. When measured at a higher temperature, the CCS ratio is slightly higher. Alternative CCS test temperatures may be below −20° C., or below −25° C., or below −30° C. The lube base stocks produced from renewable biological sources were generated by hydrogenating commercially available dimer acids from various sources (see Table 7 below) using conditions of Examples 1-3. For comparison purposes, CCS Ratios were also measured for prior art Group I, II, III, and IV lube base stocks with similar KV100s to the lube base stocks produced from renewable biological sources invention of the present disclosure. The results are shown in Table 6 and Table 7 below and demonstrate the significantly lower CCS ratio measured on the inventive lube base stock samples.

The lube base stocks of the present disclosure as well as prior art non-renewable lube base stocks were also analyzed compositionally via the 2DGC technique described above in the detailed description. Table 6 includes data on comparative non-renewable prior art lube base stocks and Table 7 includes data on the inventive lube base stocks from renewable biological sources of the instant disclosure.

TABLE 6

Properties and Compositions of Non-renewable Prior Art Lube Base stocks

| | | Prior Art Base Stock Group | | | | | | |
|---|---|---|---|---|---|---|---|---|
| | | Group I | Group II | Group II | Group III | Group III | Group IV | Group IV |
| | | | | | Product Name | | | |
| | | Core 150 | EHC 45 | EHC 60 | Visom 4 | Visom 6 | PAO 5 | PAO 6 |
| | | | | | Sample No. | | | |
| | Method | 10-43744 10-68134 | 99-7800 | 09-41845 | 06-40784 | 12-8590 | 06-38387 | 09-83412 |
| Base Stock Properties | | | | | | | | |
| KV40, cSt | D7279 (modified) or D445 | 30.7 | 22.11 | 36.155 | 16.11 | 35.21 | 24.94 | 30 |
| KV100, cSt | D7279 (modified) or D445 | 5.225 | 4.494 | 6.065 | 3.909 | 6.582 | 5.107 | 5.831 |
| Predicted CCS @ −35 C., cP | Walter Equation | 14500 | 4323 | 14820 | 1330 | 6994 | 3949 | 5464 |
| Measured CCS @ −35 C., cP | D5293 | 17910 | 5400 | 21750 | 1375 | 6965.5 | 2626 | 3610 |
| CCS Ratio | Calculation | 1.24 | 1.25 | 1.47 | 1.03 | 1.00 | 0.66 | 0.66 |
| Viscosity Index | D2270 | 100 | 116 | 113 | 142 | 144 | 138 | 141 |
| Composition | | | | | | | | |
| Paraffins, wt % | 2DGC | 31% | 37% | | 81% | | | |
| 1-Ring Naphthenes, wt % | 2DGC | 47% | 63% | | 19% | | | |
| 2-Ring Naphthenes & Aromatics, wt % | 2DGC | 22% | 0% | | 0% | | | |
| Ratio of 1R Naphthenes to Paraffins | Calculation | 1.48 | 1.67 | | 0.23 | | | |

TABLE 7

Properties and Compositions of Biological-based Renewable Inventive Lube Base stocks

| | | Inventions | | | | | | |
|---|---|---|---|---|---|---|---|---|
| | | 1 | 2 | 3 | 4 | 5 | 6 | 7 |
| | | | | | Sample No. | | | |
| | Method | 10-85289 10-112759 11-119000 | 11-44544 | 11-39265 | 11-39266 | 11-39268 | 11-39269 | 11-39267 11-97990 |
| Base Stock Properties | | | | | | | | |
| KV40, cSt | D7279 (modified) or D445 | 30.6 | 30.8 | 39.0 | 40.0 | 30.6 | 29.7 | 25.9 |

TABLE 7-continued

Properties and Compositions of Biological-based Renewable Inventive Lube Base stocks

| | | Inventions | | | | | | |
|---|---|---|---|---|---|---|---|---|
| | | 1 | 2 | 3 | 4 | 5 | 6 | 7 |
| | | | | | Sample No. | | | |
| | Method | 10-85289 10-112759 11-119000 | 11-44544 | 11-39265 | 11-39266 | 11-39268 | 11-39269 | 11-39267 11-97990 |
| KV100, cSt | D7279 (modified) or D445 | 5.46 | 5.47 | 6.47 | 6.55 | 5.49 | 5.39 | 4.98 |
| Predicted CCS @ −35 C., cP | Walter Equation | 10153 | 10361 | 15564 | 16885 | 9690 | 9033 | 6092 |
| Measured CCS @ −35 C., cP | D5293 | 4955 | 5020 | 8070 | 8500 | 4900 | 4660 | 3400 |
| CCS Ratio | Calculation | 0.49 | 0.48 | 0.52 | 0.50 | 0.51 | 0.52 | 0.56 |
| Viscosity Index | D2270 | 114 | 114 | 117 | 116 | 116 | 117 | 120 |
| Composition | | | | | | | | |
| Paraffins, wt % | 2DGC | 18% | 19% | 26% | 25% | | 25% | 29% |
| 1-Ring Naphthenes, wt % | 2DGC | 49% | 48% | 50% | 48% | | 57% | 61% |
| 2-Ring Naphthenes & Aromatics, wt % | 2DGC | 33% | 33% | 24% | 27% | | 18% | 9% |
| Ratio of 1R Naphthenes to Paraffins | Calculation | 2.74 | 2.54 | 1.92 | 1.97 | | 2.34 | 2.12 |
| Feedstock properties | | | | | | | | |
| Acid value (mg KOH/g) | | 197.0 | | 193.0 | 192.5 | 195.5 | 195.9 | 195.3 |
| Monomer (%) | | 0.1 | | 2.0 | 4.1 | 0.6 | 0.6 | 3.9 |
| Dimer (%) | | 99.0 | | 77.0 | 84.6 | 96.6 | 97.4 | 94.5 |
| Trimer (%) | | 0.9 | | 20.0 | 11.3 | 2.8 | 2.0 | 1.6 |
| Dimer Acid Precursor | | UNIDYME 10 | UNIDYME 10 | Pripol 1017 | Jaric D51 | Jaric D70 | Jaric D75 | Empol 1008 |
| Fatty acid starting material | | Tall Oil Fatty Acids | Tall Oil Fatty Acids | Unknown | Unknown | Unknown | Unknown | Oleic Acid |
| Vendor | | Arizona Chemical | Arizona Chemical | CRODA | JarChem | JarChem | JarChem | Cognis (BASF) |
| Reaction conditions | | | | | | | | |
| Temperature, C. | | 350 | 350 | 350 | 350 | 350 | 350 | 350 |
| Catalyst (Ni/Kieselguhr) loading, wt % | | 7 | 7 | 7 | 7 | 7 | 7 | 7 |
| Pressure, psig | | 500 | 500 | 500 | 500 | 500 | 500 | 500 |
| H2 (cc/min) | | 100 | 100 | 100 | 100 | 100 | 100 | 100 |
| Time, hour | | 24 | 24 | 24 | 24 | 24 | 24 | 24 |

Table 6 shows the properties and compositions of prior art lube base stocks from non-renewable petroleum based sources including Group I, Group II, Group III, and Group IV base stocks. The prior art base stocks have CCS ratios ranging from 0.66 (for Group IV) to 1.47 (for Group II). In contrast, the inventive renewable biological based lube base stocks shown in Table 7 have CCS ratios ranging from 0.48 to 0.56, which is a surprising and unexpected improvement over the prior art lube base stocks.

Table 6 shows the ratio of 1-ring naphthenes to paraffins of prior art lube base stocks from non-renewable petroleum based sources including Group I, Group II, Group III, and Group IV base stocks. The prior art lube base stocks have 1-ring naphthenes to paraffins ratios ranging from 0.23 (for Group III) to 1.67 (for Group II). In contrast, the inventive renewable biological based lube base stocks shown in Table 7 have 1-ring naphthenes to paraffins ratios ranging from 1.92 to 2.74, which clearly distinguish the compositions of these base stocks from the prior art base stocks. The unique chemical composition of these inventive renewable biological based lube base stocks leads to improved low temperature properties, and in particular, surprisingly lower CCS ratios.

TABLE 8

Characterization of basestocks derived from renewable and petroleum sources by $^{13}$C NMR

| Description | Sample No. | Epsilon Carbon, mole % | Total Pendant Groups, mole % | Pendant Methyl Groups, mole % | No. Side Chains/ Molecule | Carbon number by 13C NMR | Free Carbon Index (FCI) |
|---|---|---|---|---|---|---|---|
| Invention 2 | 11-44544 | 11.63 | 4.12 | 3.47 | 0.68 | 19.67 | 2.29 |
| Invention 3 | 11-39265 | 13.13 | 4.66 | 3.91 | 0.83 | 21.31 | 2.80 |
| Invention 4 | 11-39266 | 12.94 | 4.60 | 3.89 | 0.85 | 21.90 | 2.83 |
| Invention 5 | 11-39268 | 13.08 | 4.44 | 3.75 | 0.80 | 21.27 | 2.78 |
| Invention 6 | 11-39269 | 12.24 | 4.49 | 3.79 | 0.80 | 21.16 | 2.59 |

TABLE 8-continued

Characterization of basestocks derived from renewable and petroleum sources by $^{13}$C NMR

| Description | Sample No. | Epsilon Carbon, mole % | Total Pendant Groups, mole % | Pendant Methyl Groups, mole % | No. Side Chains/ Molecule | Carbon number by 13C NMR | Free Carbon Index (FCI) |
|---|---|---|---|---|---|---|---|
| Invention 7 | 11-39267 | 13.34 | 5.00 | 4.33 | 0.95 | 22.03 | 2.94 |
| Grp I | 11-48508 | 12.04 | 6.98 | 5.25 | 2.04 | 38.80 | 4.67 |
| Grp III | 99-7800 | 13.18 | 8.98 | 7.04 | 2.54 | 36.06 | 4.75 |
| Grp III | 06-40784 | 16.66 | 11.07 | 9.00 | 3.05 | 33.89 | 5.65 |

Table 8 shows the $^{13}$C NMR results for the inventive renewable biological based lube base stocks and conventional non-renewable Group I, II, and III lube base stocks. The inventive renewable biological based lube base stocks have a FCI of less than 3.0; while those of conventional non-renewable lube base stocks have FCI greater than 4.0.

Example 6

Lubricants with Renewable Base Stocks for CCS Viscosity-Volatility Relationship

Several different lubricant compositions including different lube base stocks were evaluated for Cold Crank Simulator (CCS) viscosity versus volatility relationship. Volatility was assessed via the Noack weight loss % (Noack Volatility method per ASTM D6375 modified method). The CCS viscosity was measured at −35 deg. C. in cP as described in Example 5. The lube base stocks produced from renewable biological sources were generated by hydrogenating commercially available dimer acids from various sources including oleic acid derived, tall oil derived.

FIG. 13 is a graph showing the relationship between Noack volatility and Cold Crank Simulator (CCS) viscosity for lubricant formulations including the inventive renewable base stocks (RBS) and comparative non-renewable Group III (Visom) and Group IV (PAO) base stocks. The inventive lubricant formulations made from renewable base stocks are depicted in FIG. 13 as solid circles. The renewable lube base stocks had a viscosity of range of from 5.0 to 6.6 cSt. For comparison, FIG. 13 also shows the CCS viscosity versus volatility relationship for lubricant compositions including a Group IV PAO blend stock (PAO—4 cSt and PAO—6 cSt) and Group III Visom blend stock. Generally lubricant compositions including non-renewable Group III and Group IV base stocks yield a more favorable CCS viscosity-Noack volatility relationship than non-renewable Group II base stocks. Non-renewable Group III and IV are premium base stocks having a more favorable CCS-Noack volatility relationship to non-renewable Group II base stocks. However, for the lubricant compositions in FIG. 13 including the renewable biological lube base stocks, the CCS viscosity-Noack volatility relationship is more favorable than the non-renewable Group III base stock and approaches the performance of the non-renewable Group IV base stock. The RBS lubricant compositions surprisingly and unexpectedly yielded a CCS-Noack volatility relationship between that of nonrenewable Group III and Group IV base stocks.

Example 7

Lubricants with Renewable Base Stocks for Solvency

Several different lubricant compositions including different lube base stocks were evaluated for solvency by measuring aniline point in degrees centigrade. The aniline point is a measure of lubricant solubility by determining the temperature at which a heated, miscible hydrocarbon-aniline mixture separates into its two phases. The aniline point is measured according to ASTM D611. The lower the aniline point temperature, the greater the solubility of the lubricant composition. Table 9 below depicts the aniline point of various lubricant compositions with different lube base stocks. As shown in Table 9, the aniline point of the renewable lube base stock (RBS) is significantly lower than that of petroleum derived Group II base stocks (EHC 45), as well as Group III (Visom 4 and 6) and Group IV (PAO-4 and 6) and Gas-to-Liquid (GTL 4 and 6) base stocks. The improved solvency of renewable biological derived lube base stocks is surprising and unexpected relative to petroleum derived Group II base stocks (EHC 45).

TABLE 9

Aniline Point of Lubricant Compositions With Different Base Stocks

|  | Visom4 | PAO4 | GTL4 | RBS | EHC45 | AN5 | Visom6 | PAO6 | GTL6 |
|---|---|---|---|---|---|---|---|---|---|
| KV@100° C., cSt | 4.1 | 4.1 | 3.7 | 5.4 | 4.7 | 4.7 | 6.5 | 5.8 | 6.1 |
| CCS@−35° C., cP | 1550 | 1290 |  | 4970 | 5400 |  | 6860 | 3600 | 4210 |
| Viscosity Index | 147 | 128 | 141 | 113 | 117 | 74 | 145 | 139 | 159 |
| Pour Point, ° C. | −21 | −72 | −27 | −60 | −18 | −39 | −18 | −54 | −18 |
| Aniline point, ° C. | 117 | 120 |  | 107 | 112 | 32 | 126 | 129 | 129 |
| Noack Volatility, wt. % | 13.4 | 14.0 | 16.0 | 6.7 |  | 12.7 | 6.4 | 5.7 | 7.2 |
| Oxidation on-set Temp., ° C. |  |  |  | 195 |  | 235 | 196 | 199 | 197 |

The improved solvency of lubricant compositions including renewable biological base stocks is also exhibited by an improved thickening effect when a constant amount of a viscosity modifier is added into lubricant compositions with different base stocks. Table 10 below shows that the lubricant composition including the renewable biological lube base stock yields a greater thickening effect compared to a comparable lubricant composition including a Group III (Visom) base stock or a Group IV (PAO) base stock. All three base stocks were approximately 5.5 cSt viscosity. Each of the lubricant compositions in Table 10 included 7 wt. % of a styrene-isoprene star polymer viscosity modifier concentrate based on the total weight of the lubricant composition. The % thickening of the lubricant composition with the renewable biological base stock was 163% compared to 145% for the Group III base stock and 141% for the Group IV base stock. The improved thickening performance would allow lubricant formulators to use less viscosity modifier in lubricant formulations while still maintaining the same thickening effect. The high performance RBS lube base stocks of the present disclosure have an excellent CCS-Noack volatility relationship and excellent low temperature properties in lubricant compositions while surprisingly maintaining good solubility properties.

TABLE 10

% Thickening of Lubricant Compositions With Different Base Stocks

|  | RBS | Visom | PAO |
|---|---|---|---|
| Base Oil Viscosity KV100 | 5.469 14.41 | 5.469 13.42 | 5.469 13.17 |
| % Thickening | 163% | 145% | 141% |

PCT/EP Clauses:

1. A lubricant composition comprising from 20 to 99.8 wt. % of a renewable lube base stock produced from a renewable biological source and an effective amount of one or more lubricant additives, wherein the renewable lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160.

2. The lubricant composition of clause 1, wherein the effective amount of one or more lubricant additives ranges from 0.2 to 20 wt. % of the total lubricant composition.

3. The lubricant composition of clauses 1-2, wherein the one or more lubricant additives are selected from the group consisting of antioxidants, stabilizers, detergents, dispersants, demulsifiers, antioxidants, anti-wear additives, pour point depressants, viscosity index modifiers, friction modifiers, anti-foam additives, defoaming agents, corrosion inhibitors, wetting agents, rust inhibitors, copper passivators, metal deactivators, extreme pressure additives, and combinations thereof.

4. The lubricant composition of clauses 1-3 further including one or more co-base stocks selected from the group consisting of API Group I, Group II, Group III, Group IV, Group V, gas-to-liquid (GTL), and combinations thereof.

5. The lubricant composition of clause 4, wherein the one or more co-base stocks range from 2 to 80 wt. % of the total lubricant composition.

6. The lubricant composition of clauses 1-5, wherein the lube base stock yields a CCS ratio (Cold Crank Simulator (CCS) viscosity to the predicted CCS viscosity by Walther equation) less than or equal to 0.85 at −35° C.

7. The lubricant composition of clause 1-6, wherein the lube base stock includes less than 3 wt. % oxygenates.

8. The lubricant composition of clauses 1-7, wherein the lube base stock has consecutive carbon numbers ranging from $C_{20}$ to $C_{60}$ with at least 40 wt % at a single carbon number selected from the group consisting of $C_{30}$, $C_{31}$, $C_{32}$, $C_{33}$, $C_{34}$, $C_{35}$, $C_{36}$, $C_{37}$, $C_{38}$, $C_{39}$, and $C_{40}$.

9. The lubricant composition of clauses 1-8, wherein the lube base stock has consecutive carbon numbers ranging from $C_{20}$ to $C_{60}$ with at least 40 wt % falling within a carbon number range from $C_{30}$ to $C_{40}$ 10. The lubricant composition of clauses 1-9, wherein the renewable biological source includes animal oils, animal fats, animal waxes, vegetable oils, vegetable fats, vegetable waxes, fish oils, fish fats, fish waxes, and algae sources.

11. The lubricant composition of clauses 1-10, wherein the lube base stock has a kinematic viscosity at 100° C. ranging from 1 to 100 cSt.

12. The lubricant composition of clauses 1-11, wherein the composition has a kinematic viscosity at 100° C. ranging from 2 to 40 cSt.

13. The lubricant composition of clauses 1-12, wherein the lube base stock has a sulfur content less than 300 ppm.

14. The lubricant composition of clauses 1-13, wherein the lube base stock has a nitrogen content less than 100 ppm.

15. The lubricant composition of clauses 1-14, wherein the lube base stock has an olefin content of less than 3 wt. % by proton NMR.

16. The lubricant composition of clauses 1-15, wherein the lube base stock has a Noack volatility of less than 10 wt. % for a viscosity of at least 4 cSt.

17. The lubricant composition of clauses 1-16, wherein the lube base stock has a Noack volatility of less than $(-79.8 * \log_{10}(\log_{10}(CCS @-35° C.))+54.26)$ and greater than $(-120 * \log_{10}(\log_{10}(CCS @-35° C.))+73.71)$.

18. The lubricant composition of clauses 1-17, wherein the lube base stock has a pour point less than −15° C.

19. The lubricant composition of clauses 1-18, wherein the composition yields a CCS viscosity-Noack volatility relationship at least 10% lower than the same lubricant composition including an API Group II lube base stock made from a non-renewable petroleum based source.

20. The lubricant composition of clauses 1-19, wherein the composition yields a solvency measured by aniline point of less than 112 deg. C.

21. The lubricant composition of clauses 1-20, wherein the composition yields a % thickening when blended with a 7 wt. % of a styrene-isoprene star polymer viscosity modifier of at least 146%.

22. The lubricant composition of clauses 1-21 used in lubricating applications selected from the group consisting of automotive crank case lubricants, automotive gear oils, transmission oils, industrial circulation lubricant, industrial gear lubricants, grease, compressor oil, pump oils, refrigeration lubricants, hydraulic lubricants, and metal working fluids.

23. The lubricant composition of clauses 1-22 used in equipment selected from the group consisting of gasoline fired engines, diesel fired engines, natural gas fired engines, gear boxes, wind turbines and circulating hydraulic pumps.

24. A lubricant composition comprising from 20 to 99.8 wt. % of a renewable lube base stock produced from a renewable biological source and an effective amount of one or more lubricant additives, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

25. The lubricant composition of clause 24, wherein the effective amount of one or more lubricant additives ranges from 0.2 to 20 wt. % of the total lubricant composition.

26. The lubricant composition of clauses 24-25, wherein the one or more lubricant additives are selected from the group consisting of antioxidants, stabilizers, detergents, dispersants, demulsifiers, antioxidants, anti-wear additives, pour point depressants, viscosity index modifiers, friction modifiers, anti-foam additives, defoaming agents, corrosion inhibitors, wetting agents, rust inhibitors, copper passivators, metal deactivators, extreme pressure additives, and combinations thereof.

27. The lubricant composition of clauses 24-26 further including one or more co-base stocks selected from the group consisting of API Group I, Group II, Group III, Group IV, Group V, gas-to-liquid (GTL), and combinations thereof.

28. The lubricant composition of clause 27, wherein the one or more co-base stocks range from 2 to 80 wt. % of the total lubricant composition.

29. The lubricant composition of clauses 24-28, wherein the Viscosity Index of the lube base stock is from 100 to 160.

30. The lubricant composition of clauses 24-29, wherein the renewable biological source includes animal oils, animal fats, animal waxes, vegetable oils, vegetable fats, vegetable waxes, fish oils, fish fats, fish waxes, and algae sources.

31. The lubricant composition of clauses 24-30, wherein the lube base stock has a kinematic viscosity at 100° C. ranging from 1 to 100 cSt.

32. The lubricant composition of clauses 24-31, wherein the composition has a kinematic viscosity at 100° C. ranging from 2 to 40 cSt.

33. The lubricant composition of clauses 24-32, wherein the lube base stock has a Noack volatility of less than 10 wt. % for a viscosity of at least 4 cSt.

34. The lubricant composition of clauses 24-33, wherein the lube base stock has a Noack volatility of less than $(-79.8*\log_{10}(\log_{10}(CCS @ -35° C.))+54.26)$ and greater than $(-120*\log_{10}(\log_{10}(CCS @ -35° C.))+73.71)$.

35. The lubricant composition of clauses 24-34, wherein the lube base stock has a pour point less than −15° C.

36. The lubricant composition of clauses 24-35, wherein the composition yields a CCS viscosity-Noack volatility relationship at least 10% lower than the same lubricant composition including an API Group II lube base stock made from a non-renewable petroleum based source.

37. The lubricant composition of clauses 24-36, wherein the composition yields a solvency measured by aniline point of less than 112 deg. C.

38. The lubricant composition of clauses 24-37, wherein the composition yields a % thickening when blended with a 7 wt. % of a styrene-isoprene star polymer viscosity modifier of at least 146%.

39. The lubricant composition of clauses 24-38 used in lubricating applications selected from the group consisting of automotive crank case lubricants, automotive gear oils, transmission oils, industrial circulation lubricant, industrial gear lubricants, grease, compressor oil, pump oils, refrigeration lubricants, hydraulic lubricants, and metal working fluids.

40. The lubricant composition of clauses 24-39 used in equipment selected from the group consisting of gasoline fired engines, diesel fired engines, natural gas fired engines, gear boxes, wind turbines and circulating hydraulic pumps.

41. The lubricant composition of clauses 1-40, wherein the lube base stock has a Free Carbon Index less than 3.0.

42. A method of making a lubricant composition comprising: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0 for the renewable lube base stock, and wherein the Viscosity Index of the renewable lube base stock is from 100 to 160.

43. A method of making a lubricant composition comprising: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C.

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

What is claimed is:

1. A lubricant composition comprising from 20 to 99.8 wt. % of a renewable lube base stock produced from a renewable biological source and an effective amount of one or more lubricant additives, wherein the renewable lube base stock includes from 10 to 35 wt. % paraffins, 40 to 70 wt. % 1-ring naphthenes, and 0 to 40 wt. % combined 2-ring naphthenes and aromatics, wherein the Free Carbon Index is less than 3.0, wherein pendant methyl groups mole % is less than or equal to 4.33, wherein the ratio of 1-ring naphthenes to paraffins is from 1.8 to 5.0 for the renewable lube base stock, and wherein the Viscosity Index of the renewable lube base stock is from 100 to 160.

2. The lubricant composition of claim 1, wherein the effective amount of one or more lubricant additives ranges from 0.2 to 20 wt. % of the total lubricant composition.

3. The lubricant composition of claim 1, wherein the one or more lubricant additives are selected from the group consisting of antioxidants, stabilizers, detergents, dispersants, demulsifiers, antioxidants, anti-wear additives, pour point depressants, viscosity index modifiers, friction modifiers, anti-foam additives, defoaming agents, corrosion inhibitors, wetting agents, rust inhibitors, copper passivators, metal deactivators, extreme pressure additives, and combinations thereof.

4. The lubricant composition of claim 1 further including one or more co-base stocks selected from the group consisting of API Group I, Group II, Group III, Group IV, Group V, gas-to-liquid (GTL), and combinations thereof.

5. The lubricant composition of claim 4, wherein the one or more co-base stocks range from 2 to 80 wt. % of the total lubricant composition.

6. The lubricant composition of claim 1, wherein the paraffins range from 15 to 30 wt. %.

7. The lubricant composition of claim 1, wherein the 1-ring naphthenes range from 45 to 65 wt. %.

8. The lubricant composition of claim 1, wherein the combined 2-ring naphthenes and aromatics range from 5 to 35 wt. %.

9. The lubricant composition of claim 1, wherein the ratio of 1-ring naphthene to paraffins is from 1.9 to 4.0.

10. The lubricant composition of claim 1, wherein the Viscosity Index of the lube base stock is from 110 to 140.

11. The lubricant composition of claim 1, wherein the lube base stock yields a CCS ratio (Cold Crank Simulator (CCS) viscosity to the predicted CCS viscosity by Walther equation) less than or equal to 0.85 at −35° C.

12. The lubricant composition of claim 1, wherein the lube base stock yields a CCS ratio (Cold Crank Simulator (CCS) viscosity to the predicted CCS viscosity by Walther equation) less than or equal to 0.60 at −35° C.

13. The lubricant composition of claim 1, wherein the lube base stock includes less than 3 wt. % oxygenates.

14. The lubricant composition of claim 1, wherein the lube base stock has consecutive carbon numbers ranging from $C_{20}$ to $C_{60}$ with at least 40 wt % at a single carbon number selected from the group consisting of $C_{30}$, $C_{31}$, $C_{32}$, $C_{33}$, $C_{34}$, $C_{35}$, $C_{36}$, $C_{37}$, $C_{38}$, $C_{39}$, and $C_{40}$.

15. The lubricant composition of claim 1, wherein the lube base stock has consecutive carbon numbers ranging from $C_{20}$ to $C_{60}$ with at least 40 wt % falling within a carbon number range from $C_{30}$ to $C_{40}$.

16. The lubricant composition of claim 1, wherein the renewable biological source includes animal oils, animal fats, animal waxes, vegetable oils, vegetable fats, vegetable waxes, fish oils, fish fats, fish waxes, and algae sources.

17. The lubricant composition of claim 1, wherein the lube base stock has a kinematic viscosity at 100° C. ranging from 1 to 100 cSt.

18. The lubricant composition of claim 1, wherein the composition has a kinematic viscosity at 100° C. ranging from 2 to 40 cSt.

19. The lubricant composition of claim 1, wherein the lube base stock has a sulfur content less than 300 ppm.

20. The lubricant composition of claim 1, wherein the lube base stock has a nitrogen content less than 100 ppm.

21. The lubricant composition of claim 1, wherein the lube base stock has an olefin content of less than 3 wt. % by proton NMR.

22. The lubricant composition of claim 1, wherein the lube base stock has a Noack volatility of less than 10 wt. % for a viscosity of at least 4 cSt.

23. The lubricant composition of claim 1, wherein the lube base stock has a Noack volatility of less than $(-79.8*\log_{10}(\log_{10}(CCS @ -35° C.))+54.26)$ and greater than $(-120*\log_{10}(\log_{10}(CCS @ -35° C.))+73.71)$.

24. The lubricant composition of claim 1, wherein the lube base stock has a pour point less than −15° C.

25. The lubricant composition of claim 1, wherein the lube base stock has a pour point less than −45° C.

26. The lubricant composition of claim 1, wherein the composition yields a CCS viscosity-Noack volatility relationship at least 10% lower than the same lubricant composition including an API Group II lube base stock made from a non-renewable petroleum based source.

27. The lubricant composition of claim 1, wherein the composition yields a solvency measured by aniline point of less than 112 deg. C.

28. The lubricant composition of claim 1, wherein the composition yields a % thickening when blended with a 7 wt. % of a styrene-isoprene star polymer viscosity modifier of at least 146%.

29. The lubricant composition of claim 1 used in lubricating applications selected from the group consisting of automotive crank case lubricants, automotive gear oils, transmission oils, industrial circulation lubricant, industrial gear lubricants, grease, compressor oil, pump oils, refrigeration lubricants, hydraulic lubricants, and metal working fluids.

30. The lubricant composition of claim 1 used in equipment selected from the group consisting of gasoline fired engines, diesel fired engines, natural gas fired engines, gear boxes, wind turbines and circulating hydraulic pumps.

31. A lubricant composition comprising from 20 to 99.8 wt. % of a renewable lube base stock produced from a renewable biological source and an effective amount of one or more lubricant additives, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C., and wherein the renewable lube base stock has a Free Carbon Incex of less than 3.0 and pendant methyl groups mole % of less than or equal to 4.33.

32. The lubricant composition of claim 31, wherein the effective amount of one or more lubricant additives ranges from 0.2 to 20 wt. % of the total lubricant composition.

33. The lubricant composition of claim 31, wherein the one or more lubricant additives are selected from the group consisting of antioxidants, stabilizers, detergents, dispersants, demulsifiers, antioxidants, anti-wear additives, pour point depressants, viscosity index modifiers, friction modifiers, anti-foam additives, defoaming agents, corrosion inhibitors, wetting agents, rust inhibitors, copper passivators, metal deactivators, extreme pressure additives, and combinations thereof.

34. The lubricant composition of claim 31 further including one or more co-base stocks selected from the group consisting of API Group I, Group II, Group III, Group IV, Group V, gas-to-liquid (GTL), and combinations thereof.

35. The lubricant composition of claim 34, wherein the one or more co-base stocks range from 2 to 80 wt. % of the total lubricant composition.

36. The lubricant composition of claim 31, wherein the lube base stock has a $^{14}C$ level ranging from 50 to 101% of the modern day $^{14}C$ level in the atmosphere.

37. The lubricant composition of claim 31, wherein the lube base stock has a $^{14}C$ level ranging from 80 to 101% of the modern day $^{14}C$ level in the atmosphere.

38. The lubricant composition of claim 31, wherein the Viscosity Index of the lube base stock is from 100 to 160.

39. The lubricant composition of claim 31, wherein the Viscosity Index of the lube base stock is from 110 to 140.

40. The lubricant composition of claim 31, wherein the lube base stock yields a CCS ratio (Cold Crank Simulator (CCS) viscosity to the predicted CCS viscosity by Walther equation) less than or equal to 0.60 at −35° C.

41. The lubricant composition of claim 31, wherein the renewable biological source includes animal oils, animal fats, animal waxes, vegetable oils, vegetable fats, vegetable waxes, fish oils, fish fats, fish waxes, and algae sources.

42. The lubricant composition of claim 31, wherein the lube base stock has a kinematic viscosity at 100° C. ranging from 1 to 100 cSt.

43. The lubricant composition of claim 31, wherein the composition has a kinematic viscosity at 100° C. ranging from 2 to 40 cSt.

44. The lubricant composition of claim 31, wherein the lube base stock has a Noack volatility of less than 10 wt. % for a viscosity of at least 4 cSt.

45. The lubricant composition of claim 31, wherein the lube base stock has a Noack volatility of less than $(-79.8*\log_{10}(\log_{10}(CCS\ @-35°\ C.))+54.26)$ and greater than $(-120*\log_{10}(\log_{10}(CCS\ @-35°\ C.))+73.71)$.

46. The lubricant composition of claim 31, wherein the lube base stock has a pour point less than −15° C.

47. The lubricant composition of claim 31, wherein the lube base stock has a pour point less than −45° C.

48. The lubricant composition of claim 31, wherein the composition yields a CCS viscosity-Noack volatility relationship at least 10% lower than the same lubricant composition including an API Group II lube base stock made from a non-renewable petroleum based source.

49. The lubricant composition of claim 31, wherein the composition yields a solvency measured by aniline point of less than 112 deg. C.

50. The lubricant composition of claim 31, wherein the composition yields a % thickening when blended with a 7 wt. % of a styrene-isoprene star polymer viscosity modifier of at least 146%.

51. The lubricant composition of claim 31 used in lubricating applications selected from the group consisting of automotive crank case lubricants, automotive gear oils, transmission oils, industrial circulation lubricant, industrial gear lubricants, grease, compressor oil, pump oils, refrigeration lubricants, hydraulic lubricants, and metal working fluids.

52. The lubricant composition of claim 31 used in equipment selected from the group consisting of gasoline fired engines, diesel fired engines, natural gas fired engines, gear boxes, wind turbines and circulating hydraulic pumps.

53. A method of making a lubricant composition comprising: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock includes from 10 to 35 wt. % paraffins, 40 to 70 wt. % 1-ring naphthenes, and 0 to 40 wt. % combined 2-ring naphthenes and aromatics, wherein the Free Carbon Index is less than 3.0, wherein pendant methyl groups mole % is less than or equal to 4.33, wherein the ratio of 1-ring naphthenes to paraffins is from 1.8 to 5.0 for the renewable lube base stock, and wherein the Viscosity Index of the renewable lube base stock is from 100 to 160.

54. A method of making a lubricant composition comprising: providing a renewable lube base stock produced from a renewable biological source and one or more lubricant additives, blending from 20 to 99.8 wt. % of the renewable lube base stock with an effective amount of the one or more lubricant additives to form a lubricant composition, wherein the renewable lube base stock has a $^{14}C$ level ranging from 2 to 101% of the modern day $^{14}C$ level in the atmosphere, and wherein the renewable lube base stock yields a CCS ratio (Cold Crank Simulator (CCS) viscosity to the predicted CCS viscosity by Walther equation) of less than or equal to 0.85 at −35° C., and wherein the renewable lube base stock has a Free Carbon Index of less than 3.0 and pendant methyl groups mole % of less than or equal to 4.33.

* * * * *